United States Patent
Yano et al.

(10) Patent No.: US 7,525,945 B2
(45) Date of Patent: Apr. 28, 2009

(54) SPREAD SPECTRUM COMMUNICATION DEVICE AND SPREAD SPECTRUM COMMUNICATION METHOD

(75) Inventors: Yasuhiro Yano, Tokyo (JP); Hideshi Murai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 24 days.

(21) Appl. No.: 11/673,396

(22) Filed: Feb. 9, 2007

(65) Prior Publication Data

US 2007/0129095 A1 Jun. 7, 2007

Related U.S. Application Data

(62) Division of application No. 10/379,914, filed on Mar. 6, 2003, now Pat. No. 7,286,518, which is a division of application No. 09/424,611, filed as application No. PCT/JP99/01073 on Mar. 5, 1999, now Pat. No. 6,671,267.

(30) Foreign Application Priority Data

Mar. 26, 1998 (JP) .................................. 10-080031

(51) Int. Cl.
 H04B 1/00 (2006.01)
 H04B 7/216 (2006.01)
 H04Q 7/20 (2006.01)
 G08C 17/00 (2006.01)

(52) U.S. Cl. ........................ 370/342; 370/311; 370/335; 375/130; 455/522

(58) Field of Classification Search ......... 370/241–252, 370/311–342, 345–347; 455/67–69, 517–522; 375/130–148, 227–240
See application file for complete search history.

(56) References Cited

U.S. PATENT DOCUMENTS 5,268,933 A 12/1993 Averbuch (Continued)

FOREIGN PATENT DOCUMENTS

GB 2313751 A 12/1997

(Continued)

OTHER PUBLICATIONS

Gustafsson, M., et al., "Compressed Mode Techniques for Inter-Frequency Measurements in a Wide-band CDMA System", Proc. of IEEE 8th PIMRC, 1997, pp. 231-235.
Ovesjo, Fredrik, "Ultra Physical Layer Description FDD Parts", European Telecommunication Standard, vol. 4, Jun. 25, 1998, pp. 1-41.
U.S. Appl. No. 11/673,358, filed Feb. 9, 2007, Yano et al.
U.S. Appl. No. 11/673,396, filed Feb. 9, 2007, Yano et al.

Primary Examiner—Man Phan
(74) Attorney, Agent, or Firm—Oblon, Spivak, McClelland, Maier & Neustadt, P.C.

(57) ABSTRACT

In a compressed mode, a spread spectrum communication device interleaves bit units across multiple frames using an interleaver, reduces the spreading factor using a framing/spreading unit, outputs the compressed mode frames at a predetermined compressed mode frame timing, and increases the average transmission power in the compressed mode at a radio frequency transmitter. Furthermore, a handover between different frequencies is carried out by establishing synchronization to another frequency carrier, based on a first search code and a second search code which have been detected, and moreover, a handover between different communication systems is carried out by establishing synchronization to a GSM, based on an FCCH and a SCH which have been detected.

4 Claims, 46 Drawing Sheets

U.S. PATENT DOCUMENTS

| | | | |
|---|---|---|---|
| 5,291,515 A | 3/1994 | Uchida et al. | |
| 5,347,537 A | 9/1994 | Mori et al. | |
| 5,533,014 A | 7/1996 | Willars et al. | |
| 5,619,491 A | 4/1997 | Panzer | |
| 5,675,344 A | 10/1997 | Tong et al. | |
| 5,675,585 A | 10/1997 | Bonnot et al. | |
| 5,734,648 A | 3/1998 | Adachi et al. | |
| 5,802,046 A | 9/1998 | Scott | |
| 5,822,359 A | 10/1998 | Bruckert et al. | |
| 5,859,840 A | 1/1999 | Tiedemann, Jr. et al. | |
| 5,881,058 A | 3/1999 | Chen | |
| 5,883,899 A | 3/1999 | Dahlman et al. | |
| 5,883,923 A | 3/1999 | Shimazaki | |
| 5,896,368 A | 4/1999 | Dahlman et al. | |
| 5,896,411 A * | 4/1999 | Ali et al. | 375/130 |
| 5,946,357 A | 8/1999 | Sadin et al. | |
| 5,949,790 A | 9/1999 | Pehkonen et al. | |
| 5,970,058 A | 10/1999 | DeClerk et al. | |
| 6,018,545 A | 1/2000 | Fukumasa et al. | |
| 6,038,253 A | 3/2000 | Shimazaki | |
| 6,055,277 A | 4/2000 | Stephens et al. | |
| 6,072,778 A | 6/2000 | Labedz et al. | |
| 6,084,904 A | 7/2000 | Wang et al. | |
| 6,094,428 A | 7/2000 | Bruckert et al. | |
| 6,104,918 A * | 8/2000 | Saario et al. | 455/126 |
| 6,134,264 A | 10/2000 | Shiba et al. | |
| 6,163,708 A * | 12/2000 | Groe | 455/522 |
| 6,301,294 B1 | 10/2001 | Hara et al. | |
| 6,308,072 B1 | 10/2001 | Labedz et al. | |
| 6,381,233 B1 | 4/2002 | Sunaga | |
| 6,418,320 B2 * | 7/2002 | Yoshida et al. | 455/522 |
| 6,469,995 B1 | 10/2002 | Voyer et al. | |
| 6,487,191 B1 * | 11/2002 | Kang et al. | 370/342 |
| 6,829,489 B2 * | 12/2004 | Yamamoto et al. | 455/522 |
| 7,013,160 B2 * | 3/2006 | Tiedemann et al. | 455/522 |
| 7,286,518 B2 * | 10/2007 | Yano et al. | 370/342 |
| 2006/0094460 A1 * | 5/2006 | Tiedemann et al. | 455/522 |
| 2006/0203781 A1 | 9/2006 | Yano et al. | |
| 2007/0140206 A1 * | 6/2007 | Yano et al. | 370/342 |

FOREIGN PATENT DOCUMENTS

| | | |
|---|---|---|
| JP | 07-312783 | 11/1995 |
| JP | 8-307310 | 11/1996 |
| JP | 9-214473 | 8/1997 |
| WO | 99/29981 | 12/1994 |
| WO | 96/04718 | 2/1996 |
| WO | 96/23369 | 8/1996 |
| WO | 97/40592 | 10/1997 |
| WO | 97/40593 | 10/1997 |

* cited by examiner

FIG.2
(a)
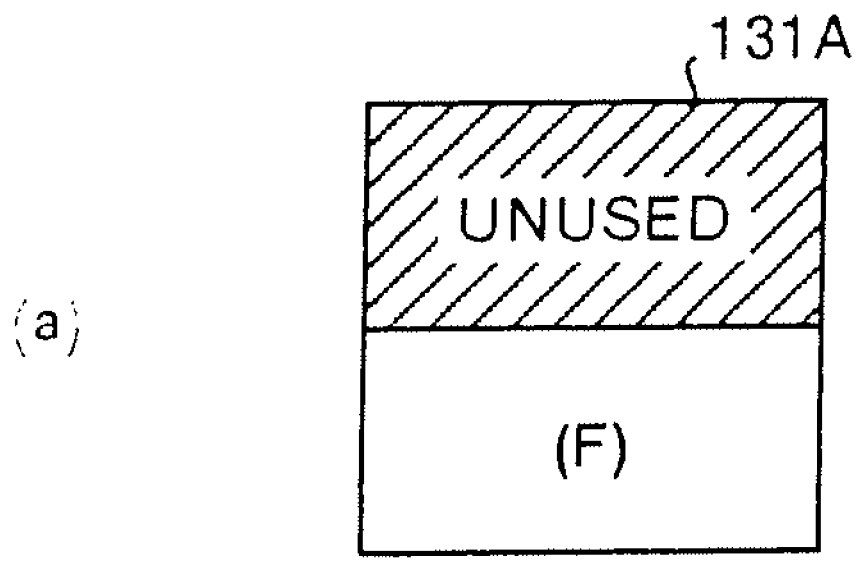
(b)
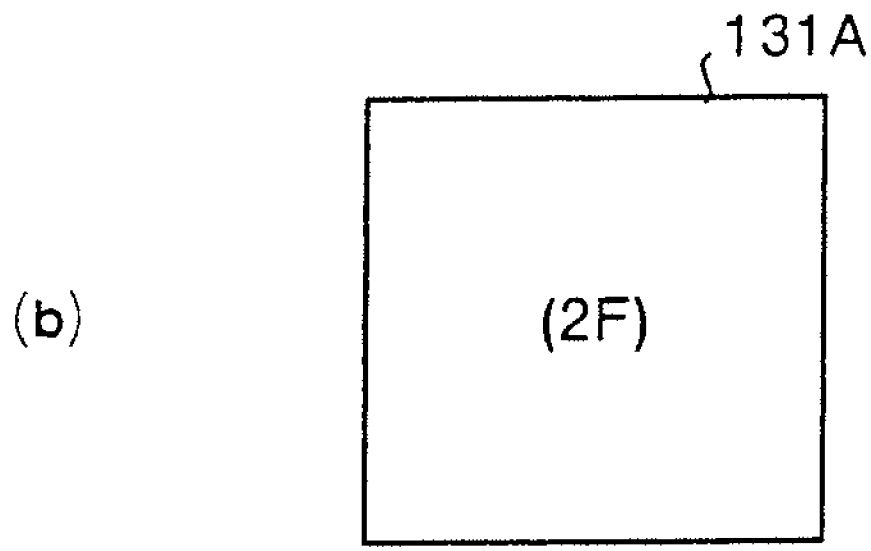

FIG.28

| TPC BIT (1 BIT) | TRANSMISSION POWER CONTROL AMOUNT | |
|---|---|---|
| | NORMAL MODE | COMPRESSED MODE |
| 1 | +1.0dB | +3.0dB |
| 0 | −1.0dB | −3.0dB |

111A

BROADCAST CHANNEL FRAME CONSTITUTION

BROADCAST CHANNEL FRAME CONSTITUTION

FIG.39

| Slot= | =1 | =2 | =3 | =4 | =5 | =6 | =7 | =8 | =9 | =10 | =11 | =12 | =13 | =14 | =15 | =16 |
|---|---|---|---|---|---|---|---|---|---|---|---|---|---|---|---|---|
| Group 1 | 1 | 1 | 2 | 11 | 6 | 3 | 15 | 7 | 8 | 8 | 7 | 15 | 3 | 6 | 11 | 2 |
| Group 2 | 1 | 2 | 9 | 3 | 10 | 11 | 13 | 13 | 11 | 10 | 3 | 9 | 2 | 1 | 16 | 16 |
| Group 3 | 1 | 3 | 16 | 12 | 14 | 2 | 11 | 2 | 14 | 12 | 16 | 3 | 1 | 13 | 4 | 13 |
| Group 4 | 1 | 4 | 6 | 4 | 1 | 10 | 9 | 8 | 17 | 14 | 12 | 14 | 17 | 8 | 9 | 10 |
| Group 5 | 1 | 5 | 13 | 13 | 5 | 1 | 7 | 14 | 3 | 16 | 8 | 8 | 16 | 3 | 14 | 7 |
| Group 6 | 1 | 6 | 3 | 5 | 9 | 9 | 5 | 3 | 6 | 1 | 4 | 2 | 15 | 15 | 2 | 4 |
| Group 7 | 1 | 7 | 10 | 14 | 13 | 17 | 3 | 9 | 9 | 3 | 17 | 13 | 14 | 10 | 7 | 1 |
| Group 8 | 1 | 8 | 17 | 6 | 17 | 8 | 1 | 15 | 12 | 5 | 13 | 7 | 13 | 5 | 12 | 15 |
| Group 9 | 1 | 9 | 7 | 15 | 4 | 16 | 16 | 4 | 15 | 7 | 9 | 1 | 12 | 17 | 17 | 12 |
| Group 10 | 1 | 10 | 14 | 7 | 8 | 7 | 14 | 10 | 1 | 9 | 5 | 12 | 11 | 12 | 5 | 9 |
| Group 11 | 1 | 11 | 4 | 16 | 12 | 15 | 12 | 16 | 4 | 11 | 1 | 6 | 10 | 7 | 10 | 6 |
| Group 12 | 1 | 12 | 11 | 8 | 16 | 6 | 10 | 5 | 7 | 13 | 14 | 17 | 9 | 2 | 15 | 3 |
| Group 13 | 1 | 13 | 1 | 17 | 3 | 14 | 8 | 11 | 10 | 15 | 10 | 11 | 8 | 14 | 3 | 17 |
| Group 14 | 1 | 14 | 8 | 9 | 7 | 5 | 6 | 17 | 13 | 17 | 6 | 5 | 7 | 9 | 8 | 14 |
| Group 15 | 1 | 15 | 15 | 1 | 11 | 13 | 4 | 6 | 16 | 2 | 2 | 16 | 6 | 4 | 13 | 11 |
| Group 16 | 1 | 16 | 5 | 10 | 15 | 4 | 2 | 12 | 2 | 4 | 15 | 10 | 5 | 16 | 1 | 8 |
| Group 17 | 1 | 17 | 12 | 2 | 2 | 12 | 17 | 1 | 5 | 6 | 11 | 4 | 4 | 11 | 6 | 5 |
| Group 18 | 2 | 8 | 11 | 15 | 14 | 1 | 4 | 10 | 10 | 4 | 1 | 14 | 15 | 11 | 8 | 2 |
| Group 19 | 2 | 9 | 1 | 7 | 1 | 9 | 2 | 16 | 13 | 6 | 14 | 8 | 14 | 6 | 13 | 16 |
| Group 20 | 2 | 10 | 8 | 16 | 5 | 17 | 17 | 5 | 16 | 8 | 10 | 2 | 13 | 1 | 1 | 13 |
| Group 21 | 2 | 11 | 15 | 8 | 9 | 8 | 15 | 11 | 2 | 10 | 6 | 13 | 12 | 13 | 6 | 10 |
| Group 22 | 2 | 12 | 5 | 17 | 13 | 16 | 13 | 17 | 5 | 12 | 2 | 7 | 11 | 8 | 11 | 7 |
| Group 23 | 2 | 13 | 12 | 9 | 17 | 7 | 11 | 6 | 8 | 14 | 15 | 1 | 10 | 3 | 16 | 4 |
| Group 24 | 2 | 14 | 2 | 1 | 4 | 15 | 9 | 12 | 11 | 16 | 11 | 12 | 9 | 15 | 4 | 1 |
| Group 25 | 2 | 15 | 9 | 10 | 8 | 6 | 7 | 1 | 14 | 1 | 7 | 6 | 8 | 10 | 9 | 15 |
| Group 26 | 2 | 16 | 16 | 2 | 12 | 14 | 5 | 7 | 17 | 3 | 3 | 17 | 7 | 5 | 14 | 12 |
| Group 27 | 2 | 17 | 6 | 11 | 16 | 5 | 3 | 13 | 3 | 5 | 16 | 11 | 6 | 17 | 2 | 9 |
| Group 28 | 2 | 1 | 13 | 3 | 3 | 13 | 1 | 2 | 6 | 7 | 12 | 5 | 5 | 12 | 7 | 6 |
| Group 29 | 2 | 2 | 3 | 12 | 7 | 4 | 16 | 8 | 9 | 9 | 8 | 16 | 4 | 7 | 12 | 3 |
| Group 30 | 2 | 3 | 10 | 4 | 11 | 12 | 14 | 14 | 12 | 11 | 4 | 10 | 3 | 2 | 17 | 17 |
| Group 31 | 2 | 4 | 17 | 13 | 15 | 3 | 12 | 3 | 15 | 13 | 17 | 4 | 2 | 14 | 5 | 14 |
| Group 32 | 2 | 5 | 7 | 5 | 2 | 11 | 10 | 9 | 1 | 15 | 13 | 15 | 1 | 9 | 10 | 11 |

SPREAD SPECTRUM COMMUNICATION DEVICE AND SPREAD SPECTRUM COMMUNICATION METHOD

CROSS REFERENCE TO RELATED APPLICATIONS

This application is a divisional of U.S. application Ser. No. 10/379,914 filed on Mar. 6, 2003 now being U.S. Pat. No. 7,286,518, which is a divisional of Ser. No. 09/424,611 filed on Feb. 14, 2000 now being U.S. Pat. No. 6,671,267, which is a National Stage of PCT/JP99/01073 filed Mar. 5, 1999, all of which claims priority to Japanese Patent Application No. 10-080031 filed on Mar. 26, 1998. The contents of each of these documents are incorporated herein by reference.

TECHNICAL FIELD

This invention relates to a communication device applied in a code division multiple access (CDMA) communication system and a method thereof. More particularly this invention relates to a spread spectrum communication device for improving interleave transmission and transmission power control in spread spectrum communication, and for realizing handovers between different frequencies and a method thereof.

BACKGROUND ART

In a CDMA cellular system, because the same carrier frequency is used repeatedly in every cell there is no need for handovers between frequencies within the same system. However, considering a case such as when existing systems are present together, there is a need for handovers between different carrier frequencies. Three points pertaining to detailed cases are described below.

As a first point, in a cell where there is considerable traffic, a separate carrier frequency is used to accommodate the increased number of subscribers, and a handover may be performed between those cells. As a second point, when an umbrella cell constitution is used, different frequencies are allocated to large and small cells, and handovers are performed between the cells. Then, as a third point, there are cases of handovers between a third generation system, such as a W(Wideband)-CDMA system, and a second generation system, such as a current mobile telephone system.

When performing handovers in cases such as those mentioned above, it is necessary to detect the power of carriers at the different frequencies. To achieve this detection, the receiver needs to only have a structure capable of detecting two frequencies. However, this increases the size of the constitution of the receiver, or makes the constitution complicated.

Furthermore, two types of handover method may be considered: a mobile assisted handover (MAHO) and a network assisted handover (NAHO). Comparing the MAHO and NAHO methods, NAHO reduces the burden of the mobile device, but to be successful, it should be necessary to synchronize the mobile device and the base station, whereby the constitution of the base station and the network becomes complicated and large in order to be capable of tracking each individual mobile device.

For such reasons, the realization of the MAHO method is more desirable, but to determine whether or not to handover, it is necessary to measure the strength of carriers of different frequencies at the mobile devices. However, a CDMA cellular system differs from a time division multiplex access (TDMA) system used in a second generation, in that it uses ordinarily continuous transmission for both transmission/reception. In this continuous transmission/reception technique, unless receivers corresponding to two frequencies are prepared, it is necessary to stop the timing of the transmission or the reception and measure the other frequency.

There has been disclosed a technique relating to a compressed mode method, for time-compressing the transmission data in the usual mode and transmitting it in a short time, thereby creating some spare time which can be utilized to measure the other frequency carrier. As an example of this, there is Japan Patent Application National Publication (Laid-Open) (JP-A) No. 8-500475 "Non-continuous Transmission for Seamless Handovers in DS-CDMA Systems". This application discloses a method of realizing a compressed mode, wherein the spreading factor of the spreading code used is lowered to compress the transmission duration.

The method of realizing the compressed mode according to the above application will be explained below. FIG. 36 shows an example of transmissions in a normal mode and a compressed mode in a conventional CDMA system. In FIG. 36, the vertical axis represents transmission rate/transmission power, and the horizontal axis represents time. In the example of FIG. 36, the compressed mode transmission is inserted between normal transmission frames.

In the transmission in the compressed mode, a non-transmission timing is provided in the downlink frame, and can be set to a desired period of time (duration). This non-transmission timing represents idle period during which the strength of the other frequency carrier is measured. In this way, slotted transmission can be achieved by inserting the idle period during transmission of compressed mode frames.

In this type of compressed mode transmission, transmission power increases in accordance with the time ratio between the idle period and the frame (compressed mode frame) transmission timing, and therefore, as shown in FIG. 36, the compressed mode frame is transmitted at a higher transmission power than the frame in normal transmission. As a consequence, transmission quality can be maintained even in frame transmission in compressed mode.

In addition to the application mentioned above, as an example of pertinent literature there is Gustafsson, M. et al: "Compressed Mode Techniques for Inter-Frequency Measurements in a Wide-band DS-CDMA System", Proc. of 8th IEEE PIMRC '97. This research paper discloses techniques for realizing compressed mode in cases other than when the spreading factor is lowered, namely when the coding rate is increased, when multi-code transmission is used, and when a multi-bit transmission modulation system such as 16 QAM is used.

However, in conventional examples such as the application mentioned above, since transmissions are interleaved in units of one frame and within one frame, the interleaving time for slotted transmission (in the compressed mode) is more compressed than in normal transmission. Consequently, the interleaving size is shortened which leads to a problem of poor decoding at the reception side.

Furthermore, in conventional examples such as the literature mentioned above, since the length of interleaving time is shortened when using compressed mode transmission, there is increased deterioration of signal quality with respect to fading, and, since no PC (transmission power control) command bit is sent during non-transmission, it is not possible to achieve high-speed TPC, leaving a subsequent problem of poor signal quality.

Furthermore, in conventional examples such as the application and literature mentioned above, the spreading factor is lowered when carrying out a compressed mode transmission. However, in general, lowering of the spreading factor indicates that a spreading code having a short code-length is being used. However, since the number of spreading codes that can be used is directly proportional to the square of the code-length, there is a problem that there are extremely few spreading codes having short code-lengths, and these spreading code resources, which are vital for realizing compressed mode transmission, are consumed.

It is an object of the present invention to solve the problems described above by providing a spread spectrum communication device and a spread spectrum communication method capable of preventing deterioration in signal quality caused by compressed mode, with respect to interleaving, transmission power control, spreading code allocation methods and the like to minimize the effects of transmission errors.

DISCLOSURE OF THE INVENTION

A spread spectrum communication device according to an aspect of the present invention is applied in a code division multiple access system for continuously transmitting frames in a normal mode, and intermittently transmitting compressed frames in a compressed mode, and is characterized in that it comprises an interleaving unit for interleaving in bit units a frame or a compressed frame, which is a unit of a transmission data stream, to minimize effects of transmission errors; a compressing/intermittent transmitting unit for compressing a frame prior to or after interleaving in the compressed mode, and moreover, intermittently outputting the compressed frame to the interleaving unit if the compressed frame has not yet been interleaved, and intermittently outputting the compressed frame to a device on a reception side if the compressed frame has been interleaved; a control unit for controlling the operation of interleaving in bit units of the interleaving unit, and the compressing/intermittent transmitting operation of the compressing/intermittent transmitting unit; the control unit controlling the interleaving unit to perform interleaving in bit units across multiple frames in the compressed mode.

According to this invention, in the compressed mode, multiple frames are interleaved in bit units to minimize effects of transmission errors, whereby it is possible to secure appropriate interleaving time in the compressed mode in the same way as in the normal mode, and consequently, poor performance caused by interleaving in bit units can be prevented.

A spread spectrum communication device according to a next aspect of the invention is characterized in that the interleaving unit has a memory size in correspondence with the number of frames to be interleaved in the compressed mode.

According to this invention, since the memory size used is in correspondence with the number of frames to be interleaved in the compressed mode, interleaving in bit units can be performed in a number of frames sufficient to minimize the effects of transmission errors in the compressed mode.

A spread spectrum communication device according to a next aspect of the invention is applied in a code division multiple access system for continuously transmitting frames in a normal mode, and intermittently transmitting compressed frames in a compressed mode, and characterized in that it comprises an interleaving unit for interleaving in bit units a frame or a compressed frame, which is a unit of a transmission data stream, to minimize effects of transmission errors; a compressing/intermittent transmitting unit for compressing a frame prior to or after interleaving in the compressed mode, and moreover, intermittently outputting the compressed frame to the interleaving unit if the compressed frame has not yet been interleaved, and intermittently outputting the compressed frame to a device on a reception side if the compressed frame has been interleaved; a control unit for controlling the interleaving operation in bit units of the interleaving unit, and the compressing/intermittent transmitting operation of the compressing/intermittent transmitting unit; the control unit controlling the compressing/intermittent transmitting unit so that the compressed frame is divided to the front and rear of the same frame timing as in the normal mode.

According to this invention, in the compressed mode, the compressed frame is divided to the front and rear of the same frame timing as in the normal mode, and intermittently transmitted in that arrangement, and consequently, an appropriate interleaving duration can be secured in the compressed mode as in the normal mode using a simple interleaving constitution so that the effects of transmission errors caused by interleaving in bit units can be further reduced.

A spread spectrum communication device according to a next aspect of the present invention is characterized in that the control unit controls the interleaving unit so that, in the compressed mode, interleaving in bit units is performed across multiple frames.

According to this invention, in the compressed mode, since interleaving is controlled so that interleaving in bit units is performed across multiple frames, an appropriate interleaving duration can be secured in the compressed mode as in the normal mode, and consequently, the effects of transmission errors caused by interleaving in bit units can be further reduced.

A spread spectrum communication device according to a next aspect of the present invention is applied in a code division multiple access system for continuously transmitting multiple frames in a normal mode, and intermittently transmitting compressed frames in a compressed mode, and is characterized in that it comprises a compressing/intermittent transmitting unit for compressing a frame, which comprises multiple slots and is a unit of a transmission data stream, and intermittently transmitting the compressed frame; and a control unit for controlling the compressing/intermittent transmitting unit so as to slot the compressed frame, and intermittently transmit the slotted frame in N (a natural number) slot units.

According to this invention, in the compressed mode, the compressed frame is slotted, and intermittently transmitted in N slot units, and therefore, transmission power control bits transmitted in a downlink can be received in comparatively short time intervals, whereby the amount of transmission power control error can be reduced.

A spread spectrum communication device according to a next aspect of the present invention is characterized in that the control unit determines the N slot units in accordance with the relationship between the measuring time of another frequency carrier component and the amount of transmission power control error.

According to this invention, since the N slot units are determined in accordance with the relationship between the measuring time of another frequency carrier strength and the amount of transmission power control error, it is possible to secure time for reliably measuring the strength of other frequency carriers, and in addition, the amount of transmission power control error can be greatly reduced.

A spread spectrum communication device according to a next aspect of the present invention is characterized in that it further has an interleaving unit for interleaving in bit units a frame or a compressed frame, which is a unit of a transmission data stream, to minimize effects of transmission errors; the control unit controlling the interleaving unit so that, in the compressed mode, interleaving in bit units is performed across multiple frames.

According to this invention, in the compressed mode, since interleaving in bit units is controlled across multiple frames, an appropriate interleaving duration can be secured in the compressed mode as in the normal mode, and consequently, the effects of transmission errors caused by interleaving in bit units can be further reduced.

A spread spectrum communication device according to a next aspect of the present invention is applied in a code division multiple access system for continuously transmitting frames in a normal mode, and intermittently transmitting compressed frames in a compressed mode, and is characterized in that it comprises an interleaving unit for interleaving in bit units a frame or a compressed frame, which is a unit of a transmission data stream, to minimize effects of transmission errors; a compressing/intermittent transmitting unit for compressing a frame prior to or after interleaving in the compressed mode, and moreover, intermittently outputting the compressed frame to the interleaving unit if the compressed frame has not yet been interleaved, and intermittently outputting the compressed frame to a device on a reception side if the compressed frame has been interleaved; a control unit for controlling the interleaving in bit units operation of the interleaving unit, and the compressing/intermittent transmitting operation of the compressing/intermittent transmitting unit; wherein in the compressed mode, the control unit controls the compressing/intermittent transmitting unit so that multiple frames prior to interleaving in bit units by the interleaving unit, or multiple frames after interleaving, are compressed using code-multiplexing in a given frame timing.

According to this invention, in the compressed mode, multiple interleaved frames are compressed using code-multiplexing in a given frame timing and intermittently transmitted, whereby an appropriate interleaving duration can be secured in the compressed mode as in the normal mode, and consequently, performance deterioration caused by interleaving in bit units can be prevented.

A spread spectrum communication device according to a next aspect of the present invention is characterized in that the control unit controls the interleaving unit so that, in the compressed mode, interleaving is performed in bit units across multiple frames.

According to this invention, in the compressed mode, interleaving is performed in bit units across multiple frames, and therefore, a longer interleaving duration can be secured in the compressed mode than in the normal mode, whereby the effects of transmission errors caused by interleaving in bit units can be further reduced. In particular, if other frames are replaced by multi-code-transmitted frames and interleaving is performed, it is possible to disperse multiple multi-code-transmitted frames which are in error in the same place, thereby increasing the correcting capability of the error-correction encoding.

A spread spectrum communication device according to a next aspect of the present invention is characterized in that the compressing/intermittent transmitting unit has a memory size in correspondence with the number of frames to be code-multiplexed in the compressed mode.

According to this invention, since the memory size used is in correspondence with the number of frames to be code-multiplexed in the compressed mode, code-multiplexing can be realized reliably and without loss in the compressed mode.

A spread spectrum communication device according to a next aspect of the present invention is applied in a code division multiple access system for continuously transmitting frames in a normal mode, and intermittently transmitting compressed frames in a compressed mode, is characterized in that it comprises a compressing/intermittent transmitting unit for compressing a frame, which is a unit of a transmission data stream, and intermittently transmitting the compressed frame, in the compressed mode; and a control unit for controlling the compressing/intermittent transmitting unit so that, in the compressed mode, the compressing/intermittent transmitting unit intermittently transmits at a lower transmission rate than the transmission rate in the normal mode, while using the same transmission power as in the normal mode.

According to this invention, in the compressed mode, the compressing/intermittent transmitting unit intermittently transmits at a lower transmission rate than the transmission rate in the normal mode, while using the same transmission power as in the normal mode, and consequently, the there is less interference power on other users on the same frequency during a frequency handover, enabling the frequency handover to be realized with reduced interference.

A spread spectrum communication device according to a next aspect of the present invention is characterized in that it further comprises an interleaving unit for interleaving in bit units a frame or a compressed frame, which is a unit of a transmission data stream, to minimize effects of transmission errors; the control unit controlling the interleaving unit so that, in the compressed mode, interleaving in bit units is performed across multiple frames.

According to this invention, in the compressed mode, interleaving in bit units is performed across multiple frames, and therefore an appropriate interleaving duration can be secured in the compressed mode as in the normal mode, and consequently, the effects of transmission errors caused by interleaving in bit units can be further reduced.

A spread spectrum communication device according to a next aspect of the present invention is characterized in that the control unit controls the compressing/intermittent transmitting unit so that the compressed frame is divided to the front and rear of the same frame timing as in the normal mode.

According to this invention, since the compressed frame is divided to the front and rear of the same frame timing as in the normal mode, and intermittently transmitted in compliance with that arrangement, an appropriate interleaving duration can be secured in the compressed mode as in the normal mode with a simple interleave constitution, and consequently, deterioration in performance caused by interleaving in bit units can be further reduced.

A spread spectrum communication device according to a next aspect of the present invention is characterized in that the control unit controls the compressing/intermittent transmitting unit so as to slot the compressed frame, and intermittently transmit the slotted frame in N (a natural number) slot units.

According to this invention, in the compressed mode, the compressed frame is slotted and intermittently transmitted in N slot units; therefore, transmission power control bits transmitted in a downlink can be received in comparatively short time intervals, whereby the amount of transmission power control error can be reduced.

A spread spectrum communication device according to a next aspect of the present invention is applied in a code division multiple access system for continuously transmitting frames in a normal mode, and intermittently transmitting compressed frames in a compressed mode, and is characterized in that it comprises a memory unit for storing optimum transmission power control units for the normal mode and the compressed mode, so that the transmission power control unit controlling one output of transmission power is greater in the compressed mode than in the normal mode; and a transmission power control unit for referring to the memory unit, and controlling transmission power to a communication partner device in compliance with transmission power control units in correspondence with the normal mode and the compressed mode, based on information representing a reception power received from the communication partner device.

According to this invention, in the compressed mode, transmission power to the communication partner device is controlled so that a transmission power control unit for one time is greater in the compressed mode than in the normal mode, and consequently, in the compressed mode, even when the temporal intervals of the transmission power control during intermittent transmission are wider, it is possible to widen the control range of the transmission power and maintain adhesion to the transmission power in the compressed mode, whereby the amount of error of transmission power control in the compressed mode can be reduced.

A spread spectrum communication device according to a next aspect of the present invention is characterized in that it further comprises a compressing/intermittent transmitting unit for compressing a frame, which comprises multiple slots and is a unit of a transmission data stream, and intermittently transmitting the compressed frame; and a control unit for controlling the compressing/intermittent transmitting unit so as to slot the compressed frame, and intermittently transmit the slotted frame in N (a natural number) slot units.

According to this invention, in the compressed mode, the compressed frame is slotted, and intermittently transmitted in N slot units, and therefore, transmission power control bits transmitted in a downlink can be received in comparatively short time intervals, whereby the amount of transmission power control error can be reduced.

A spread spectrum communication device according to a next aspect of the present invention is applied in a code division multiple access system for continuously transmitting frames in a normal mode, and intermittently transmitting compressed frames in a compressed mode, and is characterized in that it comprises a memory unit for taking more multiple types of transmission power control unit than in the normal mode, a transmission power control controlling one input of transmission power, including among the multiple types of transmission power control unit a transmission power control unit which is greater than in the normal mode, and storing optimum transmission power control units for the normal mode and the compressed mode; a transmission power control unit for referring to the memory unit, and controlling transmission power to a communication partner device in compliance with transmission power control units in correspondence with the normal mode and the compressed mode, and in addition, in correspondence with temporal intervals in the transmission power control in the compressed mode, based on information representing a reception power received from a communication partner device.

According to this invention, transmission power to a communication partner device is controlled in compliance with transmission power control units in correspondence with the normal mode and the compressed mode, and in addition, in correspondence with temporal intervals in the transmission PC control in the compressed mode; therefore, even when the temporal intervals of the transmission power control during intermittent transmission alter, by utilizing the control range of the transmission power it is possible to maintain adhesion to the transmission power in the compressed mode, thereby reducing the amount of error of transmission power control in the compressed mode.

A spread spectrum communication device according to a next aspect of the present invention is characterized in that it further comprises a compressing/intermittent transmitting unit for compressing a frame, which comprises multiple slots and is a unit of a transmission data stream, and intermittently transmitting the compressed frame; and a control unit for controlling the compressing/intermittent transmitting unit so as to slot the compressed frame, and intermittently transmit the slotted frame in N (a natural number) slot units.

According to this invention, in the compressed mode, the compressed frame is slotted, and intermittently transmitted in N slot units, and therefore, transmission power control bits transmitted in a downlink can be received in comparatively short time intervals, whereby the amount of transmission power control error can be greatly reduced.

A spread spectrum communication device according to a next aspect of the present invention is applied in a code division multiple access system for continuously transmitting frames in a normal mode, and intermittently transmitting compressed frames in a compressed mode, and is characterized in that it comprises a transmission section for using a desired spreading code to create transmission data of a quantity corresponding to a number of users who can be served thereby, in correspondence with the normal mode and the compressed mode, and adding and transmitting the transmission data created in correspondence with the number of users; and a compressed mode control section, connected to the transmission section, for controlling the creation operation of transmission data by the transmission section in the compressed mode; the compressed mode control section having a frame combining unit for extracting from given combinations of multiple compressed mode frames, compressed by separate users in the transmission section, a combination having a total transmission duration of less than one frame duration; a spreading code allocation unit for allocating the same spreading code to each of multiple channels which transmit the combination extracted by the frame combining unit; and a transmission timing control unit for using a single spreading code, allocated by the spreading code allocating unit, to control the transmission section so that transmission timings of multiple compressed mode frames, which comprise the above extracted combination, do not temporally overlap within one frame duration.

According to this invention, the compressed mode control section extracts from given combinations of multiple compressed mode frames, compressed by separate users in the transmission section, a combination having a total transmission duration of less than one frame duration, allocates the same spreading code to each of multiple channels which transmit the combination extracted by the frame combining unit, and uses a single spreading code, allocated by the spreading code allocation unit, to control the transmission section so that transmission duration of multiple compressed mode frames, which comprise the above extracted combination, do not temporally overlap within one frame duration; therefore, when there are multiple compressed mode frames, the number of spreading codes with low spreading factor used in the compressed mode can be reduced, and consequently, the spreading code resources can be effectively used in the compressed mode.

A spread spectrum communication device according to a next aspect of the present invention is applied in a code division multiple access system for continuously transmitting frames in a normal mode, and intermittently transmitting compressed frames in a compressed mode, and is characterized in that it comprises a compressing/intermittent receiving unit for intermittently receiving a compressed frame in the compressed mode; search code detecting and determining unit for detecting on other frequency carriers, during non-transmission period in the compressed mode, a first search code, which is shared at all base stations and is time-continually transmitted, and a second search code, which is transmitted at the same timing as the first search code and can be identified by multiple numeric patterns, and determining these search codes based on a predetermined reference; a control unit for selecting the compressing/intermittent receiving unit during intermittent receiving, selecting the search code detecting and determining unit during non-transmission duration, and controlling operations of both; the control unit establishing synchronization to the other frequency carrier, based on the first search code and second search code detected by the search code detecting and determining unit, and thereby controlling a handover between different frequencies.

According to this invention, synchronization to another frequency carrier is established based on the first search code and second search code detected by the search code detecting and determining unit, thereby enabling a handover to be efficiently performed between different W-CDMA/W-CDMA frequencies.

A spread spectrum communication device according to a next aspect of the present invention is characterized in that the control unit carries out control to detect at least one first search code during the non-transmission period which is not more than half of one frame, and thereafter, carries out control to repeat the processing of shifting the non-transmission period by a predetermined slot unit, and to detect a numeric value of all second search codes using multiple frames, and to establish synchronization to the other frequency carrier, based on the detected first search code and the numeric pattern of second search code, thereby controlling a handover between different frequencies.

According to this invention, at least one first search code is detected during the non-transmission period which is not more than half of one frame, and thereafter, the processing of shifting the non-transmission period by a predetermined slot unit is repeated, a numeric value of all the second search codes is detected using multiple frames, and synchronization is established to the other frequency carrier based on the detected first search code and the numeric pattern of second search code, thereby enabling a handover to be even more efficiently performed between different W-CDMA/W-CDMA frequencies.

A spread spectrum communication device according to a next aspect of the present invention is characterized in that the non-transmission duration can be arranged across multiple frames.

According to this invention, since the non-transmission period can be arranged across multiple frames, the second search codes can be detected multiple times, improving the reliability of the detected codes.

A spread spectrum communication device according to a next aspect of the present invention is characterized in that, when no search code can be obtained which satisfies a predetermined level of reliability during the search code detection, a search code is detected again in the place.

According to this invention, when no search code can be obtained which satisfies a predetermined level of reliability during the search code detection, a search code is detected again in the place, and consequently, synchronization can be established based on information of high reliability.

A spread spectrum communication device according to a next aspect of the present invention is applied in a code division multiple access system for continuously transmitting frames in a normal mode, and intermittently transmitting compressed frames in a compressed mode, and is characterized in that it comprises a compressing/intermittent receiving unit for intermittently receiving a compressed frame in the compressed mode; information detecting and determining unit for detecting in another communication system, during non-transmission period in the compressed mode, a first information for matching frequencies, and a second information for achieving synchronization, and determining the first and second information based on a predetermined reference; a control unit for selecting the compressing/intermittent receiving unit during intermittent receiving, selecting the information detecting and determining unit during non-transmission period, and controlling operations of both; the control unit establishing synchronization to the other communication system, based on the first information and second information detected by the information detecting and determining unit, and thereby controlling a handover between different frequencies.

According to this invention, synchronization to another communication system is established based on the first information and second information detected by the information detecting and determining unit, thereby enabling a handover between different frequencies to be achieved efficiently.

A spread spectrum communication device according to a next aspect of the present invention is characterized in that the control unit carries out control to detect at least one first information during the non-transmission period which is not more than half of one frame, thereafter, carries out control to set the non-transmission period based on a time found by the detected first information, and to detect the second information, and establishes synchronization to the other communication system, based on the detected first information and second information, thereby controlling a handover between different frequencies.

According to this invention, at least one first information is detected during the non-transmission period which is not more than half of one frame, thereafter, the non-transmission period is set based on a time found by the detected first information, the second information is detected, and synchronization to the other communication system is established based on the detected first information and second information; therefore, a handover between different systems can be carried out more effectively.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of interleaving of interleaving bit units across multiple frames, in order to minimize effects of transmission errors, in the compressed mode; a second step of compressing a frame interleaved in bit units in the first step, and intermittently transmitting it.

According to this invention, in the compressed mode, in order to minimize effects of transmission errors, interleaving of bit units is performed across multiple frames, and the interleaved frame is compressed and intermittently transmitted; therefore, an appropriate interleaving duration can be secured in the compressed mode as in the normal mode, and consequently, deterioration in performance caused by interleaving in bit units can be prevented.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of compressing a frame, which is a unit of a transmission data stream, and intermittently outputting it, in the compressed mode; and a second step of interleaving bit units across a plurality of the compressed frames.

According to this invention, in the compressed mode, a frame, which is a unit of a transmission data stream, is compressed and output intermittently, and interleaving in bit units is performed across multiple compressed frames; consequently, therefore, an appropriate interleaving duration can be secured in the compressed mode as in the normal mode, and deterioration in performance caused by interleaving in bit units can be prevented.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of interleaving bit units of a frame, which is a unit of a transmission data stream, and intermittently outputting it, in order to minimize effects of transmission errors; and a second step, performed in the compressed mode, of compressing a frame interleaved in bit units in the first step, dividing the compressed frame to the front and rear of the same frame timing as in the normal mode, and intermittently transmitting it.

According to this invention, in the compressed mode, a frame interleaved in bit units is compressed, divided to the front and rear of the same frame timing as in the normal mode, and intermittently transmitted; consequently, an appropriate interleaving duration can be secured in the compressed mode as in the normal mode, whereby performance deterioration caused by interleaving in bit units can be prevented.

A spread spectrum communication method according to the present invention is applied in a code division multiple access system for continuously transmitting frames in a normal mode, and intermittently transmitting compressed frames in a compressed mode, and is characterized in that it comprises a first step, performed in the compressed mode, of compressing a frame, which is a unit of a transmission data stream, and interleaving bit units of the compressed frame; and a second step of dividing the compressed and interleaved frame to the front and rear of the same frame timing as in the normal mode, and intermittently transmitting it.

According to this invention, in the compressed mode, a frame, which is a unit of a transmission data stream, is compressed and interleaved in bit units, divided to the front and rear of the same frame timing as in the normal mode, and intermittently transmitted; consequently, an appropriate interleaving duration can be secured in the compressed mode as in the normal mode, whereby performance deterioration caused by interleaving in bit units can be prevented.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of dividing a frame, being a unit of a transmission data stream, into multiple slots in the compressed mode; and a second step of intermittently transmitting the frame slotted in the first step in N (N=a natural number) slot units.

According to this invention, in the compressed mode, the compressed frame is slotted, and intermittently transmitted in N slot units, and therefore, transmission power control bits transmitted in a downlink can be received in comparatively short time intervals, whereby the amount of transmission power control error can be greatly reduced.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of interleaving in bit units a frame, being a unit of a transmission data stream, in order to minimize effects of transmission errors; a second step, performed in the compressed mode, of using code-multiplexing to compress, in a given frame timing, multiple frames interleaved in bit units in the first step, and transmit them intermittently.

According to this invention, in the compressed mode, code-multiplexing is used to compress, in a given frame timing, multiple frames interleaved in bit units, and they are transmitted intermittently; consequently, an appropriate interleaving duration can be secured in the compressed mode as in the normal mode, whereby performance deterioration caused by interleaving in bit units can be prevented.

A spread spectrum communication method according to a next aspect of the present invention is applied in a code division multiple access system for continuously transmitting frames in a normal mode, and intermittently transmitting compressed frames in a compressed mode, and is characterized in that it comprises a first step, performed in the compressed mode, of using code-multiplexing to compress, in a given frame timing, multiple frames interleaved in bit units in the first step, and transmit them intermittently; and a second step of interleaving the compressed frames in bit units.

According to this invention, in the compressed mode, code-multiplexing is used to compress, in a given frame timing, multiple frames interleaved in bit units, and they are transmitted intermittently; consequently, an appropriate interleaving duration can be secured in the compressed mode as in the normal mode, whereby performance deterioration caused by interleaving in bit units can be prevented.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of compressing a frame, which is a unit of a transmission data stream, in the compressed mode; and a second step of using the same transmission power as in the normal mode to transmit the frame compressed in the first step at a lower transmission rate than in the normal mode.

According to this invention, in the compressed mode, the same transmission power as in the normal mode is used to intermittently transmit a compressed frame at a lower transmission rate than in the normal mode; therefore, during a handover between frequencies, the amount of interference power to other users on the same frequency is reduced, whereby a handover between frequencies with reduced interference can be achieved.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of receiving information representing received power from a communication partner device; a second step of preparing beforehand a table storing optimum transmission power control units for the normal mode and the compressed mode, so that the transmission power control unit controlling one input of transmission power is greater in the compressed mode than in the normal mode, referring to the table, and determining transmission power for the normal mode and the compressed mode, based on the information representing received power received in the first step; and a third step of transmitting to the communication partner device in compliance with the transmission power determined in the second step.

According to this invention, by referring to a table storing optimum transmission power control units for the normal mode and the compressed mode, so that the transmission power control unit controlling one input of transmission power is greater in the compressed mode than in the normal mode, based on the information representing received power received from a communication partner device, transmission powers for the normal mode and the compressed mode are determined, and in the compressed mode, transmission is carried out so that the transmission power control unit controlling one input of transmission power is greater in the compressed mode than in the normal mode; therefore, in the compressed mode, even when the temporal intervals of the transmission power control during intermittent transmission are wider, it is possible to widen the control range of the transmission power and maintain adhesion to the transmission power in the compressed mode, whereby the amount of error of transmission power control in the compressed mode can be reduced.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of receiving information representing received power from a communication partner device; a second step of taking more multiple types of transmission power control unit than in the normal mode, a transmission power control controlling one input of transmission power, including among the multiple types of transmission power control unit a transmission power control unit which is greater than in the normal mode, preparing beforehand a table storing optimum transmission power control units for the normal mode and the compressed mode, referring to the memory unit, and determining transmission power in correspondence with the normal mode and the compressed mode, and in addition, in correspondence with temporal intervals in the transmission power control in the compressed mode, based on information representing a received power received in the first step; and a third step of transmitting to the communication partner device in compliance with the transmission power determined in the second step.

According to this invention, with regard to a transmission power control unit controlling one input of transmission power, more multiple types of these transmission power control units are taken than in the normal mode, including among the multiple types of transmission power control unit a transmission power control unit which is greater than in the normal mode, a table storing optimum transmission power control units for the normal mode and the compressed mode is referred to, and transmission power is determined in correspondence with the normal mode and the compressed mode and in addition, in correspondence with temporal intervals in the transmission power control in the compressed mode, based on information representing a reception power received from the communication partner device; and transmission is carried out in compliance with the determined transmission powers; therefore, in the compressed mode, even when the temporal intervals of the transmission power control during intermittent transmission alter, by utilizing the control range of the most suitable transmission power it is possible to maintain adhesion to the transmission power, thereby reducing the amount of error of transmission power control in the compressed mode.

A spread spectrum communication method according to a next aspect of the present invention is applied in a code division multiple access system for continuously transmitting frames in a normal mode, and intermittently transmitting compressed frames in a compressed mode, and is characterized in that it comprises a first step of compressing frames, being units of a transmission data stream, in multiple transmission channels performing compressed mode transmission; a second step of extracting from given combinations of multiple compressed mode frames, compressed separately for users in the first step, a combination having a total transmission duration of less than one frame duration; a third step of allocating the same spreading code to each of multiple channels which transmit the combination extracted in the second step; and a fourth step of using the same spreading code, allocated in the third step, to transmit multiple compressed mode frames, which comprise the combination extracted in the second step, so that their transmission duration do not temporally overlap within one frame duration.

According to this invention, in multiple transmission channels where compressed mode transmission is being performed, frames which are units of a transmission data stream are compressed; a combination having a total transmission duration of less than one frame duration is extracted from given combinations of multiple compressed mode frames, compressed separately for users; the same spreading code is allocated to each of multiple channels which transmit the extracted combination; and the same spreading code is used to transmit multiple compressed mode frames, comprising the extracted combination, so that their transmission duration do not temporally overlap within one frame duration; therefore, the number of spreading codes with low spreading factor used in the compressed mode can be reduced, and consequently, the spreading code resources can be effectively used in the compressed mode.

A spread spectrum communication method according to a next aspect of the present invention is applied in a code division multiple access system for continuously transmitting frames in a normal mode, and intermittently transmitting compressed frames in a compressed mode, and is characterized in that it comprises a first search code detecting step of detecting at least one first search code during the non-transmission period which is not more than half of one frame; a second search code detecting step of thereafter repeating the processing of shifting the non-transmission period by a predetermined slot unit, and detecting a numeric value of all second search codes using multiple frames; a handover between different frequencies being controlled by establishing synchronization to another frequency carrier, based on the detected first search code and the numeric pattern of second search code.

According to this invention, at least one first search code is detected during the non-transmission period which is not more than half of one frame, thereafter, the process of shifting the non-transmission timing by a predetermined slot unit is repeated, a numeric value of all second search codes is detected using multiple frames, and based on the detected first search code and the numeric pattern of second search code, synchronization is established to another frequency carrier; consequently, a handover between different W-CDMA/W-CDMA frequencies can be effectively performed.

A spread spectrum communication method according to a next aspect of the present invention is characterized in that the non-transmission period can be arranged across multiple frames.

According to this invention, since the non-transmission period can be arranged across multiple frames, the second search codes can be detected multiple times, improving the reliability of the detected codes.

A spread spectrum communication method according to a next aspect of the present invention is characterized in that, when no search code can be obtained which satisfies a predetermined level of reliability during the search code detection, a search code is detected again in the place.

According to this invention, when no search code can be obtained which satisfies a predetermined level of reliability during the search code detection, a search code is detected again in the place, enabling synchronization to be established based on information of high reliability.

A spread spectrum communication method according to a next aspect of the present invention is applied in a code division multiple access system for continuously transmitting frames in a normal mode, and intermittently transmitting compressed frames in a compressed mode, and is characterized in that it comprises a first information detecting step of detecting a first information for matching frequencies during non-transmission period which is not more than half of one frame; a second information detecting step of detecting second information for setting the non-transmission duration, based on a known timing determined beforehand from the detected first information, and achieving synchronization; a handover between different frequencies being controlled by establishing synchronization to another communication system, based on the detected first information and second information.

According to this invention, at least one first information is detected during the non-transmission period which is not more than half of one frame, thereafter, the non-transmission period is set based on a known timing found by the detected first information, the second information is detected, and synchronization to the other communication system is established based on the detected first information and second information; therefore, a handover between different systems can be carried out more effectively.

BRIEF DESCRIPTION OF THE DRAWINGS

FIG. 2 is a diagram explaining memory distribution of an interleaver according to the first embodiment;

FIG. 28 is a diagram showing the relationship between transmission power control symbol and transmission power control amount according to the seventh embodiment;

FIG. 39 is a table showing a correspondence between the second search codes and the scrambling code groups;

BEST MODES FOR CARRYING OUT THE INVENTION

To explain the present invention in more detail, it will be described with reference to the accompanying drawings.

Figure 1:
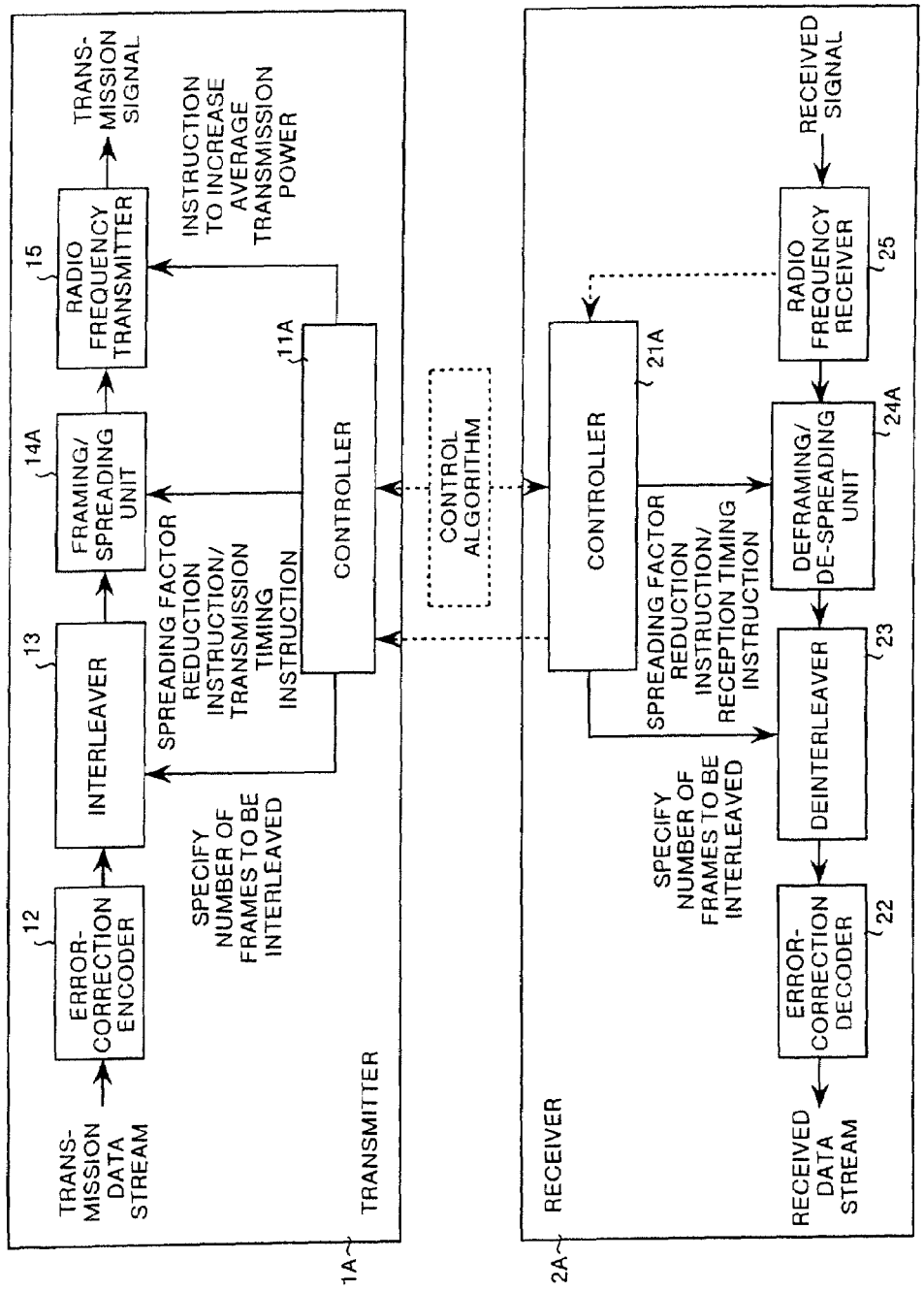
FIG. 1 is a block diagram showing a CDMA system according to a first embodiment of the present invention.

To begin with, the constitution of a CDMA system will be explained. FIG. 1 is a block diagram showing a CDMA system according to a first embodiment of the present invention. The CDMA system comprises a transmitter 1A and a receiver 2A. Such a CDMA system is provided with both base station and mobile stations. The base station and the mobile stations carry out radio communication using a CDMA communication method.

The transmitter 1A, as shown in FIG. 1, comprises a controller 11A, an error-correction encoder 12, an interleaver 13, a framing/spreading unit 14A, a radio frequency transmitter 15, etc. Through negotiations with the receiver 2A, the controller 11A principally controls the operations of the interleaver 13, the framing/spreading unit 14A, and the radio frequency transmitter 15. Through negotiations with the receiver 2A, this controller 11A instructs, using frame numbers, objects for interleaving appropriate for a normal mode (a non-compressed mode) and compressed mode. Furthermore, this controller 11A instructs a transmission timing to the framing/spreading unit 14A, in order to reduce the spreading factor and transmit a compressed mode frame in the compressed mode. Furthermore, the controller 11A instructs to the radio frequency transmitter 15 to increase the average transmission power when transmitting the compressed mode frame.

The error-correction encoder 12 error-correct encodes the transmitted data stream, thereby obtaining coded data. In order to be able to minimize the effect of transmission errors when continuous bits of a transmitted signal are lost or the like, for instance as a result of fading, the interleaver 13 interleaves the temporal sequence of the coded data in bit units.

This interleaver 13 has a memory for interleaving two frames. When the controller 11A has instructed frame number "1" for interleaving, the interleaver 13 interleaves one frame in the normal mode. On the other hand, when the frame number "2" has been instructed, the interleaver 13 interleaves across two frames in the compressed mode.

The framing/spreading unit 14A spreads the band in correspondence with the normal mode and the compressed mode, using a spreading code for each user, and forms a frame corresponding to each mode. When the controller 11A has instructed transmission timing in correspondence with each of the modes, the framing/spreading unit 14A sends the frame to the radio frequency transmitter 15 in accordance with the instructed transmission timing.

Furthermore, in the compressed mode, the framing/spreading unit 14A receives a command from the controller 11A to reduce the spreading factor, and obtains a transmission signal using a lower spreading factor than the normal mode, in accordance with that command. The radio frequency transmitter 15 converts the transmission signal obtained by the framing/spreading unit 14A to a radio frequency, and transmits it. In compliance with the controller 11A, this radio frequency transmitter 15 outputs the transmission signal after increasing the average transmission power in the compressed mode to higher than that in the normal mode.

As shown in FIG. 1, the receiver 2A comprises a controller 21A, an error-correction decoder 22, a deinterleaver 23, a deframing/de-spreading unit 24A, a radio frequency receiver 25, etc. Through negotiations with the transmitter 1A, the controller 21A principally controls the operations of the deinterleaver 23 and the deframing/de-spreading unit 24A. Through negotiations with the transmitter 1A, the controller 21A specifies, using frame numbers, objects for deinterleaving appropriate for the normal mode and the compressed mode. Furthermore, this controller 21A instructs a transmission timing to the deframing/de-spreading unit 24A, in order to reduce the spreading factor and transmit a compressed mode frame in the compressed mode. Furthermore, in the compressed mode, the controller 11A instructs to the radio frequency transmitter 15 a decrease in the spreading factor and a reception timing for receiving the compressed mode frame.

The radio frequency receiver 25 demodulates received signals sent from an antenna not shown in the diagram. The deframing/de-spreading unit 24A de-spreads using spreading codes allocated to the users of the receiver 2A in correspondence with normal mode and compressed mode, and creates a frame for each mode. When the controller 21A specifies the reception timings for each mode, the deframing/de-spreading unit 24A extracts a reception signal from the radio frequency receiver 25 at the instructed timing. Furthermore, in the compressed mode, the deframing/de-spreading unit 24A receives a command from the controller 11A to reduce the spreading factor, and obtains a reception signal using a lower spreading factor than in the normal mode, in accordance with that command.

The deinterleaver 23 interleaves the temporal sequence of the coded data in bit units, in the reverse order to the interleaving in the transmitter 1A (deinterleaving). Like the interleaver 13 mentioned above, the deinterleaver 23 has a memory for deinterleaving two frames. When the controller 21A has instructed frame number "1" for deinterleaving, the deinterleaver 23 deinterleaves one frame in normal mode. On the other hand, when the frame number "2" has been instructed, the deinterleaver 23 deinterleaves across two frames in the compressed mode. The error-correction decoder 22 error-correct decodes the deinterleaved signal, thereby obtaining a decoded data, i.e. a received data stream.

Next, the interleaver 13 and the deinterleaver 23 will be explained. FIG. 2 is a diagram explaining memory distribution of the interleaver according to the first embodiment, FIG.

2(a) illustrates the area used in normal mode, and FIG. 2(b) illustrates the area used in compressed mode. In FIG. 2, a memory 131A provided with the interleaver 13 is shown. The deinterleaver 23 also comprises a memory having the same memory size as that of the interleaver 13. In the first embodiment, since interleaving is performed across two frames in the compressed mode, two-frame memory sizes in correspondence with an interleaving size corresponding to two frames are set in the interleaver 13 and the deinterleaver 23 respectively.

When interleaving (see FIG. 2(a)) in normal mode, only one frame (half) of the memory 131A is used, and interleaving is performed within that frame. By contrast, in compressed mode (see FIG. 2(b)), two frames (all) of the memory 131A are used, and interleaving is performed in those two frames. Similarly, in the deinterleaver 23, the area of memory used is altered in correspondence with the mode, as in the interleaver.

Figure 3:
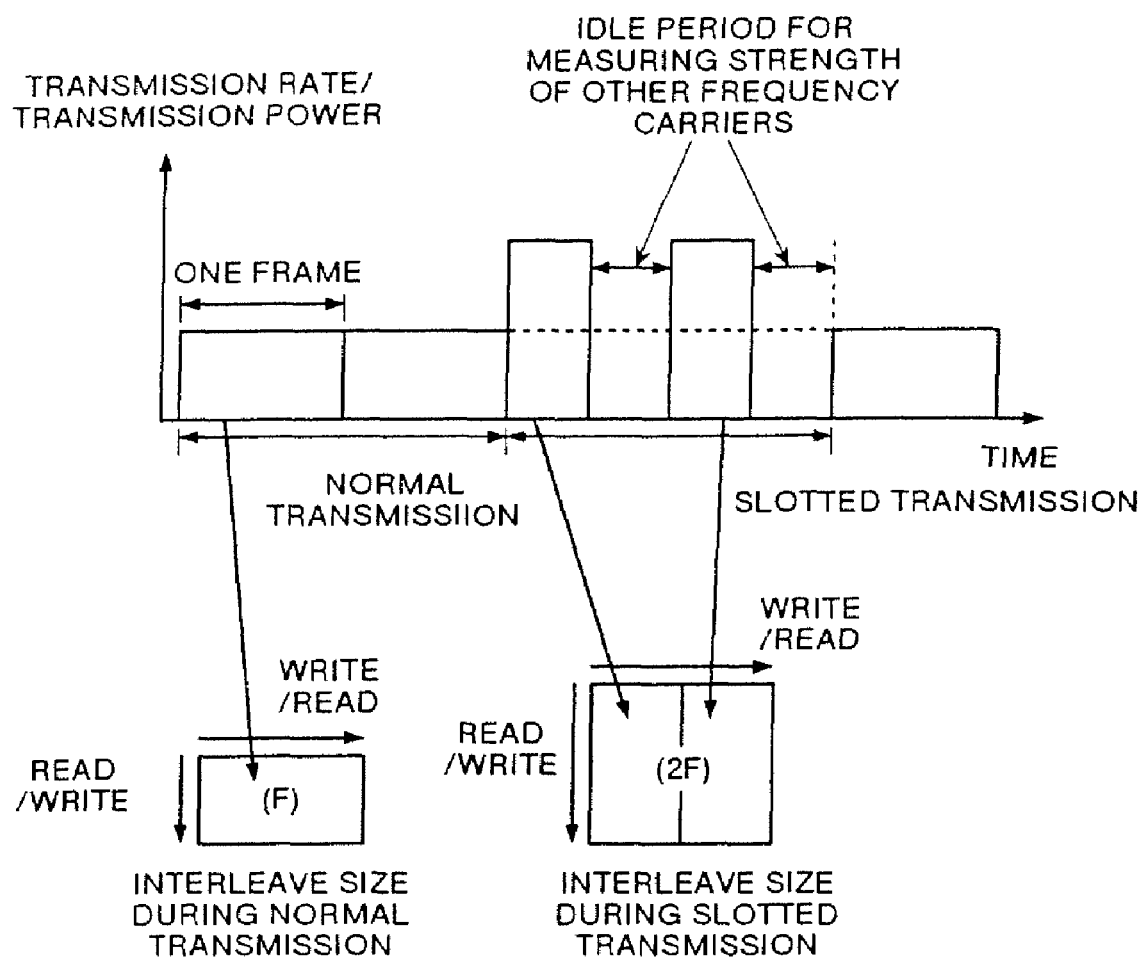
FIG. 3 is a diagram explaining frame transmission of a downlink according to the first embodiment.

Next, frame transmission including compressed mode will be explained. FIG. 3 is a diagram explaining frame transmission of a downlink according to the first embodiment. In FIG. 3, the vertical axis represents transmission rate/transmission power, and the horizontal axis represents time. Furthermore, in FIG. 3, F represents one frame. In a CDMA system, during normal transmission, a period of time is provided to slot the frame and transmit it intermittently, and the strength of the other frequency carriers is measured using non-transmission duration during that period.

For this purpose, the slotted frame must be compressed, and as shown in FIG. 3, the transmission duration of a compressed frame is half of the normal transmission duration. In this case, if interleaving is performed in the same manner as in normal transmission, there will only be half the necessary interleaving time, making it impossible to achieve adequate interleaving effects.

Accordingly, to secure sufficient time for interleaving, in compressed mode the transmitter 1A and the receiver 2A double the areas used in the memories of the interleaver 13 and the deinterleaver 23, and interleave across two frames. The interleaving time needed in compressed mode can be determined easily from the ratio between the size of one frame and the compressed mode frame.

Figure 4:
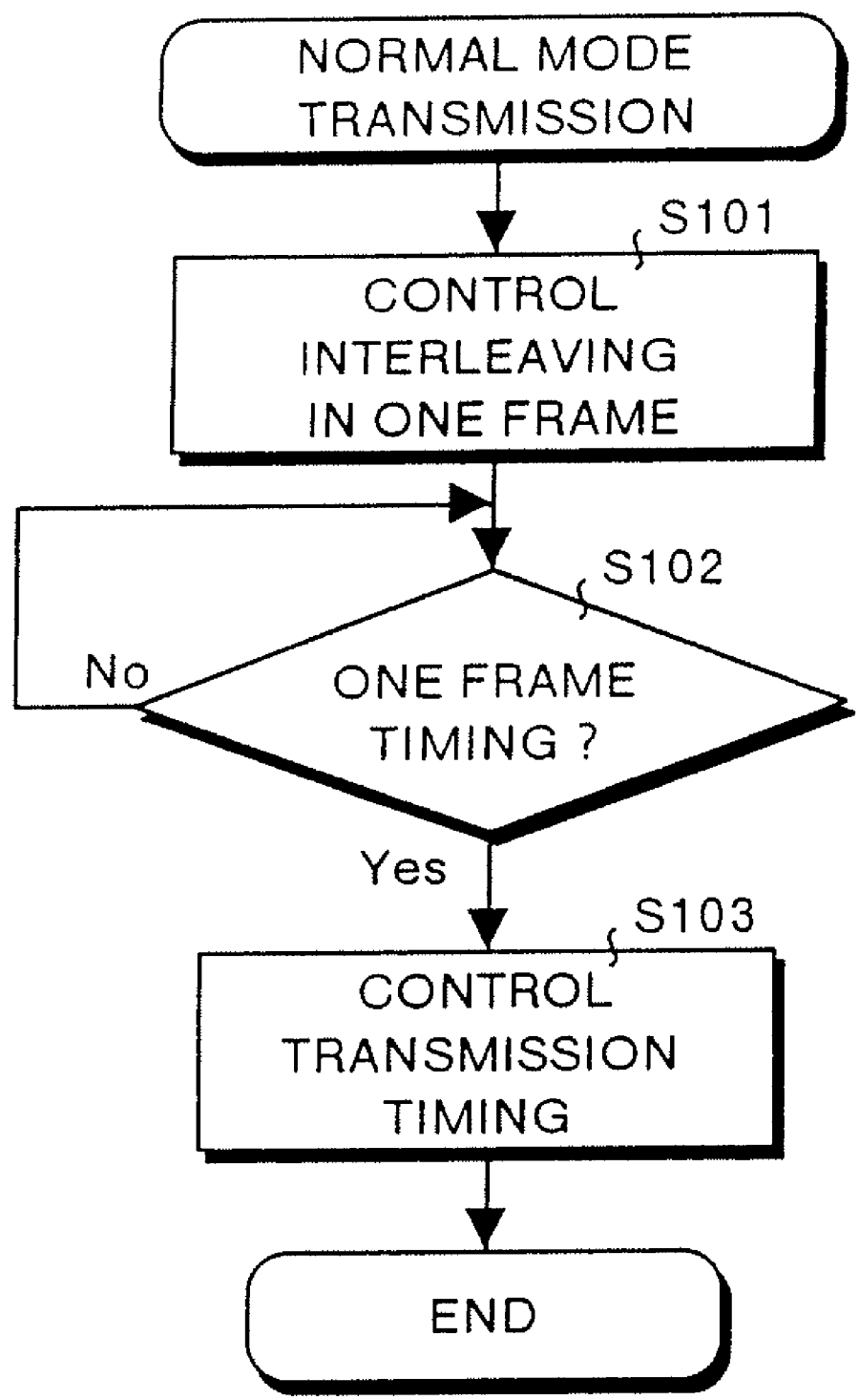
FIG. 4 is a flowchart explaining a transmission operation in a normal mode according to the first embodiment.
Figure 5:
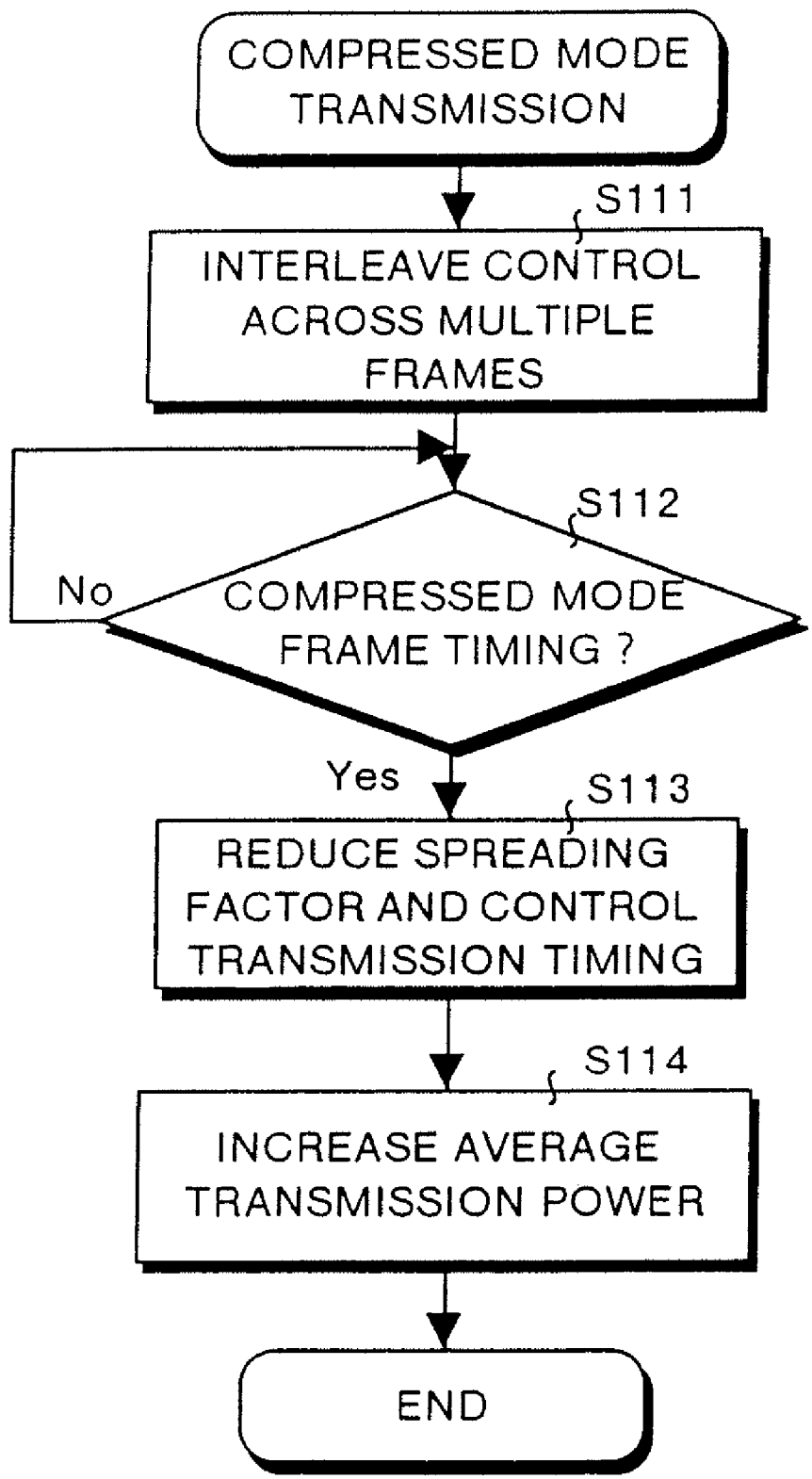
FIG. 5 is a flowchart explaining a transmission operation in a compressed mode according to the first embodiment.

Next, the transmission operation of the transmitter 1A will be explained. FIG. 4 is a flowchart explaining a transmission operation in normal mode, and FIG. 5 is a flowchart explaining a transmission operation in compressed mode. The execution of the operations of FIG. 4 and FIG. 5 is controlled by the controller 11A, the individual operations being performed by various sections.

In the normal mode (see FIG. 4), frame number "1" is instructed to the interleaver 13 (Step S101), and the interleaver 13 interleaves one frame. Then, when the time reaches to a time required for transmitting one frame (Step S102), a transmission on next frame is instructed to the framing/spreading unit 14A (Step S103). In this way, in normal mode, frames are transmitted continuously.

Furthermore, in the compressed mode (see FIG. 5), multiple frames, that is, frame number "2" is instructed to the interleaver 13 (Step S111), and the interleaver 13 interleaves across two frames. Then, when the time reaches to a time required for transmitting a half-frame, that is, compressed mode frame timing (Step S112), a reduction in the spreading factor and a transmission timing are instructed to the framing/spreading unit 14A (Step S113). Moreover, an increase in the average transmission power is instructed to the radio frequency transmitter 15 (Step S114). In this way, in the compressed mode, frames are transmitted intermittently (non-continuously).

Figure 6:
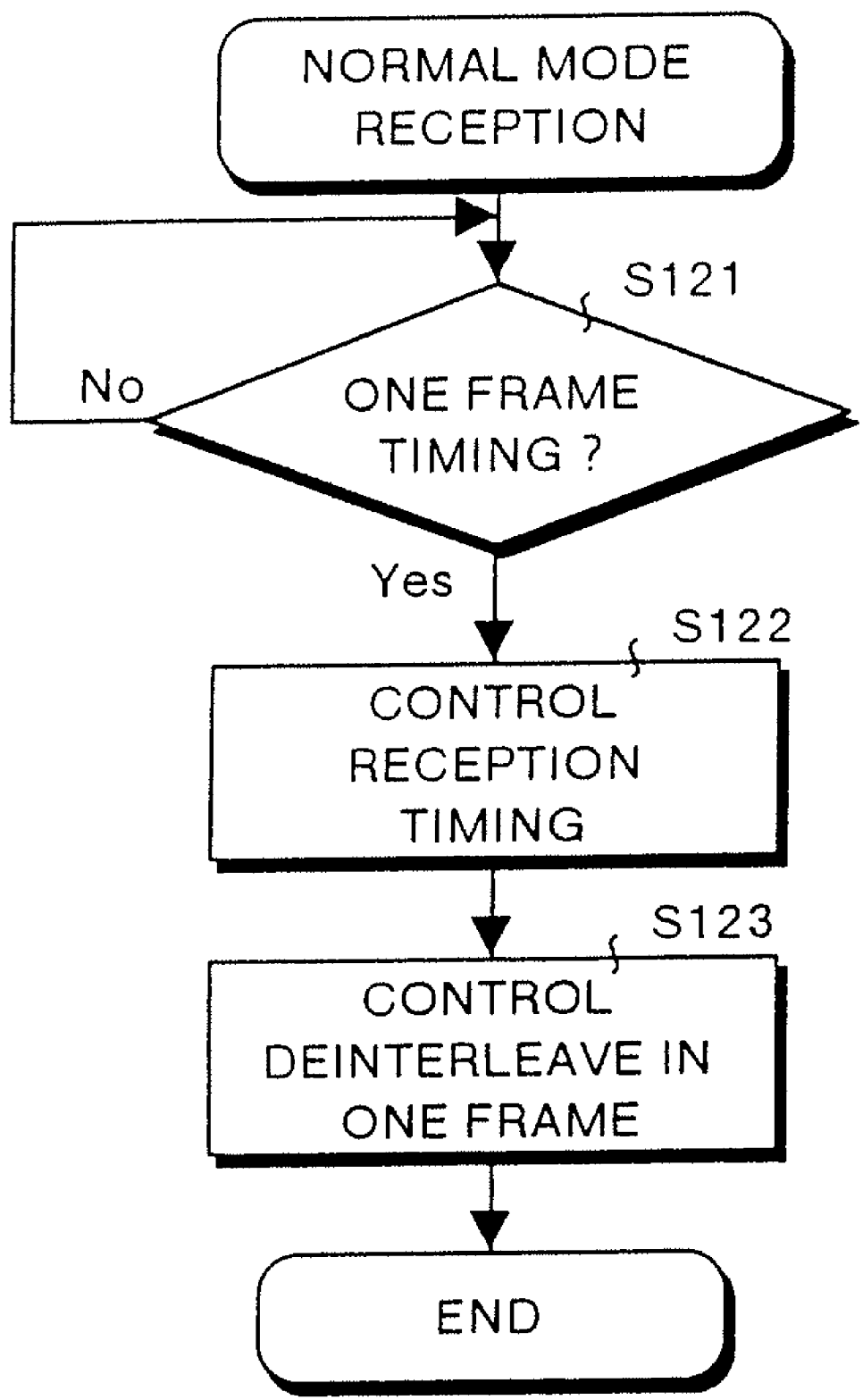
FIG. 6 is a flowchart explaining a reception operation in the normal mode according to the first embodiment.
Figure 7:
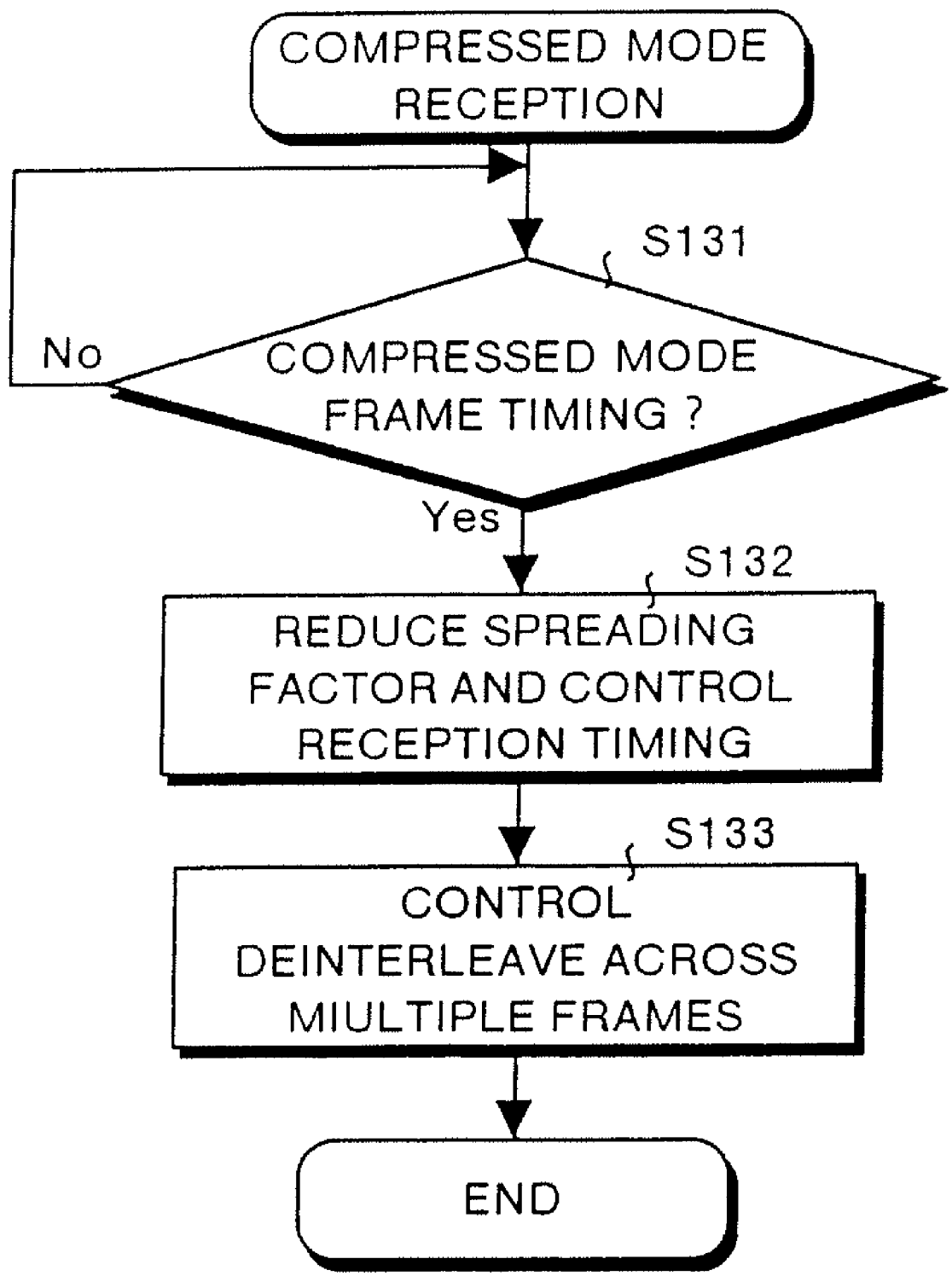
FIG. 7 is a flowchart explaining a reception operation in the compressed mode according to the first embodiment.

Next, the reception operation of the receiver 2A will be explained. FIG. 6 is a flowchart explaining the reception operation in normal mode, and FIG. 7 is a diagram explaining the reception operation in compressed mode. The operations of FIG. 6 and FIG. 7 are executed under the control of the controller 21A although the individual operations are performed by various sections. In the normal mode (see FIG. 6), when the time reaches one frame timing (Step S121), a reception timing is instructed to the deframing/de-spreading unit 24A (Step S122). Then, a frame number "1" is instructed to the deinterleaver 23 (Step S123), and the deinterleaver 23 deinterleaves one frame. In this way, in normal mode, frames are received continuously.

Furthermore, in the compressed mode (see FIG. 7), when the time reaches a half-frame, that is, compressed mode frame timing (Step S131), a reduction in the spreading factor and a reception timing are instructed to deframing/de-spreading unit 24A (Step S132). Then, multiple frames, that is, frame number "2" is instructed to the deinterleaver 23 (Step S133), and the deinterleaver 23 deinterleaves across two frames. In this way, in the compressed mode, frames are received intermittently (non-continuously).

As described above, according to the first embodiment, in compressed mode, interleaving bit units crossing multiple frames are controlled in order to minimize the effects of transmission errors, thereby making it possible to secure appropriate interleaving time in the compressed mode as in the normal mode. As a consequence, it is possible to prevent poor performance caused by interleaving of bit units.

Furthermore, since the memory size corresponds to the number of frames to be interleaved in the compressed mode, it is possible to interleave bits units in a number of frames sufficient to minimize the effects of transmission errors when transmission in the compressed mode.

In the first embodiment described above, the size of the memory for interleaving and deinterleaving in the compressed mode is increased, securing an appropriate interleaving time in correspondence with the size of the interleaving, but the present invention is not restricted to this, and it is acceptable to secure an appropriate interleaving time by changing the method of transmitting the compressed mode frame without increasing the size of the memory, as in a second embodiment explained later. Since the entire constitution of the second embodiment of the present invention is the same as the first embodiment already explained, the following description covers only those features of the constitution and operation which differ from the first embodiment. Furthermore, identical components are represented by the same reference numerals.

Figure 8:
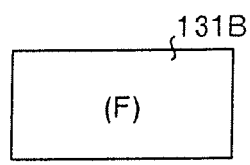
FIG. 8 is a block diagram showing primary parts of a CDMA system according to a second embodiment of the present invention.

Here, only the primary constitution will be explained. FIG. 8 is a block diagram showing primary parts of a CDMA system according to the second embodiment of the present invention. In the CDMA system of the second embodiment, the difference from the first embodiment already described is the size of the memory 131B of the interleaver 13, which here is one frame. Furthermore, although not depicted in the diagram, the deinterleaver 23 of the receiver also has a memory size of one frame, to match that of the interleaver 13.

Figure 9:
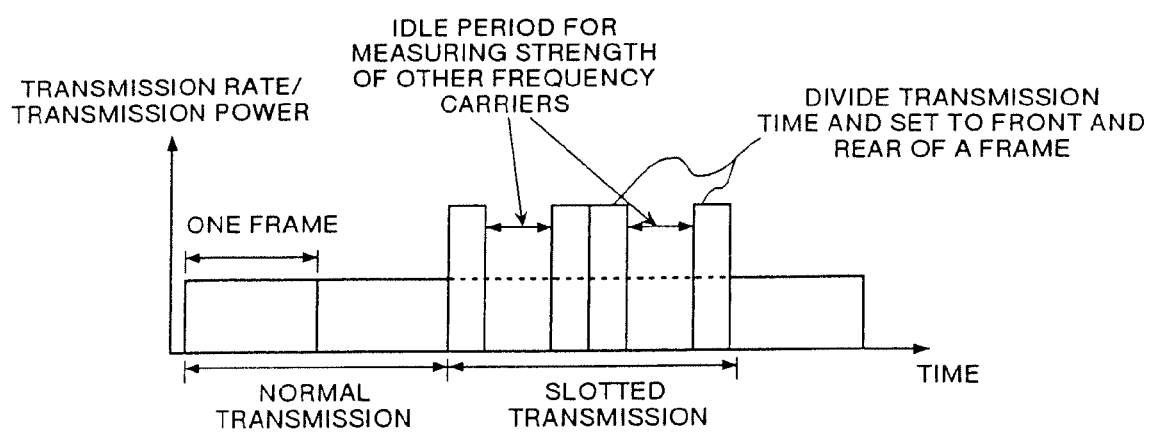
FIG. 9 is a diagram explaining frame transmission of a downlink according to the second embodiment.

Next, frame transmission including the compressed mode will be explained. FIG. 9 is a diagram explaining frame transmission of a downlink according to the second embodiment. In FIG. 9, the vertical axis represents transmission rate/transmission power, and the horizontal axis represents time. In the CDMA system, during normal transmission, a period of time is provided to slot the frame and transmit it intermittently, and the strength of the other frequency carriers is measured using the fact that frames are not transmitted during that period. For this purpose, the slotted frame must be compressed, but if interleaving is performed in the same manner as in normal transmission, the interleaving time will be insufficient, and it will be impossible to obtain an adequate interleaving effect.

Accordingly, the transmission timing of the compressed frame is divided, and one part is allocated to the head of the frame, the other is allocated to the end of the same frame, securing the desired interleaving time. At the receiver, this operation is performed in reverse. As in the first embodiment, the time needed for interleaving in compressed mode can be determined easily from the ratio between the size of one frame and the compressed mode frame.

Figure 10:
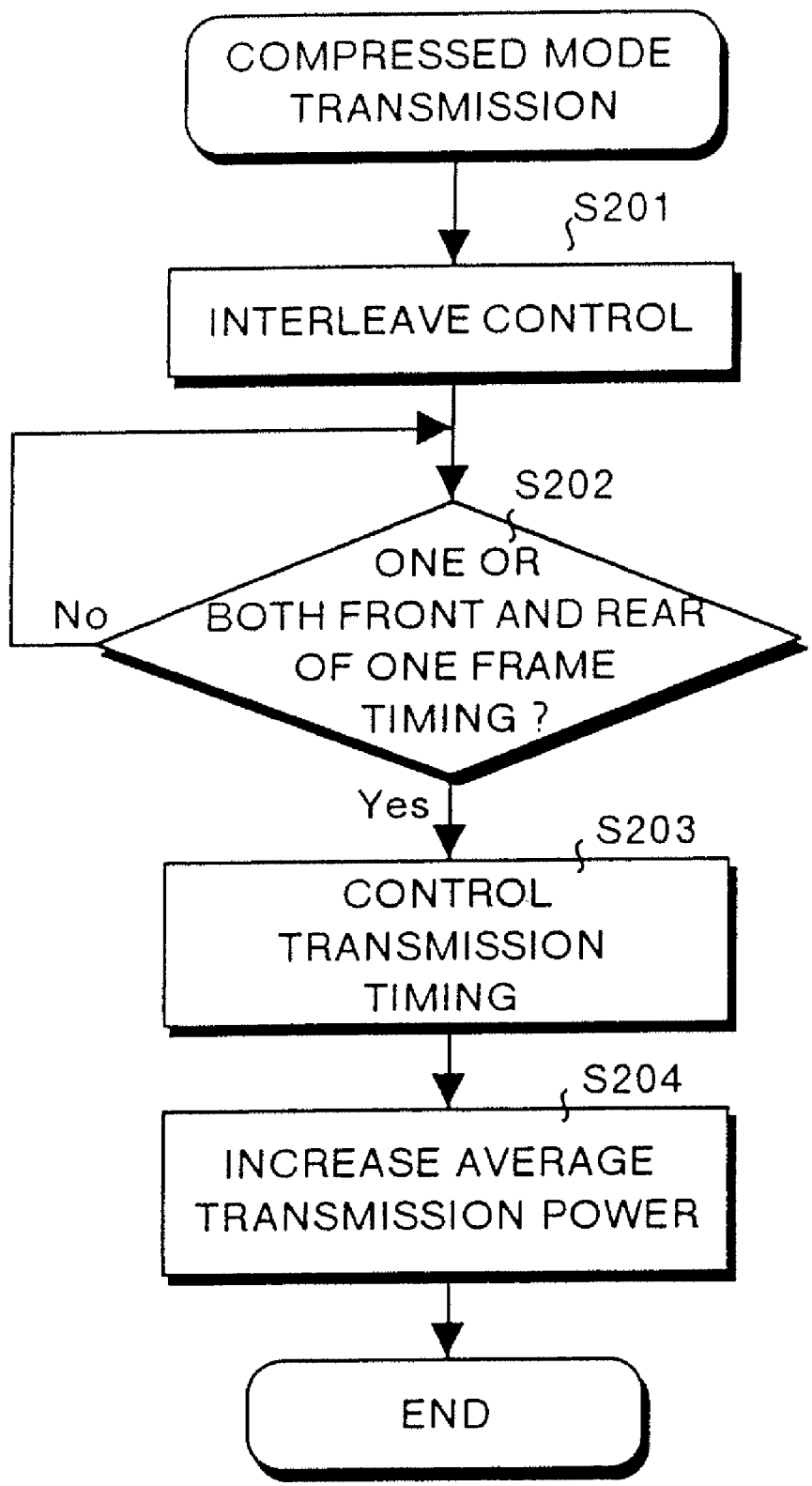
FIG. 10 is a flowchart explaining a transmission operation in the compressed mode according to the second embodiment.
Figure 11:
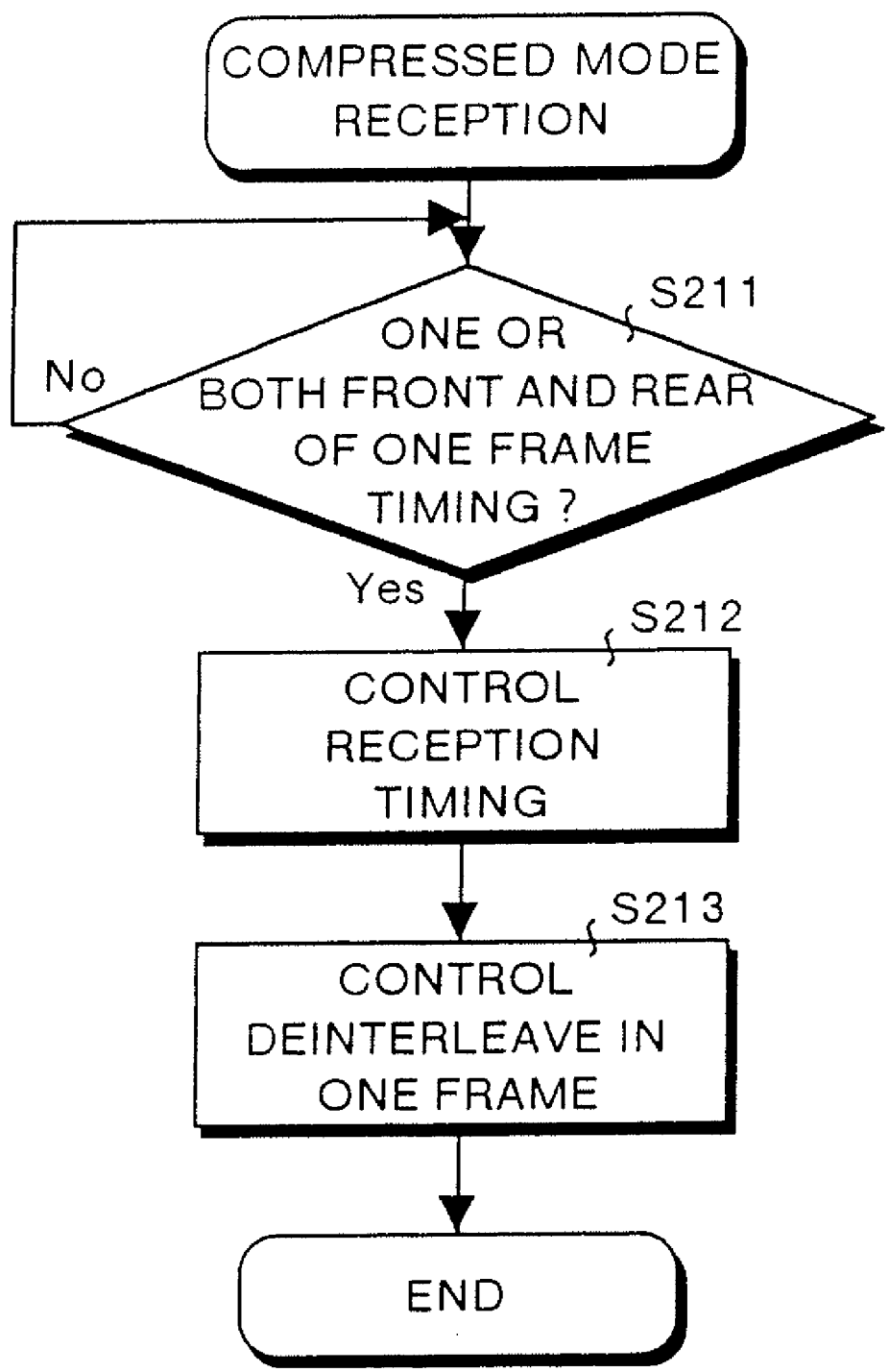
FIG. 11 is a flowchart explaining a reception operation in the compressed mode according to the second embodiment.

Next, the operation will be explained. Here, only the operation in compressed mode will be explained. FIG. 10 is a flowchart explaining the transmission operation in compressed mode, and FIG. 11 is a flowchart explaining the reception operation in compressed mode. In the compressed mode (see FIG. 10) at the transmitter, interleaving in one frame is instructed to the interleaver 13 (Step S201), and the interleaver 13 interleaves one frame.

Then, when the time reaches any one of the front and rear timings of the one-frame timing (Step S202), a transmission timing is instructed to the framing/spreading unit 14A (Step S203). Moreover, an increase in the average transmission power is instructed to the radio frequency transmitter 15 (Step S204), and the compressed mode frame is frame-transmitted at high transmission power. In this way, frames are transmitted intermittently (non-continuously) in the compressed mode.

On the other hand, in the compressed mode at the receiver (see FIG. 11), when the time reaches any one of the front and rear timings of the one-frame timing (Step S211), a reception timing is instructed to the deframing/de-spreading unit 24A (Step S212). Then, after the signal of one frame has been received, a one-frame deinterleaving is instructed to the deinterleaver 23 (Step S213), and the deinterleaver 23 deinterleaves one frame. In this way, frames are received intermittently (non-continuously) in the compressed mode.

As explained above, according to the second embodiment, in the compressed mode, a frame which has been interleaved in bit units is compressed, arranged into front and rear in the same frame timing as in normal mode, and intermittently transmitted in compliance with that arrangement. Therefore, it is possible to secure an appropriate interleaving time in compressed mode, in the same way as in normal mode, with a simple interleaving constitution. Consequently, poor performance caused by interleaving in bit units can be prevented.

Furthermore, it is also possible in the second embodiment to prepare the memory sizes shown in FIG. 2, and control interleaving of bit units crossing multiple frames in the compressed mode. In this case, as in the first embodiment described above, it is possible to secure an appropriate interleaving time in the compressed mode, as in the normal mode, and to reduce transmission errors resulting from interleaving in bit units.

In the first embodiment already explained, to perform interleaving and deinterleaving in the compressed mode, the size of memory is increased and an interleaving time appropriate for the size of the interleaving is secured, but the present invention is not restricted to this, and it is acceptable to secure an appropriate interleaving time by a compressed mode frame transmission method different to that of the second embodiment described above, as in a third embodiment described below. Since the entire constitution of the third embodiment of the present invention is the same as the second embodiment already explained, the following description covers only those features of the operation which differ from the second embodiment.

Figure 12:
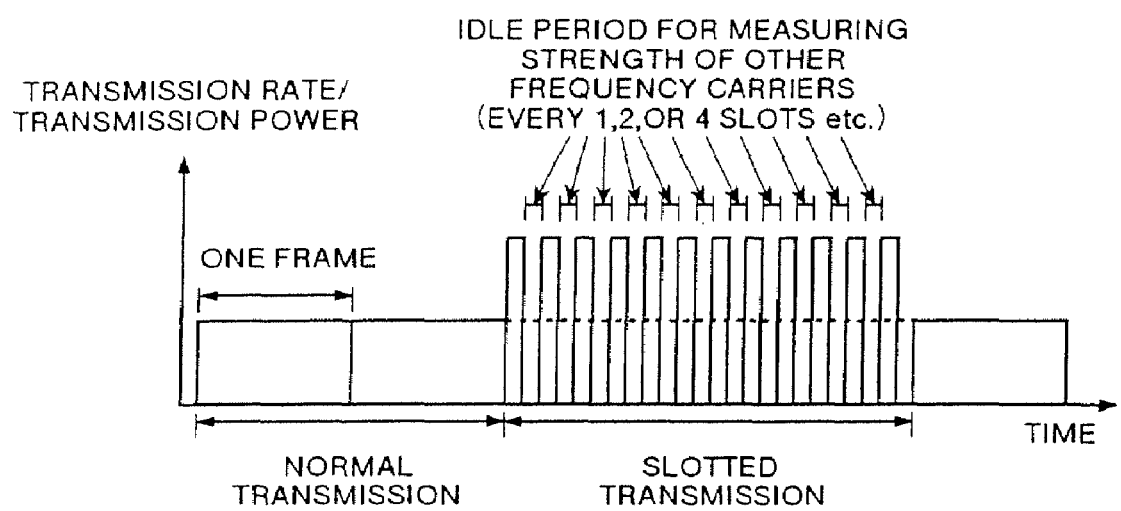
FIG. 12 is a diagram explaining frame transmission of a downlink according to a third embodiment.

Firstly, frame transmission including compressed mode will be explained. FIG. 12 is a diagram explaining frame transmission of a downlink according to the third embodiment. In FIG. 12, the vertical axis represents transmission rate/transmission power, and the horizontal axis represents time. In the CDMA system, during normal transmission, a period of time is provided to slot the frame and transmit intermittently, and the strength of other frequency carriers is measured using the fact that frames are not transmitted during that period. For this purpose, the slotted frame must be compressed, but if interleaving is performed in the same manner as in normal transmission, there will only be half the necessary interleaving time, making it impossible to achieve adequate interleaving effects.

Accordingly, the transmission duration of the compressed frame is divided in correspondence with multiple slots, and the non-transmission period (idle period for measuring) is reduced so as not to affect the transmission power control, securing the desired time for interleaving. In the receiver, this operation is performed in reverse. As in the first embodiment, the time needed for interleaving in compressed mode can be determined easily from the ratio between the size of one frame and the compressed mode frame.

Furthermore, the slot number N (where N is a natural number) forming the transmission unit in compressed mode is determined in accordance with the relationship between the measuring time of the strength of other frequency carriers and the transmission power control margin of error. For instance, when N=1 it indicates every slot, N=2 indicates every two slots, and N=4 indicates every four slots. Here, N=1, 2, and 4 are just the examples and it is also possible to handle other slot numbers.

Figure 13:
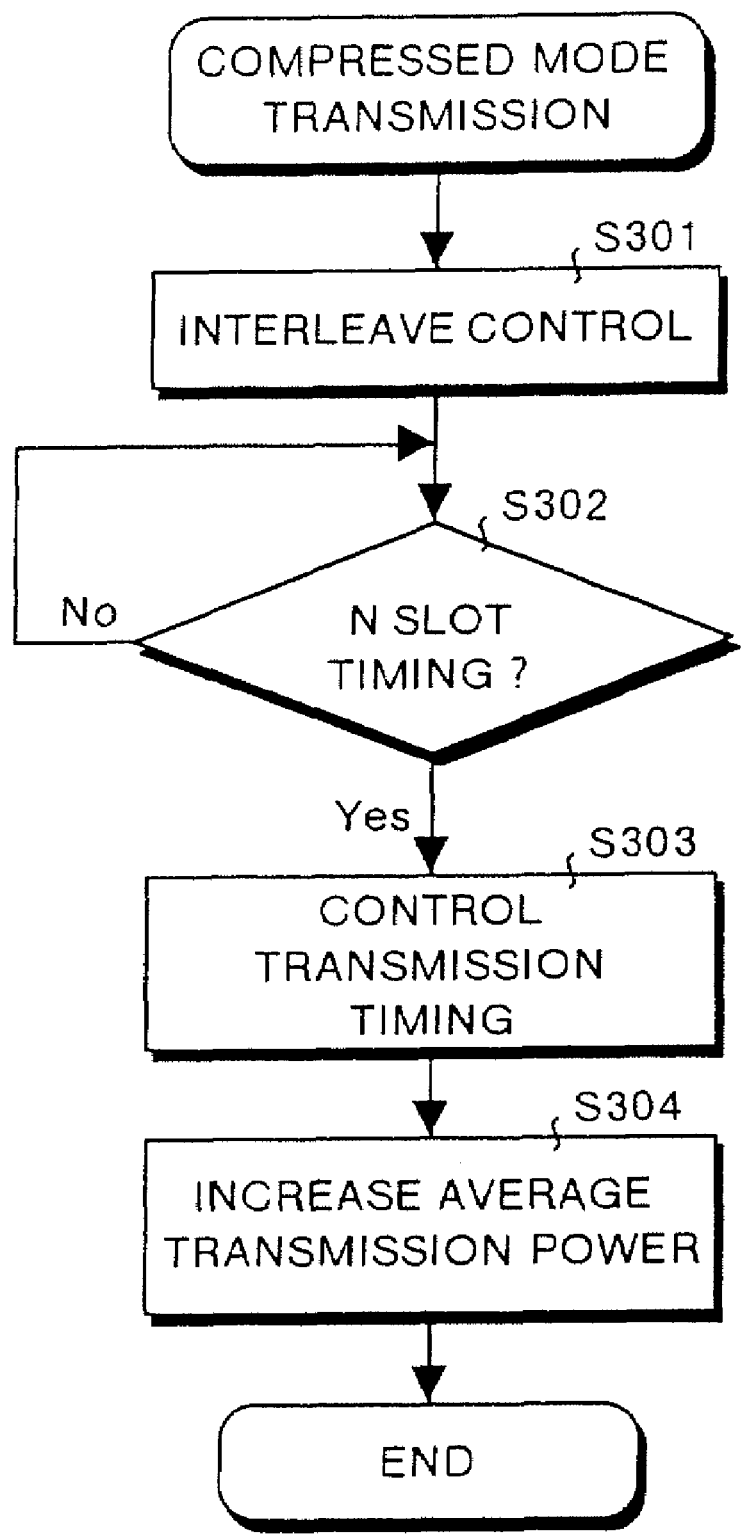
FIG. 13 is a flowchart explaining a transmission operation in the compressed mode according to the third embodiment.
Figure 14:
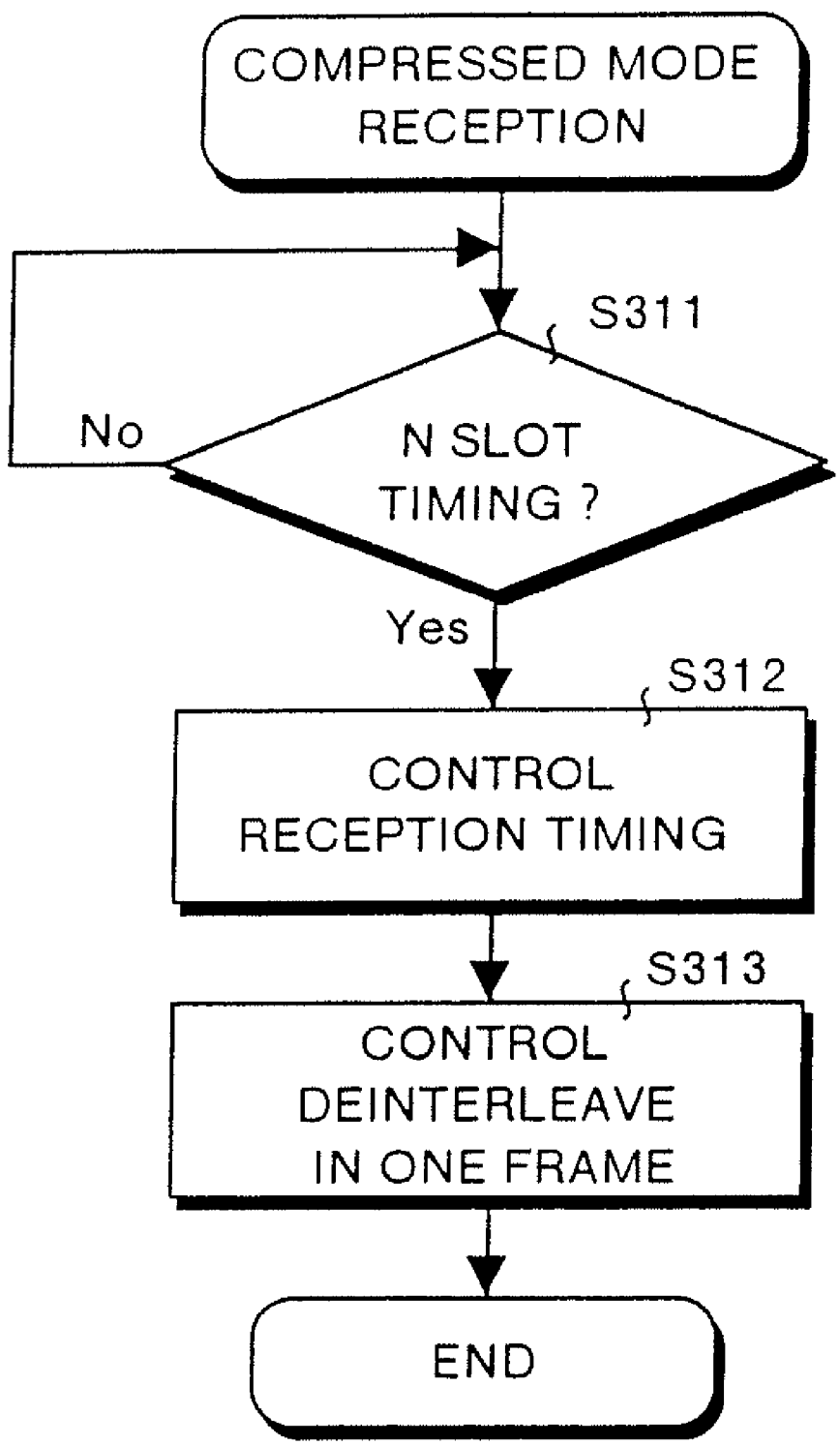
FIG. 14 is a flowchart explaining a reception operation in the compressed mode according to the third embodiment.

Next, the operation will be explained. Here, only the operation in compressed mode will be explained. FIG. 13 is a flowchart explaining the transmission operation in compressed mode, and FIG. 14 is a flowchart explaining the reception operation in compressed mode. In the compressed mode at the transmitter (see FIG. 13), interleaving in one frame is instructed to the interleaver 13 and the interleaver 13 interleaves one frame (Step S301).

Then, when the time reaches the N slot timing which forms the transmission unit in the compressed mode (Step S302), a transmission timing is instructed to the framing/spreading unit 14A (Step S303). Moreover, an increase in the average transmission power is instructed to the radio frequency transmitter 15 (Step S304), and the compressed mode frame is frame-transmitted at high transmission power. In this way, frames are transmitted intermittently (non-continuously) in the compressed mode.

On the other hand, in the compressed mode of the receiver (see FIG. 14), when the time reaches the N slot timing (Step S311), a reception timing is instructed to the deframing/de-spreading unit 24A (Step S312). Then, after the signal of one frame has been received, a one-frame deinterleaving is instructed to the deinterleaver 23 (Step S313), and the deinterleaver 23 deinterleaves one frame. In this way, frames are received intermittently (non-continuously) in the compressed mode.

As explained above, according to the third embodiment, in the compressed mode, since a compressed frame is slotted and intermittently transmitted in N slot units, it is possible to receive transmission power control bits transmission in the downlink in comparatively short time intervals. In this way, by controlling ON/OFF of each N slot, the margin of error of transmission power control can be reduced.

In particular, since the N slot unit is determined in accordance with the relationship between the measuring time of the strength of other frequency carriers and the transmission power control margin of error, it is possible to secure time in which the strength of other frequency carriers can be reliably measured, and also to reduce the transmission power control margin of error.

Furthermore, it is also possible in the third embodiment to prepare the memory sizes shown in FIG. 2, and control interleaving of bit units across multiple frames in the compressed mode. In this case, as in the first embodiment described above, it is possible to secure an appropriate interleaving time in the compressed mode, as in the normal mode, and to further reduce transmission errors resulting from interleaving in bit units.

In the embodiments one to three described above, the frame timing was changed in the normal mode and the compressed mode, but the present invention is not restricted to this, and it is acceptable to intermittently transmit with the same frame timing in compressed mode and normal mode, as in a fourth embodiment of the present invention described below.

Figure 15:
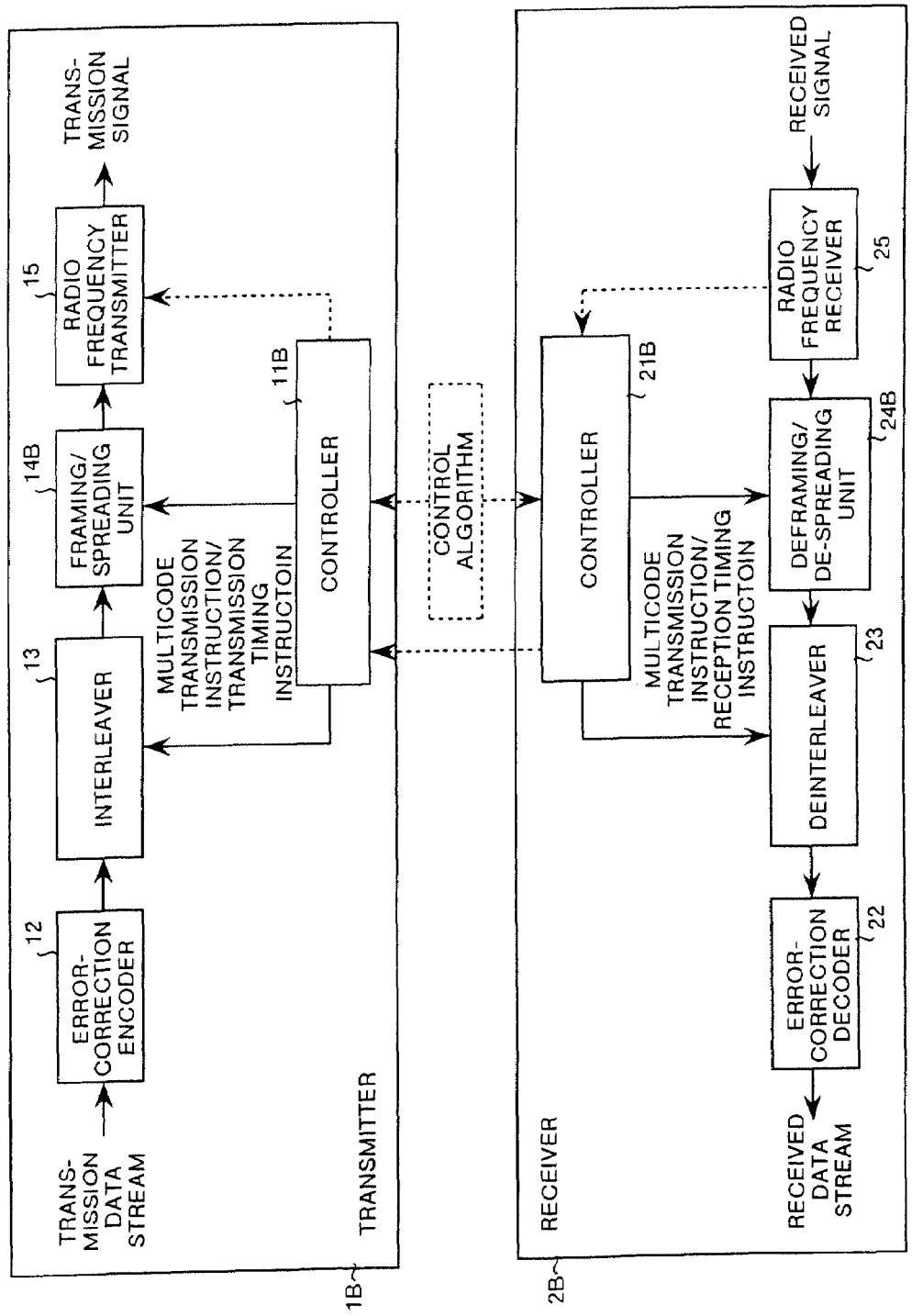
FIG. 15 is a block diagram showing a CDMA system according to a fourth embodiment of the present invention.

Firstly, the constitution of the CDMA system will be explained. FIG. 15 is a block diagram showing a CDMA system according to the fourth embodiment of the present invention. The CDMA system comprises a transmitter 1B and a receiver 2B. Such a CDMA system is provided with both base station and mobile stations. The base station and the mobile stations carry out radio communication using a CDMA communication method.

The transmitter 1B, as shown in FIG. 15, comprises a controller 11B, an error-correction encoder 12, an interleaver 13, a framing/spreading unit 14B, a radio frequency transmitter 15, etc. Through negotiations with the receiver 2B, the controller 11B mainly controls the operations of the interleaver 13, the framing/spreading unit 14B, and the radio frequency transmitter 15. In compressed mode, this controller 11B instructs to the framing/spreading unit 14B multi-code transmission for multiple frames to be code-multiplexed and transmission timings for transmitting compressed mode frames.

The error-correction encoder 12, the interleaver 13, and the radio frequency transmitter 15 are the same as in the first embodiment already described above, and explanation thereof will be omitted. As regards the interleaver 13, it has a memory for interleaving one frame.

The framing/spreading unit 14B spreads the band in correspondence with normal mode and compressed mode, using a spreading code for each user, and forms a frame corresponding to each mode. When the controller 11B has instructed transmission timing in correspondence with each of the modes, the framing/spreading unit 14B sends the frame to the radio frequency transmitter 15 in accordance with the instructed transmission timing. Furthermore, in the compressed mode, the framing/spreading unit 14B receives a command for multi-code transmission from the controller 11B, and code-multiplexes two post-interleave frames in accordance with that command.

In order to code-multiplex two frames, the framing/spreading unit 14B has a one-frame memory. That is, the interleaver 13 and the framing/spreading unit 14B each comprise a one-frame memory, enabling two frames to be code-multiplexed using a total memory size equivalent to two frames.

The receiver 2B, as shown in FIG. 15, comprises a controller 21B, an error-correction decoder 22, a deinterleaver 23, a deframing/de-spreading unit 24B, a radio frequency receiver 25, etc. Through negotiations with the transmitter 1B, the controller 21B mainly controls the operations of the deinterleaver 23 and the deframing/de-spreading unit 24B. In the compressed mode, this controller 21B instructs the deframing/de-spreading unit 24B of reception timings for receiving multi-code transmission and compressed mode frames.

The error-correction decoder 22, the deinterleaver 23, and the radio frequency transmitter 25 are the same as in the first embodiment already described above, and explanation thereof will be omitted. As regards the deinterleaver 23, it has a memory for interleaving one frame.

Like the framing/spreading unit 14B described above, the deframing/de-spreading unit 24B comprises a one-frame memory for deframing. When the controller 21B has instructed a reception timing in correspondence with each of the modes, the deframing/de-spreading unit 24B extracts the reception signal from the radio frequency receiver 25 in accordance with that reception timing. Furthermore, in the compressed mode, the deframing/de-spreading unit 24B receives a command for multi-code transmission from the controller 21B, separates the de-spread data into frame units in accordance with that command, and outputs the frames in sequence to the deinterleaver 23.

Figure 16:
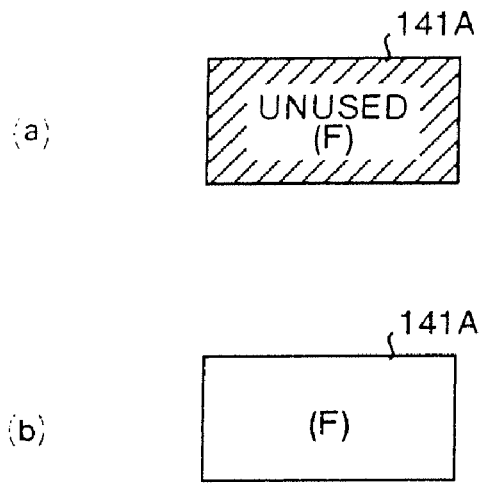
FIG. 16 is a diagram explaining memory distribution of a framing/spreading unit according to the fourth embodiment.

Next, the primary constitution of the framing/spreading unit 14B and the deframing/de-spreading unit 24B will be explained. FIG. 16 is a diagram explaining memory distribution of the framing/spreading unit 14B according to the fourth embodiment, wherein FIG. 16(a) illustrates the area used in normal mode, and FIG. 16(b) illustrates the area used in compressed mode. In FIG. 16, the framing/spreading unit 14B has a memory 141A. The deframing/de-spreading unit 24B also has a memory of the same memory size as that of the framing/spreading unit 14B.

In the fourth embodiment, since code-multiplexing is performed across two frames in the compressed mode, a one-frame memory size, in correspondence with a two-frame code-multiplexing size, is set in the both framing/spreading unit 14B and the deframing/de-spreading unit 24B. In fact, two-frame framing and deframing can be achieved using the one-frame memories of the interleaver 13 the deinterleaver 23.

In normal mode (see FIG. 16(a)), since code-multiplexing is not needed, framing and the like is carried out based on data interleaved by the interleaver 13 without using the memory 141A. On the contrary, in compressed mode (see FIG. 16(b)), a two-frame memory size is required to perform code-multiplexing, and therefore the memory 141A of the framing/spreading unit 14B is used in addition to the memory of the interleaver 13. Similarly, whether the memory is used or not in the deframing/de-spreading unit 24B also varies depending on the mode.

Figure 17:
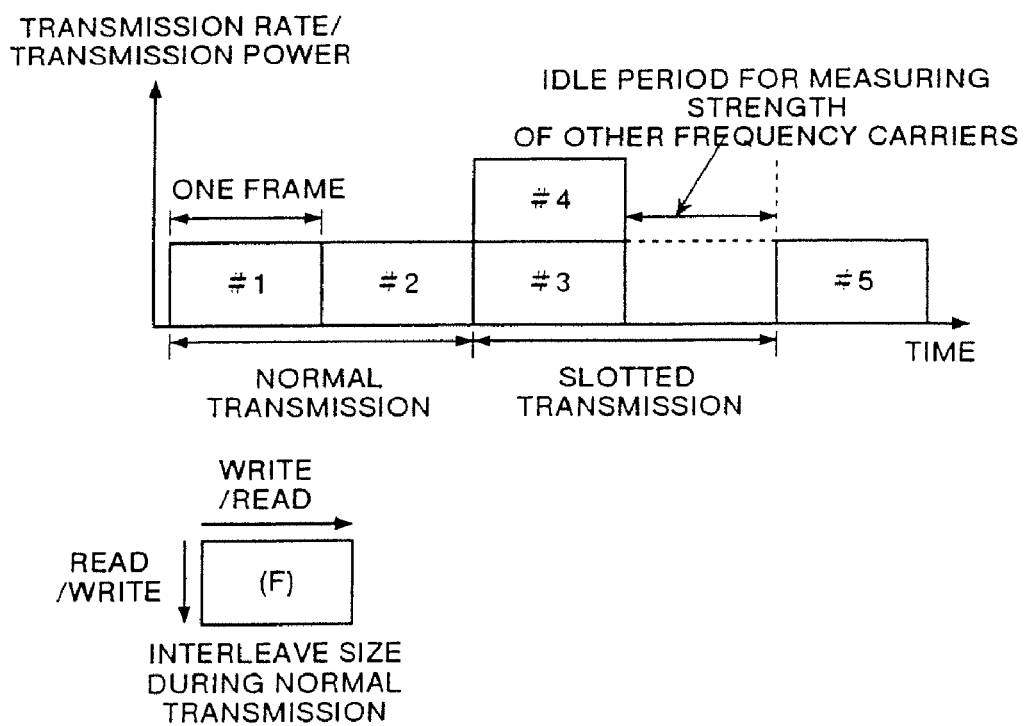
FIG. 17 is a diagram explaining frame transmission of a downlink according to the fourth embodiment.

Next, frame transmission including compressed mode will be explained. FIG. 17 is a diagram explaining frame transmission of a downlink according to the fourth embodiment. In FIG. 17, the vertical axis represents transmission rate/transmission power, and the horizontal axis represents time. Furthermore, in FIG. 17, F represents one frame. In the CDMA system, during normal transmission, a period of time is provided to slot the frame and transmit it intermittently, and the strength of other frequency carriers is measured using the fact that a frame is not transmitted during that period.

For this purpose, the slotted frame must be compressed, and in conventional methods, the transmission duration of a compressed frame becomes half of the normal transmission duration. In this case, if interleaving is performed in the same manner as in normal transmission, there will only be half of the necessary interleaving time, making it impossible to achieve adequate interleaving effects.

Accordingly, the transmitter 1B performs interleaving of the same size as in the normal mode, and code-multiplexes multiple frames in the frame timing, in order to secure the same timing for interleaving in the compressed mode as in the normal mode, in compressed mode. For instance, in the example shown in FIG. 17, in normal transmission (normal mode), post-interleaving frames are transmitted in a sequence of frames #1, #2, and thereafter, in slotted transmission (compressed mode), individually interleaved frames #3 and #4 are code-multiplexed together, and compressed frames are transmitted.

Figure 18:
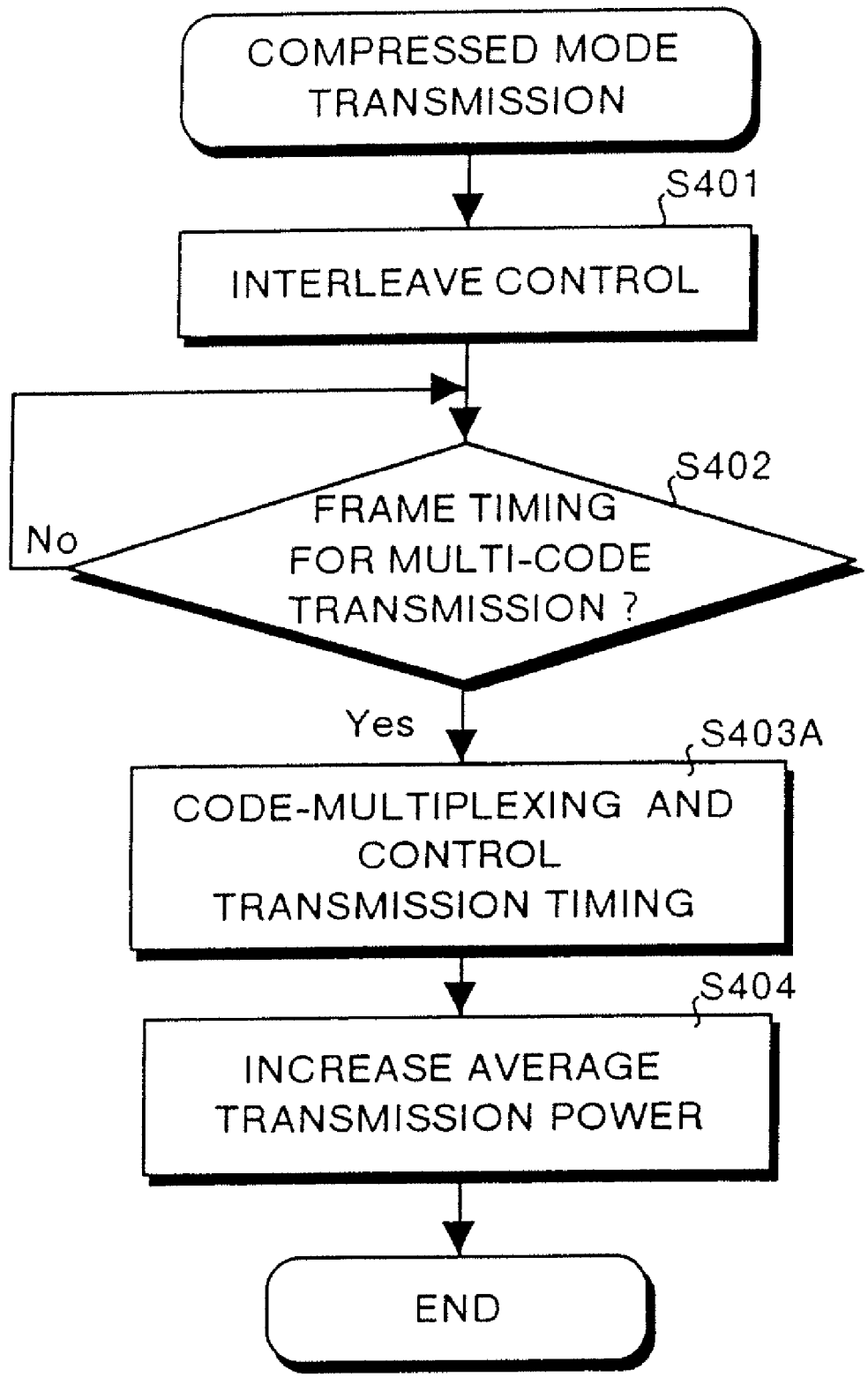
FIG. 18 is a flowchart explaining a transmission operation in the compressed mode according to the fourth embodiment.

Next, the operation will be explained. Since the transmission and reception is performed in the same manner as the conventional methods, explanation thereof will be omitted. Firstly, the transmission operation of the transmitter 1B will be explained. FIG. 18 is a flowchart explaining the transmission operation in compressed mode. The execution of the operation of FIG. 18 is controlled by the controller 11B although individual operations are performed by various sections. In the compressed mode, interleaving in one frame is instructed to the interleaver 13 (Step S401), and the interleaver 13 interleaves in one frame.

Then, when the time reaches a given frame timing for multi-code transmission (Step S402), multi-code transmission and transmission timings are instructed to the framing/spreading unit 14B (Step S403). Consequently, the framing/spreading unit 14B code-multiplexes two frames. In this way, in the compressed mode, frames are transmitted intermittently (non-continuously).

Figure 19:
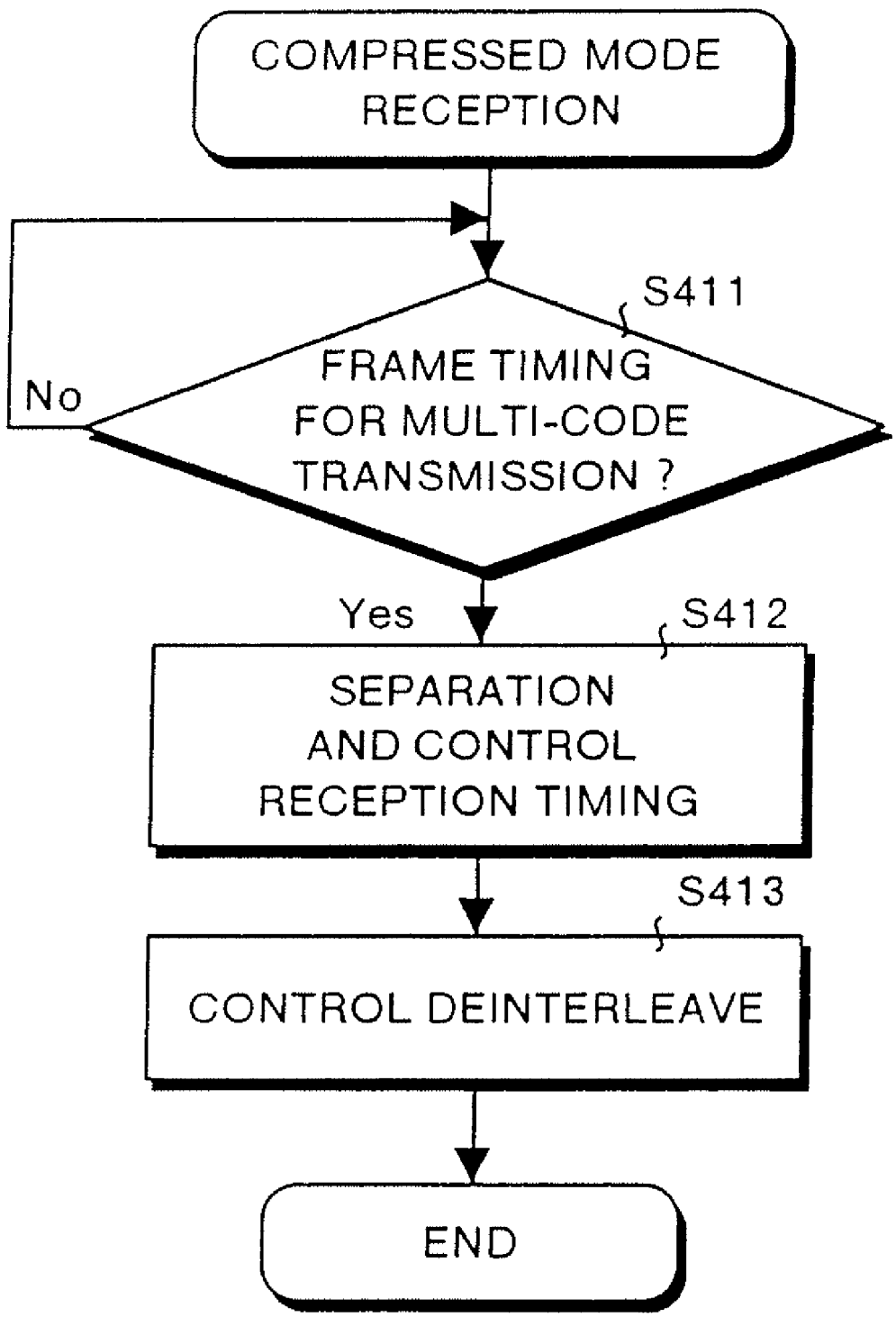
FIG. 19 is a flowchart explaining a reception operation in compressed mode according to the fourth embodiment.

Next, the reception operation of the receiver 2B will be explained. FIG. 19 is a flowchart explaining the reception operation in the compressed mode. The execution of the operation of FIG. 19 is controlled by the controller 21B although individual operations are performed by various sections. In the compressed mode, when the time reaches the frame timing for the multi-code transmission described above (Step S411), frame separation of received code-multiplexed data and a reception timing are instructed to the deframing/de-spreading unit 24B (Step S412).

Then, deinterleaving in the separated frames is instructed to the deinterleaver 23 (Step S413), and the deinterleaver 23 deinterleaves one frame. In this way, in the compressed mode, frames are received intermittently (non-continuously).

As described above, according to the fourth embodiment, in the compressed mode, multiple frames which have been interleaved in bit units to minimize the effects of transmission errors are compressed by code division multiplexing in the given frame timing prior to transmission. Therefore, it is possible to secure an appropriate interleaving time in the same way and using the same constitution in the compressed mode and the normal mode. In this way, by controlling ON/OFF in each compressed mode frame, poor performance caused by interleaving in bit units can be prevented.

Furthermore, since the memory size used corresponds to the number of frames to be code-multiplexed in the compressed mode, code-multiplexing can be performed reliably and without loss in the compressed mode.

Furthermore, it is also possible in the fourth embodiment to control interleaving of bit units across multiple frames in the compressed mode in the way as the first embodiment described above. In this case, it is possible to secure a longer time for interleaving by increasing the size of the memories of the interleaver and the deinterleaver in compressed mode than in the normal mode. As a consequence, transmission errors resulting from interleaving in bit units can be reduced. In particular, when code-multiplexed frames are interleaved by replacing other frames, places where multiple code-multiplexed frames are in error can be dispersed, improving the correcting result of the error-correction coding.

In the embodiments 1 to 4 described above, transmission power is increased in order to transmit frames in the compressed mode without information loss, but the present invention is not restricted to this, and it is acceptable to determine the amount of the transmission power after considering interference on other user channels caused by the amount of the transmission power, as described below in a fifth embodiment.

Figure 20:
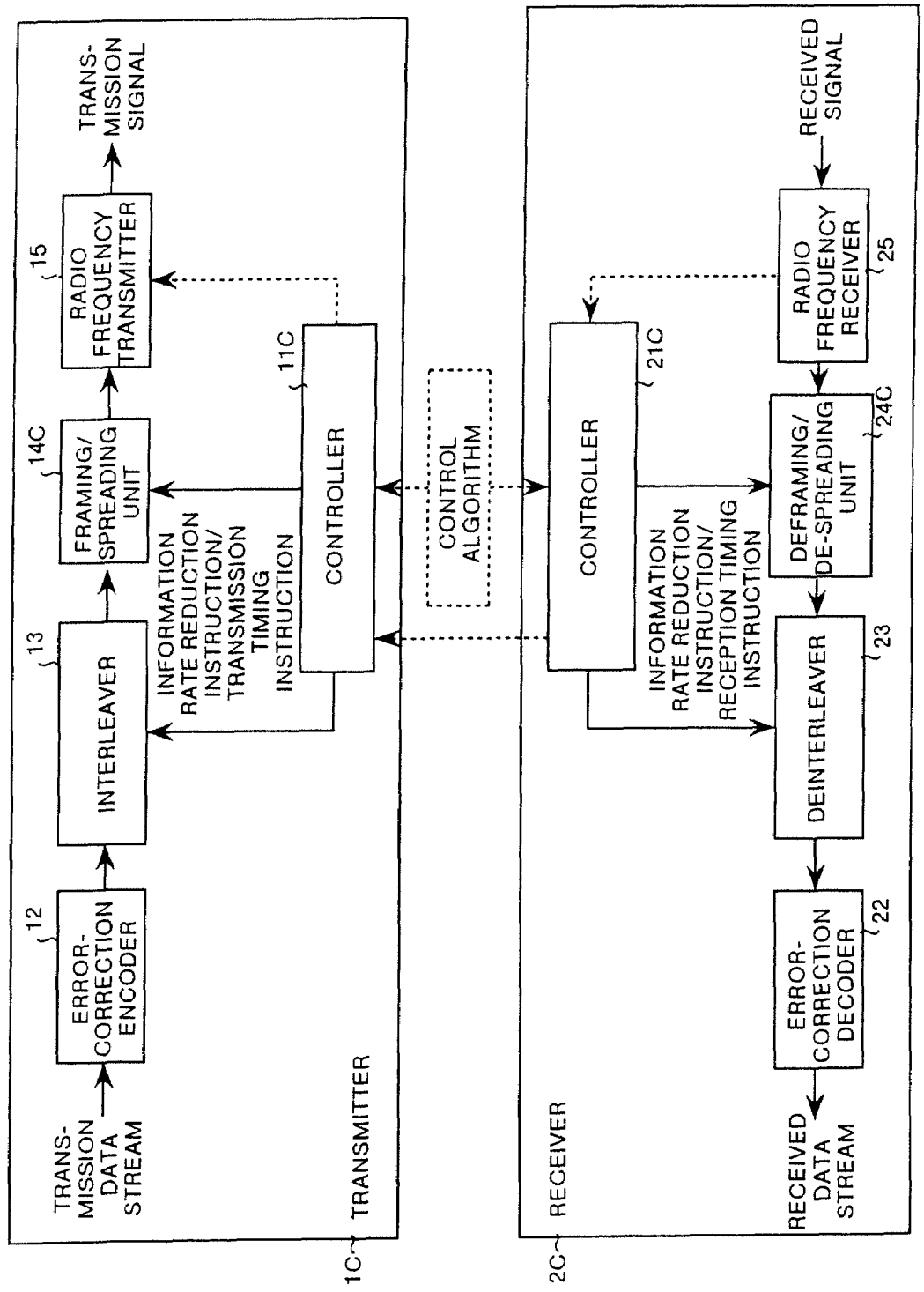
FIG. 20 is a block diagram of a CDMA system according to a fifth embodiment of the present invention.

Firstly, the constitution of the CDMA system will be explained. FIG. 20 is a block diagram showing a CDMA system according to a fifth embodiment of the present invention. The CDMA system comprises a transmitter 1C and a receiver 2C. Such a CDMA system is provided with both base station and mobile stations. The base station and the mobile stations carry out radio communication using a CDMA communication method.

As shown in FIG. 20, the transmitter 1C comprises a controller 11C, an error-correction encoder 12, an interleaver 13, a framing/spreading unit 14C, a radio frequency transmitter 15, etc. Through negotiations with the receiver 2C, the controller 11C mainly controls the operations of the interleaver 13, the framing/spreading unit 14C, and the radio frequency transmitter 15. In compressed mode, this controller 11C instructs to the framing/spreading unit 14C a reduction of information rate and transmission timings for transmitting compressed mode frames. Furthermore, this controller 11C differs from the one in embodiments 1 to 4 described above in that it does not generate a command to the radio frequency transmitter 15 to raise the transmission power in the compressed mode.

The error-correction encoder 12, the interleaver 13, and the radio frequency transmitter 15 are the same as in the first embodiment already described above, and explanation thereof will be omitted. As regards the interleaver 13, it has a memory for interleaving one frame.

The framing/spreading unit 14C spreads the band in correspondence with normal mode and compressed mode, using a spreading code for each user, and forms a frame corresponding to each mode. When the controller 11C has instructed a transmission timing in correspondence with each of the mode, the framing/spreading unit 14C sends the frame to the radio frequency transmitter 15 in accordance with that transmission timing. Furthermore, in the compressed mode, when the framing/spreading unit 14C receive a command to reduce the information rate from the controller 11C then it compresses the insufficiently interleaved frame to form a compressed mode frame in compliance with that command.

As shown in FIG. 20, the receiver 2C comprises a controller 21C, an error-correction decoder 22, a deinterleaver 23, a deframing/de-spreading unit 24C, a radio frequency receiver 25, etc. Through negotiations with the transmitter 1C, the controller 21C mainly controls the operations of the deinterleaver 23 and the deframing/de-spreading unit 24C. In the compressed mode, this controller 21C instructs to the deframing/de-spreading unit 24C a reduction in information rate and reception timings for receiving compressed mode frames.

The error-correction decoder 22, the deinterleaver 23, and the radio frequency receiver 25 are the same as in the first embodiment already described above, and explanation thereof will be omitted. As regards the deinterleaver 23, it has a memory for interleaving one frame.

When the controller 21C has instructed a reception timing in correspondence with each of the modes, the deframing/de-spreading unit 24C extracts the received signal from the radio frequency receiver 25 in accordance with that reception timing. Furthermore, in the compressed mode, when the deframing/de-spreading unit 24C receives a command to reduce information rate from the controller 21C then it lowers the information rate in accordance with that command, performs framing and de-spreading, and outputs the frames in sequence to the deinterleaver 23.

Figure 21:
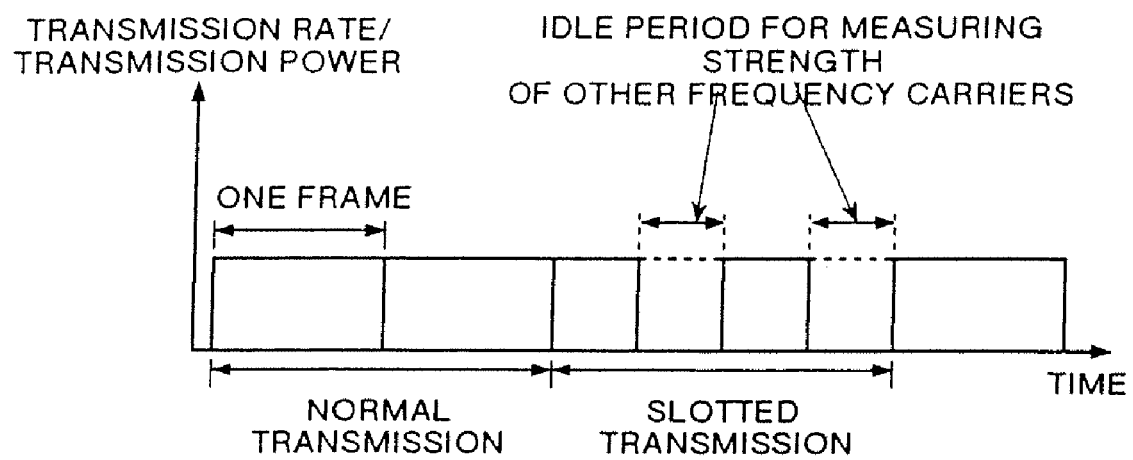
FIG. 21 is a diagram explaining frame transmission of a downlink according to the fifth embodiment.

Next, frame transmission including compressed mode will be explained. FIG. 21 is a diagram explaining frame transmission of a downlink according to the fifth embodiment. In FIG. 21, the vertical axis represents transmission rate/transmission power, and the horizontal axis represents time. In the CDMA system, during normal transmission, a period of time is provided to slot the frame and transmit it intermittently, and the strength of other frequency carriers is measured using the fact that a frame is not transmitted during that period. For that purpose, the slotted frame must be compressed, and in a conventional method, the transmission power is increased when transmitting the compressed frame. In this case, amount of interference power to other user channels increases, leading to deterioration in transmission.

Accordingly, as shown in FIG. 21, when the same transmission power is secured in the compressed mode as in the normal mode, lowering the transmission rate by a corresponding amount, and an interleaved transmission frame is sent across multiple compressed mode frames, it is possible to realize a handover between frequencies with reduced interference.

Figure 22:
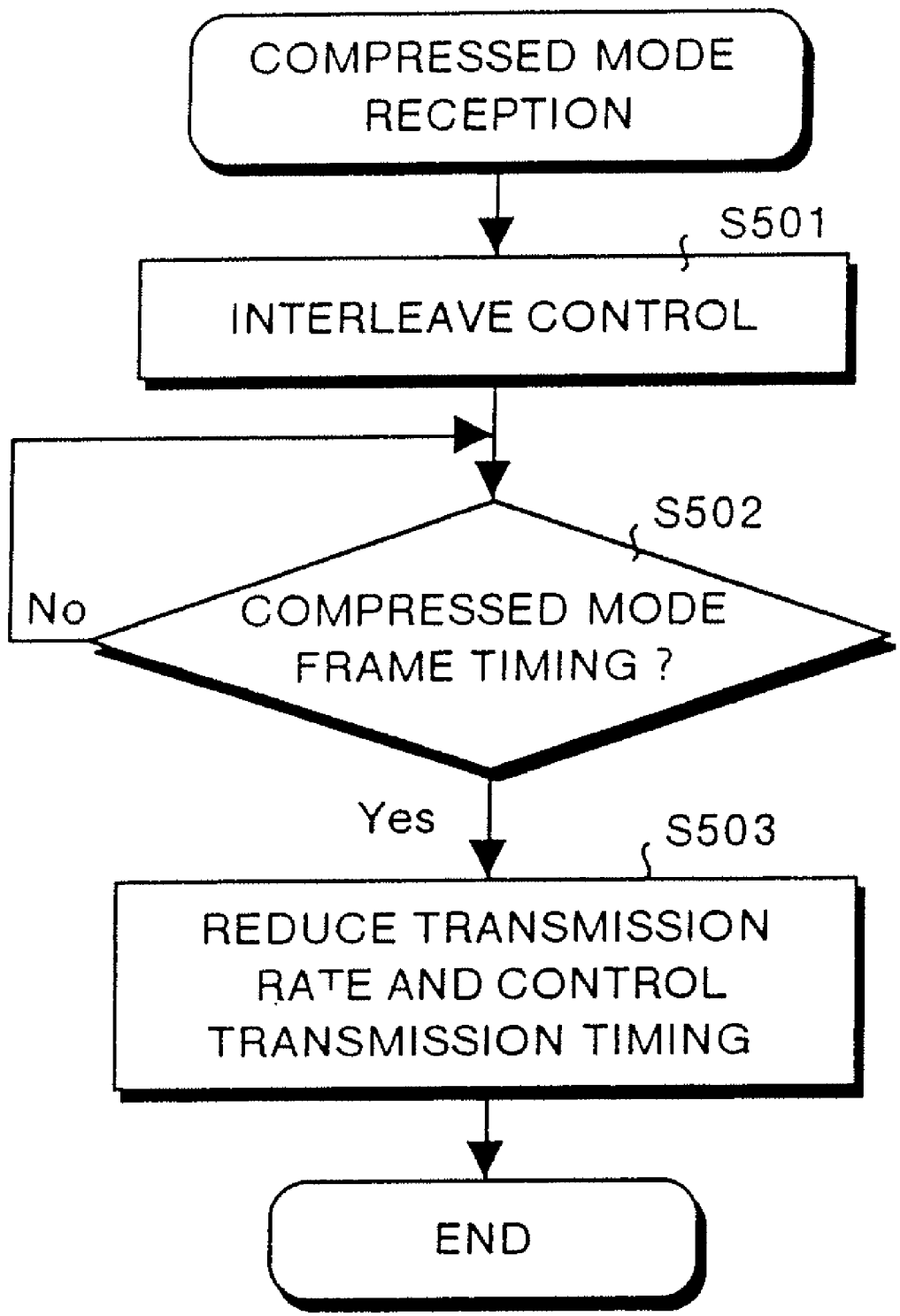
FIG. 22 is a flowchart explaining a transmission operation in the compressed mode according to the fifth embodiment.

Next, the operation will be explained. Since the transmission and reception is performed in the same manner as the conventional methods, explanation thereof will be omitted. Firstly, the transmission operation of the transmitter 1C will be explained. FIG. 22 is a flowchart explaining the transmission operation in the compressed mode. The execution of the operation of FIG. 22 is controlled by the controller 11C although the individual operations are performed by various sections. In the compressed mode, interleaving in one frame is instructed to the interleaver 13 (Step S501), and the interleaver 13 interleaves in one frame.

Then, when the time reaches the compressed mode frame timing (Step S502), reduction of transmission rate and a transmission timing are instructed to the framing/spreading unit 14C (Step S503). Consequently, the frame is transmitted at a lower transmission rate in the compressed mode time. In this way, in the compressed mode, frames are transmitted intermittently (non-continuously).

Figure 23:
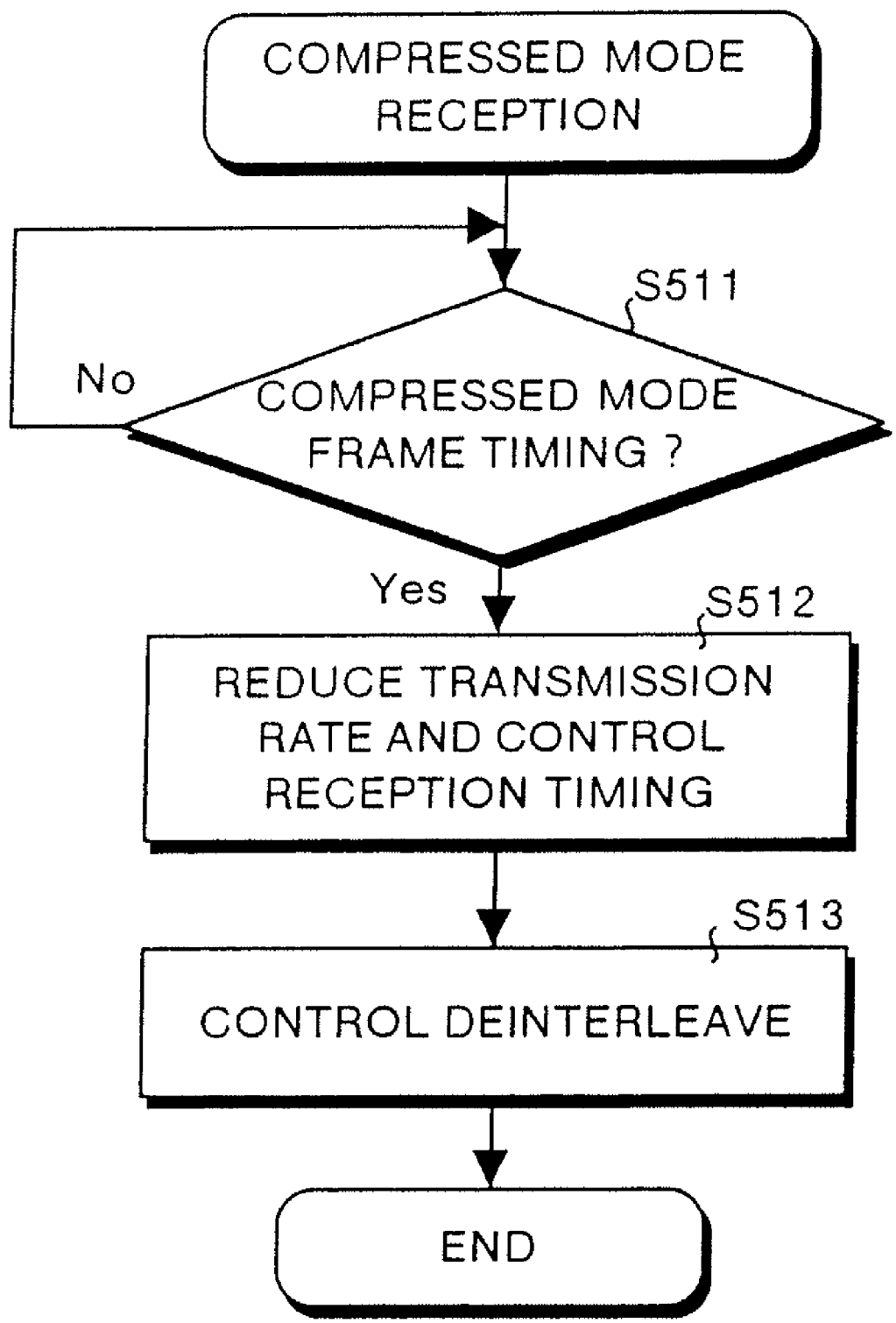
FIG. 23 is a flowchart explaining a reception operation in the compressed mode according to the fifth embodiment.

Next, the reception operation of the receiver 2C will be explained. FIG. 23 is a flowchart explaining the reception operation in the compressed mode. The execution of the operation of FIG. 23 is controlled by the controller 21C although the individual operations are performed by various sections. In the compressed mode, when the time reaches the compressed mode frame timing (Step S511), a reduction of transmission rate and a reception timing are instructed to the deframing/de-spreading unit 24C (Step S512).

Then, deinterleaving in the one frame is instructed to the deinterleaver 23 (Step S513), and the deinterleaver 23 deinterleaves one frame. In this way, in the compressed mode, frames are received intermittently (non-continuously)

As described above, according to the fifth embodiment, in the compressed mode, compressed frames are intermittently transmitted at a transmission rate which is lower than the transmission rate in the normal mode while using the same transmission power as in the normal mode. Therefore, during the frequency handover, the amount of interference power to other users on the same frequency is reduced. Consequently, it is possible to realize a handover between frequencies with less interference.

Furthermore, in the fifth embodiment, in the compressed mode, a compressed frame may be divided into the front and rear of the same frame timing as in the normal mode, and transmitted intermittently in compliance with that arrangement, as in the second embodiment described above. Because of this fact, it is possible to secure an appropriate interleaving time in compressed mode in the same way as in the normal mode, with a simple interleave constitution. As a result, poor performance caused by interleaving in bit units can be prevented.

Furthermore, in the fifth embodiment, in the compressed mode, a compressed frame may be slotted and transmitted intermittently in N slot units in the same manner as in the third embodiment described above. Because of this fact, it is possible to receive transmission power control bits transmitted in the downlink in comparatively short time intervals. As a result, the amount of error in the transmission power control can be reduced.

In the fifth embodiment described above, one frame was interleaved, but the present invention is not restricted to this, and it is acceptable to prevent compression in the interleaving time by interleaving across multiple frames. With the exception of increase the memory size of the interleaver, as in the first embodiment, the sixth embodiment has the same overall constitution as the fifth embodiment described above, and so only the differing aspects of the operation will be explained below.

Figure 24:
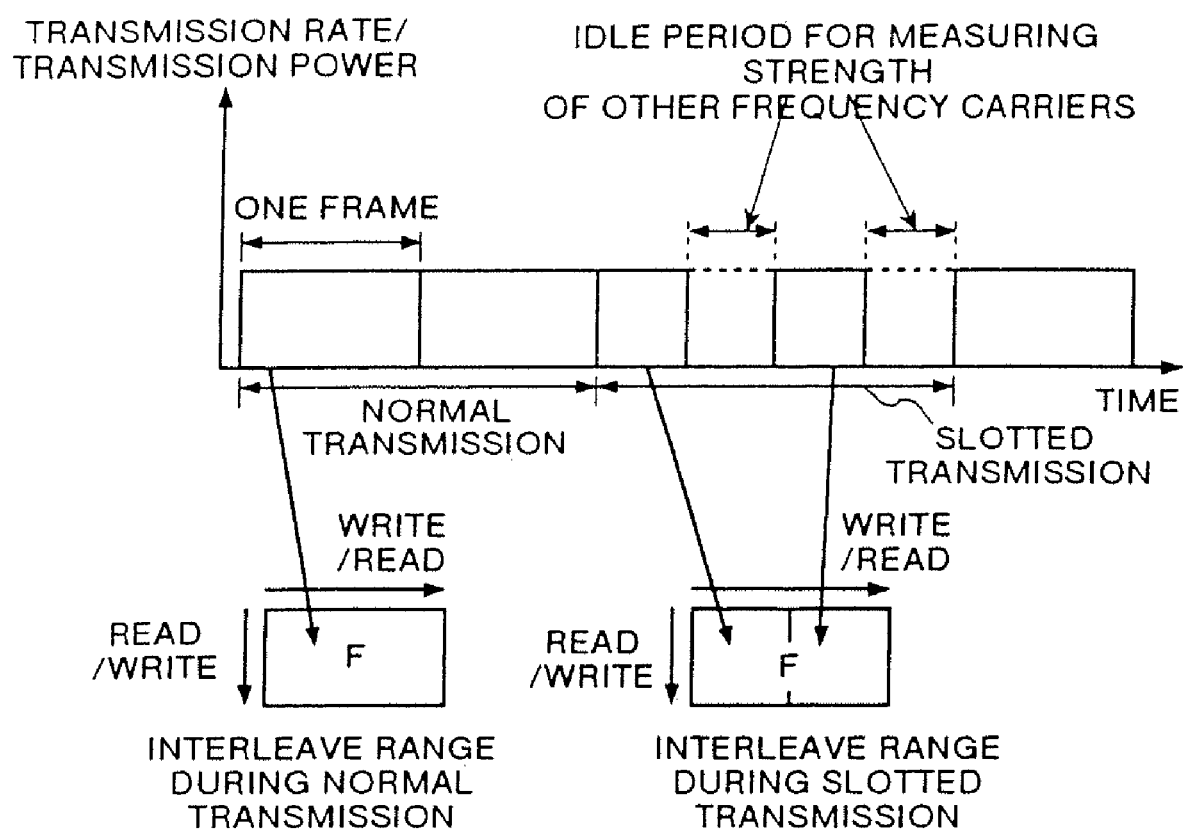
FIG. 24 is a diagram explaining frame transmission of a downlink according to a sixth embodiment of the present invention.

Accordingly, frame transmission including compressed mode will be explained. FIG. 24 is a diagram explaining frame transmission of a downlink according to the sixth embodiment. In FIG. 24, the vertical axis represents transmission rate/transmission power, and the horizontal axis represents time. The difference with the fifth embodiment described above is that, as shown in FIG. 24, interleaving is carried out across multiple frames, i.e. two frames if the compressed mode frame is a ½ frame. Consequently, deterioration of decoding caused by compressing the interleaving time can be reduced.

Figure 25:
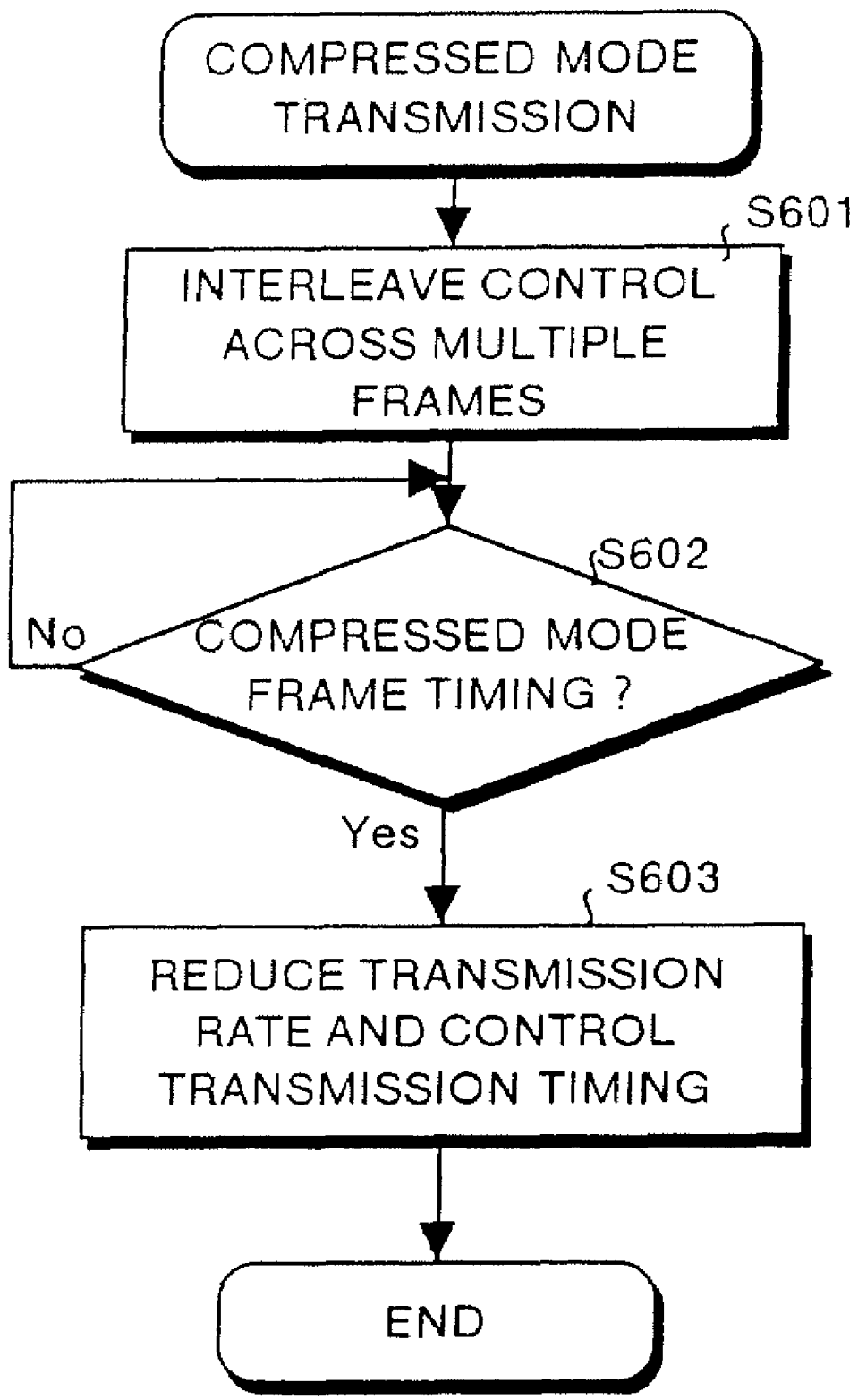
FIG. 25 is a flowchart explaining a transmission operation in the compressed mode according to the sixth embodiment.

Next, the operation will be explained. Since the transmission and reception is performed in the same manner as in the conventional methods, explanation thereof will be omitted. Firstly, the transmission operation of the transmitter of the sixth embodiment will be explained. FIG. 25 is a flowchart explaining the transmission operation in the compressed mode. The execution of the operation of FIG. 25 is controlled by the controller 11C although the individual operations are performed by various sections. In the compressed mode, interleaving across two frames is instructed to the interleaver 13 (Step S601), and the interleaver 13 interleaves two frames.

Then, when the time reaches the compressed mode frame timing (Step S602), reduction of transmission rate and a transmission timing are instructed to the framing/spreading unit 14C (Step S603). Consequently, the frame is transmitted at a lower transmission rate in the compressed mode time. In this way, in the compressed mode, frames are transmitted intermittently (non-continuously).

Figure 26:
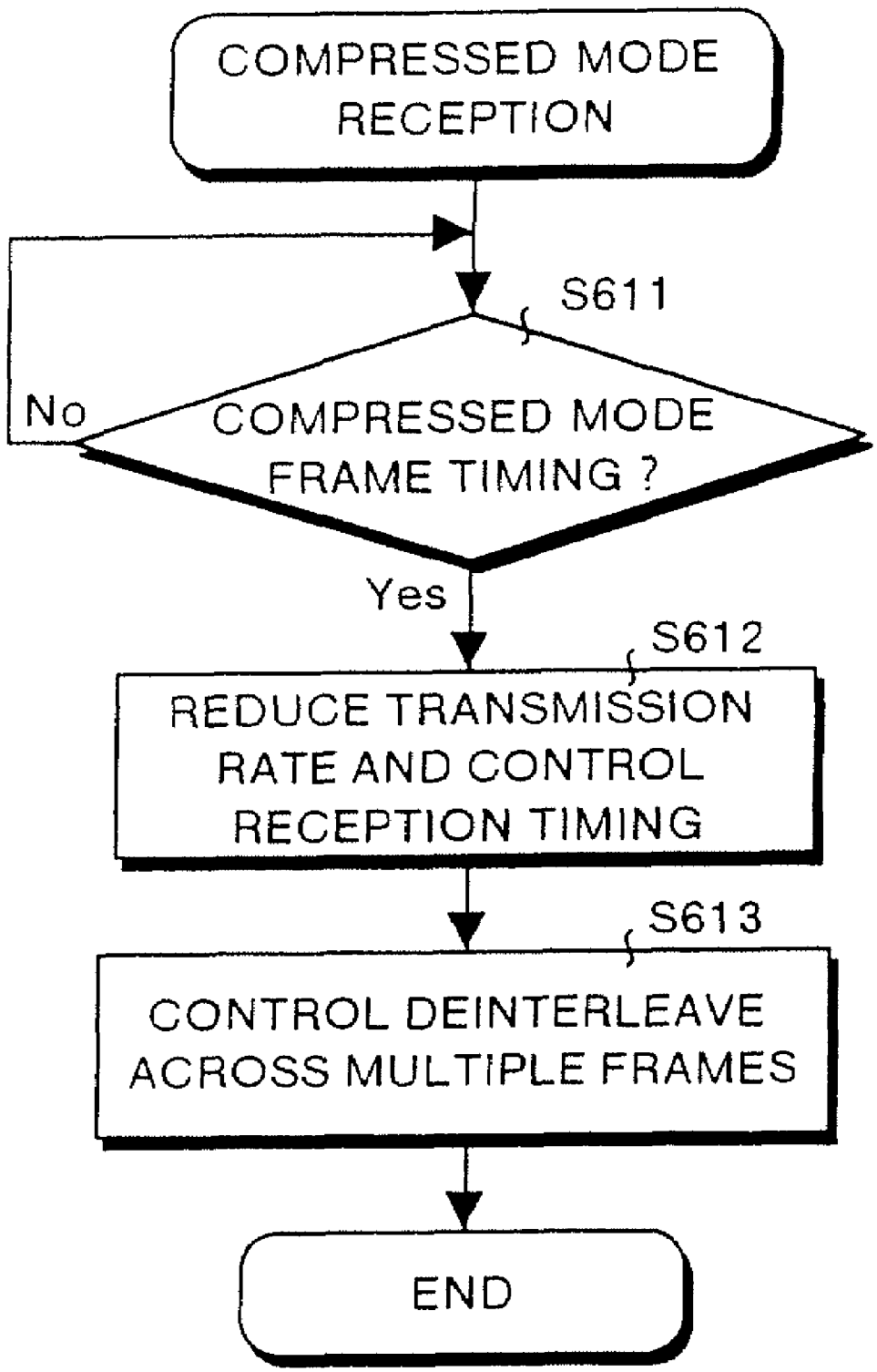
FIG. 26 is a flowchart explaining a reception operation in the compressed mode according to the sixth embodiment.

Next, the reception operation according to the receiver of the sixth embodiment will be explained. FIG. 26 is a flowchart explaining a reception operation in the compressed mode. The execution of the operation of FIG. 26 is controlled by the controller 21C although the individual operations are performed by various sections. In the compressed mode, when the time reaches the compressed mode frame timing (Step S611), a reduction of transmission rate and a reception timing are instructed to the deframing/de-spreading unit 24C (Step S612).

Then, deinterleave across two frames is instructed to the deinterleaver 23 (Step S613), and the deinterleaver 23 deinterleaves across two frames. In this way, in the compressed mode, frames are received intermittently (non-continuously).

As described above, according to the sixth embodiment, in addition to what has been described in the fifth embodiment described above, in the compressed mode, bit units are interleaved across multiple frames, enabling an appropriate interleaving time to be secured in the compressed mode as in the normal mode. As a consequence, transmission errors caused by interleaving of bit units can be further reduced.

Furthermore, in the sixth embodiment, in the compressed mode, a compressed frame may be divided into the front and rear of the same frame timing as in the normal mode, and transmitted intermittently in compliance with that arrangement in the same manner as in the second embodiment described above. Because of this fact, it is possible to secure an appropriate interleaving time in compressed mode in the same way as in the normal mode, with a simple interleaving constitution. As a result, poor performance caused by interleaving in bit units can be prevented.

Furthermore, in the sixth embodiment, in the compressed mode, a compressed frame may be slotted and transmitted intermittently in N slot units in the same manner as in the third embodiment described above. Because of this fact, it is possible to receive transmission power control bits transmitted in the downlink in comparatively short time intervals. As a result, the amount of error in the transmission power control can be reduced.

In the above-mentioned embodiments 1 to 6, a function for preventing transmission deterioration in the compressed mode was explained, but the present invention is not restricted to this, and it is acceptable to vary the amount of transmission power during transmission power control as in a seventh embodiment described below.

Figure 27:
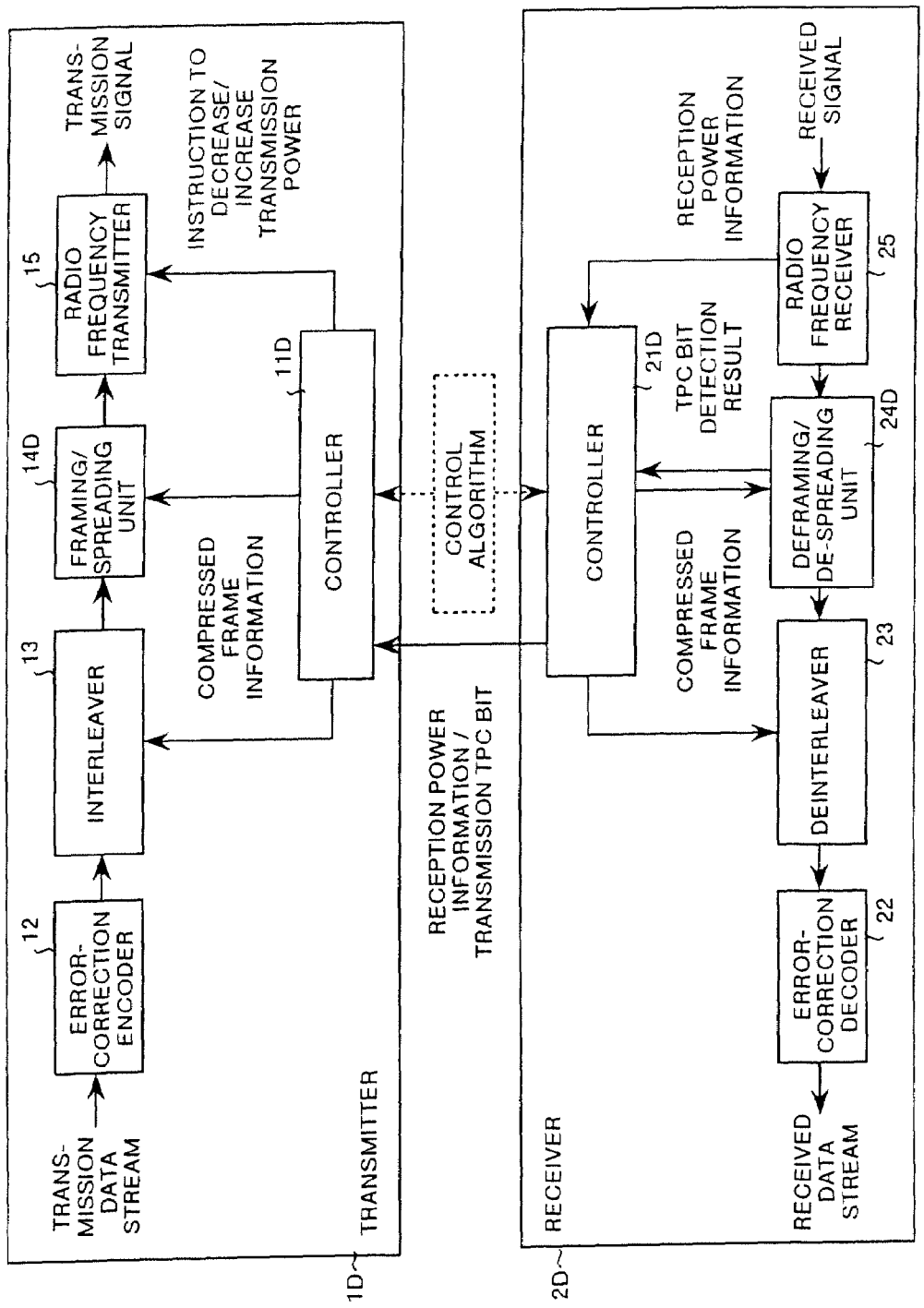
FIG. 27 is a block diagram showing a CDMA system according to a seventh embodiment of the present invention.

Firstly, the constitution of the CDMA system will be explained. FIG. 27 is a block diagram showing a CDMA system according to a seventh embodiment of the present invention. The CDMA system comprises a transmitter 1D and a receiver 2D. Such a CDMA system is provided with both the base station and mobile stations. The base station and the mobile stations carry out radio communication using a CDMA communication method.

As shown in FIG. 27, the transmitter 1D comprises a controller 1D, an error-correction encoder 12, an interleaver 13, a framing/spreading unit 14D, a radio frequency transmitter 15, etc. Through negotiations with the receiver 2D, the controller 11D mainly controls the operations of the interleaver 13, the framing/spreading unit 14D, and the radio frequency transmitter 15. This controller 11D supplies compressed mode information such as transmission timings in compressed mode to the framing/spreading unit 14D. Furthermore, this controller 1D instructs increase or decrease of the transmission power to the radio frequency transmitter 15, based on received power information and TPC bit information received from the receiver 2D via an uplink.

The error-correction encoder 12, the interleaver 13, and the radio frequency transmitter 15 are the same as in the first embodiment already described above, and explanation thereof will be omitted. As regards the interleaver 13, it has a memory for interleaving one frame. Furthermore, the radio frequency transmitter 15 increase or decreases the transmission power in accordance with the transmission power increase or decrease instruction of the controller 1D, and outputs the transmission signals.

The framing/spreading unit 14D is assigned operations such as spreading the band in correspondence with the normal mode and compressed mode, using a spreading code for each user, forming a frame corresponding to each mode, and, when the controller 11D has instructed a transmission timing in correspondence with each of the modes, sending the frame to the radio frequency transmitter 15 in accordance with that transmission timing.

As shown in FIG. 27, the receiver 2D comprises a controller 21D, an error-correction decoder 22, a deinterleaver 23, a deframing/de-spreading unit 24D, a radio frequency receiver 25, etc. Through negotiations with the transmitter 1D, the controller 21D mainly controls the operations of the deinterleaver 23 and the deframing/de-spreading unit 24D. In the compressed mode, this controller 21D supplies compressed frame information, such as reception timings and the like for receiving compressed mode frames, to the deframing/de-spreading unit 24D.

The error-correction decoder 22, the deinterleaver 23, and the radio frequency receiver 25 are the same as in the first embodiment already described above, and explanation thereof will be omitted. Here, the deinterleaver 23 has a memory for interleaving one frame. Furthermore, when the radio frequency receiver 25 has received a reception signal, it notifies the controller 21D of information (information on reception power) showing the reception power.

When the deframing/de-spreading unit 24D has received reception timings in correspondence with each of the modes from the controller 21D, it extracts the reception signal from the radio frequency receiver 25 in accordance with the reception timings. Furthermore, in the compressed mode, this deframing/de-spreading unit 24D receives compressed frame information from the controller 21D and performs deframing and de-spreading, and sequentially outputs the frames to the deinterleaver 23. Furthermore, the deframing/de-spreading unit 24D detects TPC bits from the received signal, and notifies the controller 21D of these.

Next, the relationship between the TPC bits and the transmission power control amount will be explained. FIG. 28 is a diagram showing the relationship between transmission power control symbols and transmission power control amounts according to the seventh embodiment. The table shown in FIG. 28 is held by the controller 11D of the transmitter 1D and also the controller 21D of the receiver 2D. The TPC bit is the transmission power control symbol, and since it comprises one bit, it has two states: 1 (ON) and 0 (OFF). In the normal mode, a transmission power control amount of +1.0 dB (decibel) is applied in the 1 (ON) state and a transmission power control amount of −1.0 dB is applied in the 0 (OFF) state. That is, the unit of transmission power control in the normal mode is 1 dB.

On the other hand, in the compressed mode, a transmission power control amount of +3.0 dB (decibels) is applied in the 1 (ON) state, and a transmission power control amount of −3.0 dB is applied in the 0 (OFF) state. That is, the unit of transmission power control in the normal mode is 3 dB. The transmission power control unit used in the compressed mode has a greater absolute value than that used in the normal mode, for the reason that idle period (non-transmission timing) in the compressed mode lowers the adhesion capability to the transmission power control.

Figure 29:
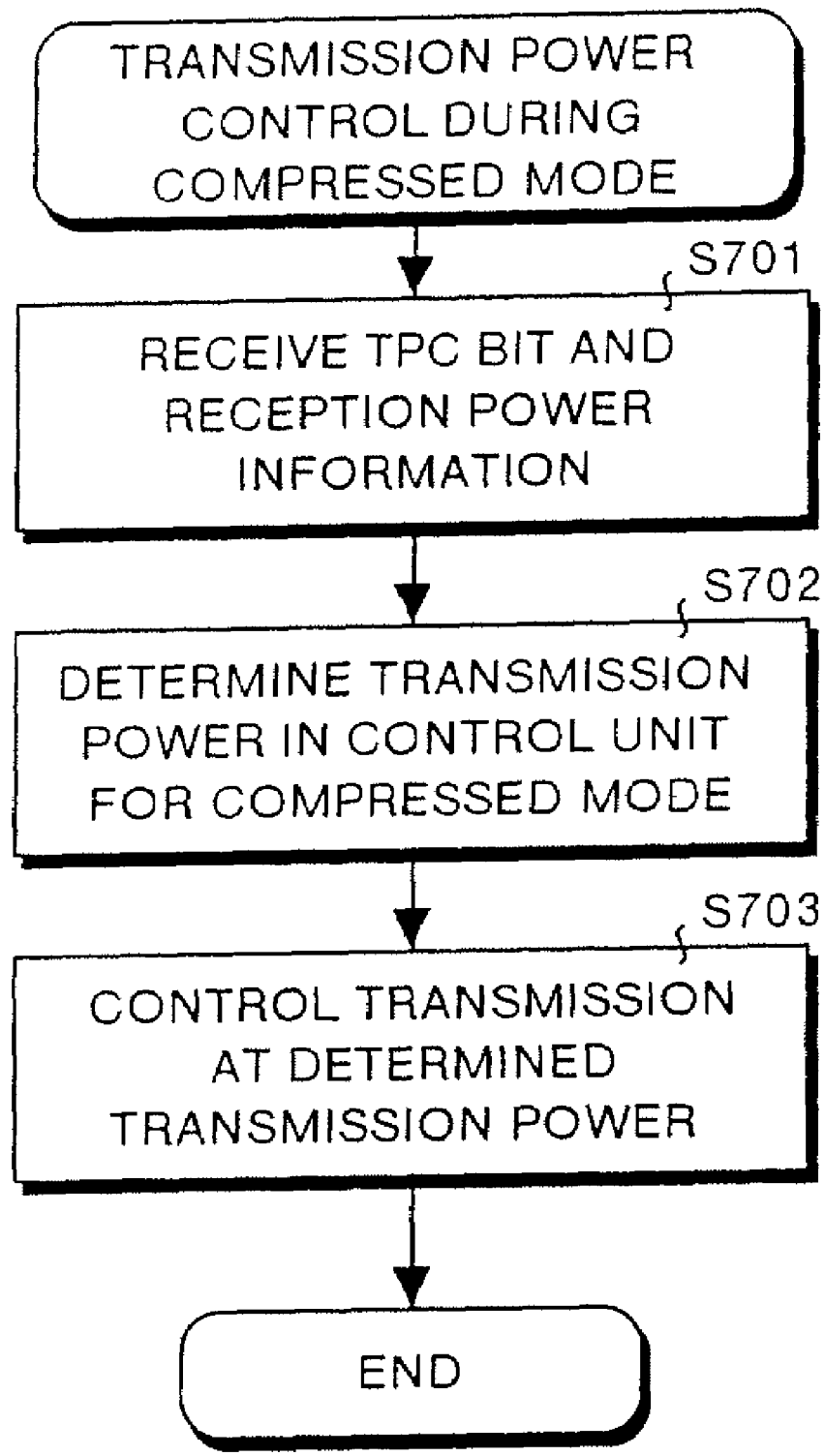
FIG. 29 is a flowchart explaining a transmission power control operation in the compressed mode according to the seventh embodiment.

Next, the operation will be explained. The seventh embodiment differs from the other embodiments in respect of its transmission power control function, and therefore only the transmission power control will be explained. FIG. 29 is a flowchart explaining the transmission power control operation in compressed mode according to the seventh embodiment. Transmission power control of the transmitter 1D and the receiver 2D explained here is the transmission power control to an uplink.

A TPC bit from the receiver 2D and reception power information on the receiver 2D side are sent to the transmitter 1D. In the transmitter 1D, when the TPC bit and the reception power information are received (Step S701), transmission power increase/decrease information is determined based on this received information (Step S702). Then, transmission from the radio frequency transmitter 15 is controlled at that determined transmission power (Step S703).

More specifically, for instance, when there is one TPC bit, an instruction is made to increase the transmission power, and consequently the transmission power control of +3 dB from the table of FIG. 28 is set. Therefore, an instruction to transmit after raising the present transmission power by 3 dB is sent to the radio frequency transmitter 15. On the other hand, when the TPC bit is 0, an instruction is given to decrease the transmission power, by setting the transmission power control of −3 dB from the table of FIG. 28. Therefore, an instruction to transmit after decreasing the present transmission power by 3 dB is sent to the radio frequency transmitter 15.

As described above, according to the seventh embodiment, in the compressed mode, transmission power is controlled so that the transmission power control unit for one transmission is greater than in the normal mode, and consequently, even when the temporal intervals of the transmission power control during intermittent transmission are wider, it is possible to widen the control range of the transmission power and maintain adhesion to the transmission power in the compressed mode. As a consequence, the amount of error of transmission power control in the compressed mode can be reduced.

Furthermore, in the seventh embodiment, in the compressed mode, a compressed frame may be slotted and transmitted intermittently in N slot units in the same manner as in the third embodiment described above. Consequently, it is possible to transmit transmission power control bits in the downlink in comparatively short time intervals. As a result, the amount of error in the transmission power control can be reduced.

In the above-mentioned seventh embodiment, the TPC bit states were limited to two types of increase and decrease, but the present invention is not restricted to this, and it is acceptable to vary the amount of transmission power control for each mode, as in an eighth embodiment explained below. The eighth embodiment has the same overall constitution as the seventh embodiment described above, and so only the differing aspects of the operation will be explained below. In the following explanation, the reference numerals of FIG. 27 will be used.

Figure 30:
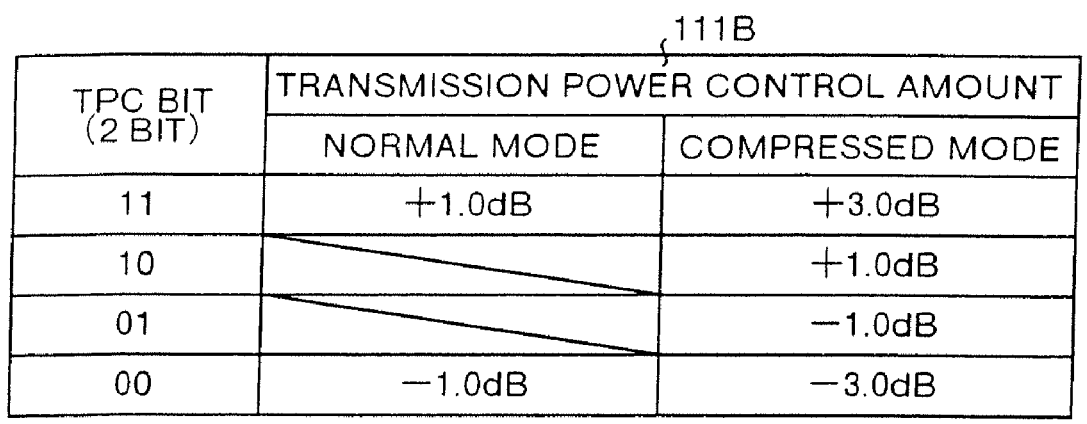
FIG. 30 is a diagram showing the relationship between transmission power control symbol and transmission power control amount according to an eighth embodiment of the present invention.

Firstly, the relationship between the TPC bits and the transmission power control amount will be explained. FIG. 30 is a diagram showing the relationship between transmission power control symbols and transmission power control amounts according to the eighth embodiment. The table shown in FIG. 30 is held by the controller 11D of the transmitter 1D and also the controller 21D of the receiver 2D.

In the eighth embodiment, the TPC bit is the transmission power control symbol, and there are two bits. Therefore, there are four types of states: (11B (B represents a binary number), 10B, 01B, and 00B). The two TPC bit states 11B and 10B represent an increase of transmission power, and the two TPC bit states 01B and 00B represent a decrease of transmission power.

In the normal mode, as in the seventh embodiment described above, there are only two types of states, ON and OFF. However, since two TPC bits are used, ON is 11B and OFF is 00B. When the TPC bits are 11B the transmission power control amount is +1 dB, and when they are 00B the transmission power control amount is −1 dB. Similarly, in the compressed mode, as in the seventh embodiment described above, when the TPC bits are 11B the transmission power control amount is increased by three times the transmission power control amount in the normal mode, namely +3 dB. When the TPC bits are 00B the transmission power control amount is increased by three times of the transmission power control amount in the normal mode, namely −3 dB. In the eighth embodiment, four types of variation are applied to the transmission power control amount in the compressed mode, so that when the TPC bits are 10B the transmission cower control amount is +1 dB, and when they are 01B the transmission power control amount is −1 dB.

In the normal mode, when the TPC bits are in the 11B state, a transmission power control amount of +1.0 dB 5 (decibels) is applied, and in the −10 dB state, a transmission power control amount of −1.0 dB is applied. That is, the unit of transmission power control in the normal mode is 1 dB. In the normal mode, there are no stipulations concerning the state 10B and the state 01B, and the transmission power remains in its current state during this mode.

On the other hand, in the compressed mode, when the TPC bits are 11B, a transmission power control amount of +3.0 dB (decibels) is applied, and when the TPC bits are 00B, a transmission power control amount of −3.0 dB is applied. That is, when the TPC bits are at 11B or 00B, the unit of transmission power control in the normal mode is 3 dB.

Furthermore, in the compressed mode, when the TPC bits are 10B, a transmission power control amount of +1.0 dB (decibel) is applied, and when the TPC bits are 01B, a transmission power control amount of −1.0 dB is applied. That is, when the TPC bits are at 10B or 01B, the unit of transmission power control in the compressed mode is 1 dB.

Thus, the transmission power control unit is varied in the compressed mode in order to improve the adhesion capability of the transmission power control, making it possible to appropriately accommodate changes in the idle period (non-transmission timing) in the compressed mode.

Figure 31:
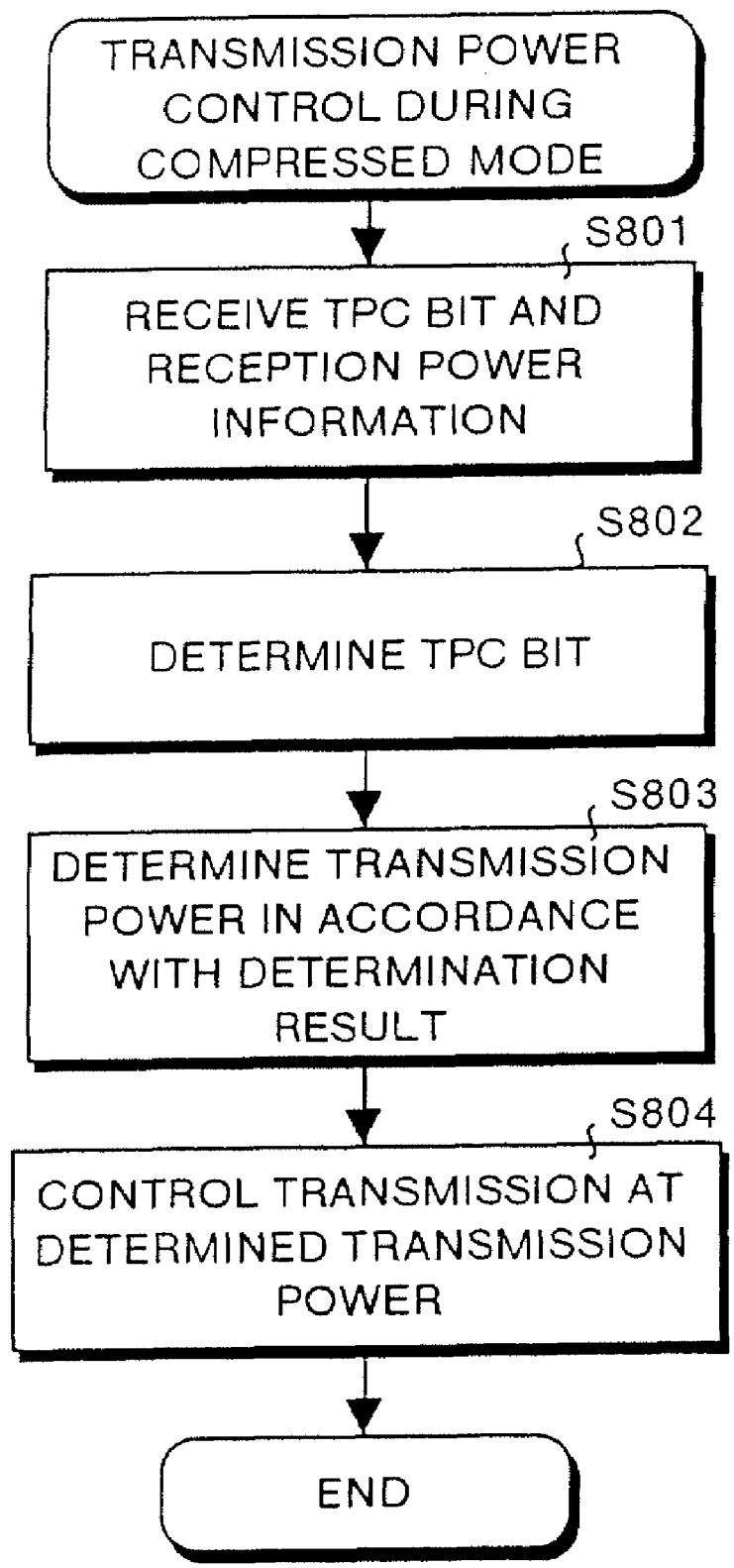
FIG. 31 is a flowchart explaining a transmission power control operation in the compressed mode according to the eighth embodiment.

Next, the operation will be explained. The eighth embodiment differs from the other embodiments in respect of its transmission power control function, and therefore only the transmission power control will be explained. FIG. 31 is a flowchart explaining the transmission power control operation in compressed mode according to the eighth embodiment. Transmission power control of the transmitter 1D and the receiver 2D explained here is the transmission power control to an uplink.

A TPC bit from the receiver 2D and reception power information on the receiver 2D side are sent to the transmitter 1D. When the transmitter 1D receives the TPC bit and the reception power information (Step S801) it determines the value of the TPC bits (Step S802). Then, the table of FIG. 30 is consulted, and a desired transmission power increase/decrease information is set, based on the determination in the Step S802 (Step S803). Then, transmission to the radio frequency transmitter 15 is controlled at the set transmission power (Step S804).

More specifically, for instance, when the TPC bits are 11B, an instruction is made to increase the transmission power, and the transmission power control of +3 dB from the above-mentioned table of FIG. 30 is set. Therefore, an instruction to transmit after raising the present transmission power by 3 dB is sent to the radio frequency transmitter 15. On the other hand, when the TPC bits are 00B, an instruction is given to decrease the transmission power, by setting the transmission power control of −3 dB from the table of the above-mentioned FIG. 30. Therefore, an instruction to transmit after decreasing the present transmission power by 3 dB is sent to the radio frequency transmitter 15.

Furthermore, when the TPC bits are 10B, an instruction is made to increase the transmission power, and the transmission power control of +1 dB from the above-mentioned table of FIG. 30 is set. Therefore, an instruction to transmit after raising the present transmission power by 1 dB is sent to the radio frequency transmitter 15. On the other hand, when the TPC bits are 01B, an instruction is given to decrease the transmission power, by setting the transmission power control of −1 dB from the table of the above-mentioned FIG. 30. Therefore, an instruction to transmit after decreasing the present transmission power by 1 dB is sent to the radio frequency transmitter 15.

As described above, according to the eighth embodiment, transmission power is controlled in compliance with transmission power control units in correspondence with the normal mode and the compressed mode, and in addition, in correspondence with the temporal intervals of the transmission power control in the compressed mode. Therefore, in the compressed mode, even when the temporal intervals of the transmission power control fluctuate and become long during intermittent transmission, it is possible to use an appropriate transmission power control range, and thereby maintain adhesion to the transmission power. As a consequence, the amount of error of transmission power control in the compressed mode can be reduced.

The number of TPC bits and the transmission power is greater than the seventh embodiment described above. However, transmission power is in any case greater in compressed mode so that the needed transmission power of the TPC bit is attained by that greater power. Consequently, there is a merit that the transmission error rate has almost no effect on the control performance.

Furthermore, in the eighth embodiment, in the compressed mode, a compressed frame may be slotted and transmitted intermittently in N slot units in the same manner as in the third embodiment described above. Consequently, it is possible to receive transmission power control bits transmitted in the downlink in comparatively short time intervals. As a result, the amount of error in the transmission power control can be reduced.

In the embodiments 1 to 8 explained above, the transmission format in the compressed mode has a constitution for maintaining interleaving performance and transmission power control precision, but the present invention is not restricted to this, and it is acceptable to set the transmission format in consideration of reducing the number of spreading codes used, as in the following ninth embodiment.

Figure 32:
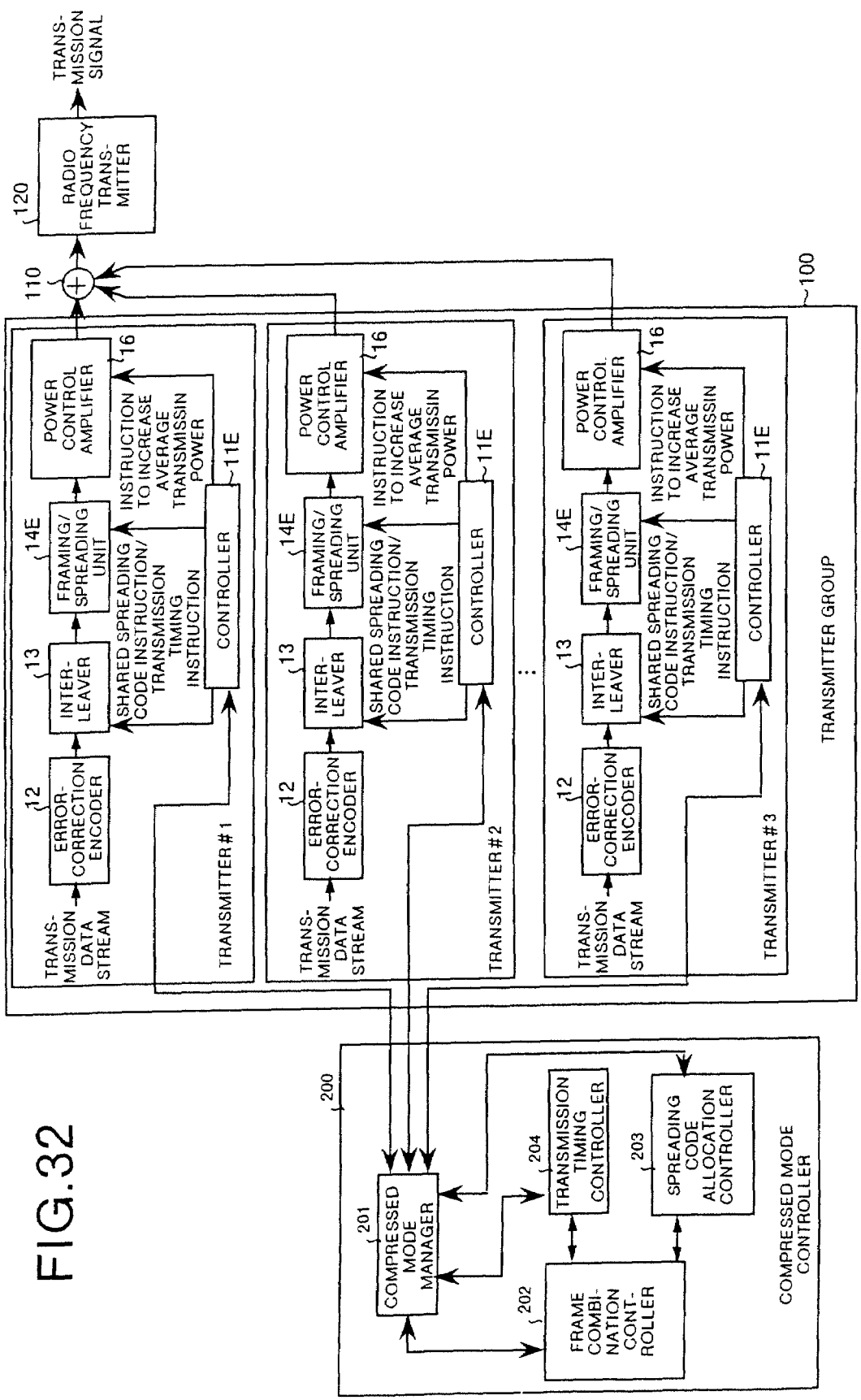
FIG. 32 is a block diagram showing a CDMA system according to a ninth embodiment of the present invention.

Firstly, the constitution of a base station in which the CDMA system of a ninth embodiment of the present invention has been applied will be explained. The constitution of the mobile stations will be not explained here. FIG. 32 is a block diagram showing an example constitution of a base station according to the ninth embodiment of the present invention. As shown in FIG. 32, this base station comprises a transmitter group 100, an adder 110, a radio frequency transmitter 120, a compressed mode controller 200 which is connected to the transmitter group 100 and controls transmission in the compressed mode, etc. Radio communication between the base station and mobile stations not shown in the diagram are performed using the CDMA communication method.

The transmitter group 100 comprises multiple transmitters #1 to #M (where M is a natural number) for creating transmission data separately for users in correspondence with a serviceable number of users. Each of the transmitters #1 to #M has the same constitution. The constitution will be explained taking the transmitter #1 as an example. As shown in FIG. 32, the transmitter #1 comprises a controller 11E, the error-correction encoder 12, the interleaver 13, a framing/spreading unit 14E, a transmission power control amplifier 16, etc.

Through negotiations with the compressed mode controller 200, the controller 11E mainly controls the operations of the interleaver 13, the framing/spreading unit 14E, and the transmission power control amplifier 16. In the compressed mode, the controller 11E supplies transmission timings for transmitting compressed mode frames, and spreading codes having a lower spreading factor than those normally used for transmitting compressed mode frames, to the framing/spreading unit 14E.

The error-correction encoder 12 and the interleaver 13 are the same as in the first embodiment already described above, and explanation thereof will be omitted. As regards the interleaver 13, it has a memory for interleaving one frame.

The framing/spreading unit 14E spreads the band using spreading codes of different spreading factors in correspondence with the normal mode and the compressed mode, and forms a frame for each mode. When the controller 11E has instructed transmission timings in correspondence with each of the modes, the framing/spreading unit 14E sends the frames to the transmission power control amplifier 16 in accordance with the transmission timing. Furthermore, in the compressed mode, this framing/spreading unit 14E receives an instruction from the controller 11E to lower the spreading factor, and in accordance with that instruction it obtains a transmission signal using a lower spreading factor than in the normal mode.

In compliance with the control of the controller 11E, the transmission power control amplifier 16 amplifies the average transmission power of the transmission signal, obtained by the framing/spreading unit 14E, in the compressed mode as compared with the normal mode, and outputs the transmission signal. The transmitters #1 to #M independently determine whether or not to use compressed mode transmission, and furthermore, since the ratio of compression in the compressed mode is set independently by the individual transmitters #1 to #M, transmission power control amplifiers 16 are provided independently to the individual transmitters #1 to #M.

The adder 110 adds the transmission signals outputted from the transmitters #1 to #M comprising the transmitter group 100, and sends them to the radio frequency transmitter 120 provided in the latter-stage. The radio frequency transmitter 120 converts the signal output obtained by the adder 110 to a radio frequency, and transmits it. One radio frequency transmitter 120 is provided in each base station.

As shown in FIG. 32, the compressed mode controller 200 comprises a compressed mode manager 201, a frame combination controller 202, a spreading code allocation controller 203, a transmission timing controller 204, etc.

The compressed mode manager 201 manages the compressed mode of each transmitter in the transmitter group 100, and inputs/outputs control data for to the compressed mode.

The frame combination controller 202 receives transmission period information about compressed mode frames of transmitters performing compressed mode transmission from the compressed mode manager 201. In compliance with that transmission period information, the frame combination controller 202 searches among the multiple compressed mode frames for a combination of frames having a total transmission timing which is within one frame duration.

The spreading code allocation controller 203 allocates a spreading code, to be used for spreading a compressed mode frame, to transmitters transmitting in the compressed mode. The transmission timing controller 204 controls the timings at which compressed mode frames are to be transmitted in the compressed mode.

Figure 33:
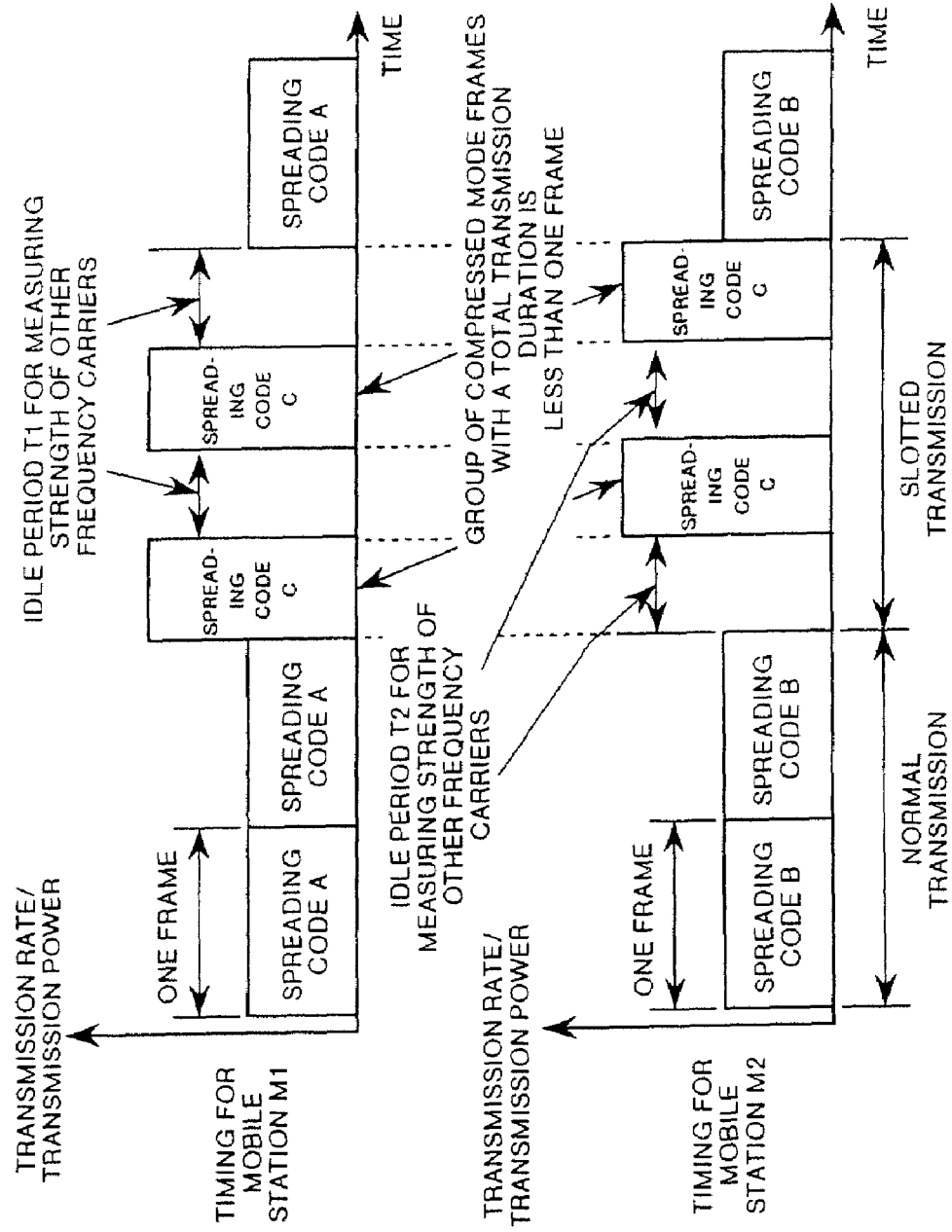
FIG. 33 is a diagram explaining frame transmission of a downlink according to the ninth embodiment.

Next, frame transmission including compressed mode will be explained. FIG. 33 is a diagram explaining frame transmission of a downlink according to the ninth embodiment. In FIG. 33, the vertical axis represents transmission rate/transmission power, and the horizontal axis represents time. In the CDMA system, during normal transmission, a period of time is provided to slot the frame and transmit it intermittently, and the strength of the other frequency carriers is measured using the fact that the frames are not transmitted (idle period) during that period.

For that purpose, the slotted frame must be compressed, and in a conventional method, the spreading factor is decreased when transmitting the compressed frame. In this case, a smaller number of spreading codes having a lower spreading factor must be allocated to each user carrying out compressed mode transmission, consuming valuable spreading code resources.

Accordingly, as shown in FIG. 33, for instance during compressed mode transmission between the base station of FIG. 32 and mobile stations M1 and M2, a group of compressed mode frames is collected from among the compressed mode frames created by multiple users in such a way that the collected group has a total transmission period of less than one frame duration. The same spreading code having a low spreading factor is allocated to each frame in the group, and they are transmitted at times which do not overlap within one frame duration, thereby enabling multiple mobile stations to share one spreading code. That is, in the downlink for the mobile stations M1 and M2, different spreading codes A and B are fixedly allocated to the mobile stations M1 and M2 during the normal mode (normal transmission).

On the contrary, in the compressed mode (slotted transmission), an identical spreading code C is allocated to both of the mobile stations M1 and M2, and the compressed mode frame transmission timings of the mobile stations M1 and M2 are controlled so that their transmission timings which both use the spreading code C do not overlap, enabling the compressed mode frame of each to be transmitted during the idle period T2 or T1 of the other.

Figure 34:
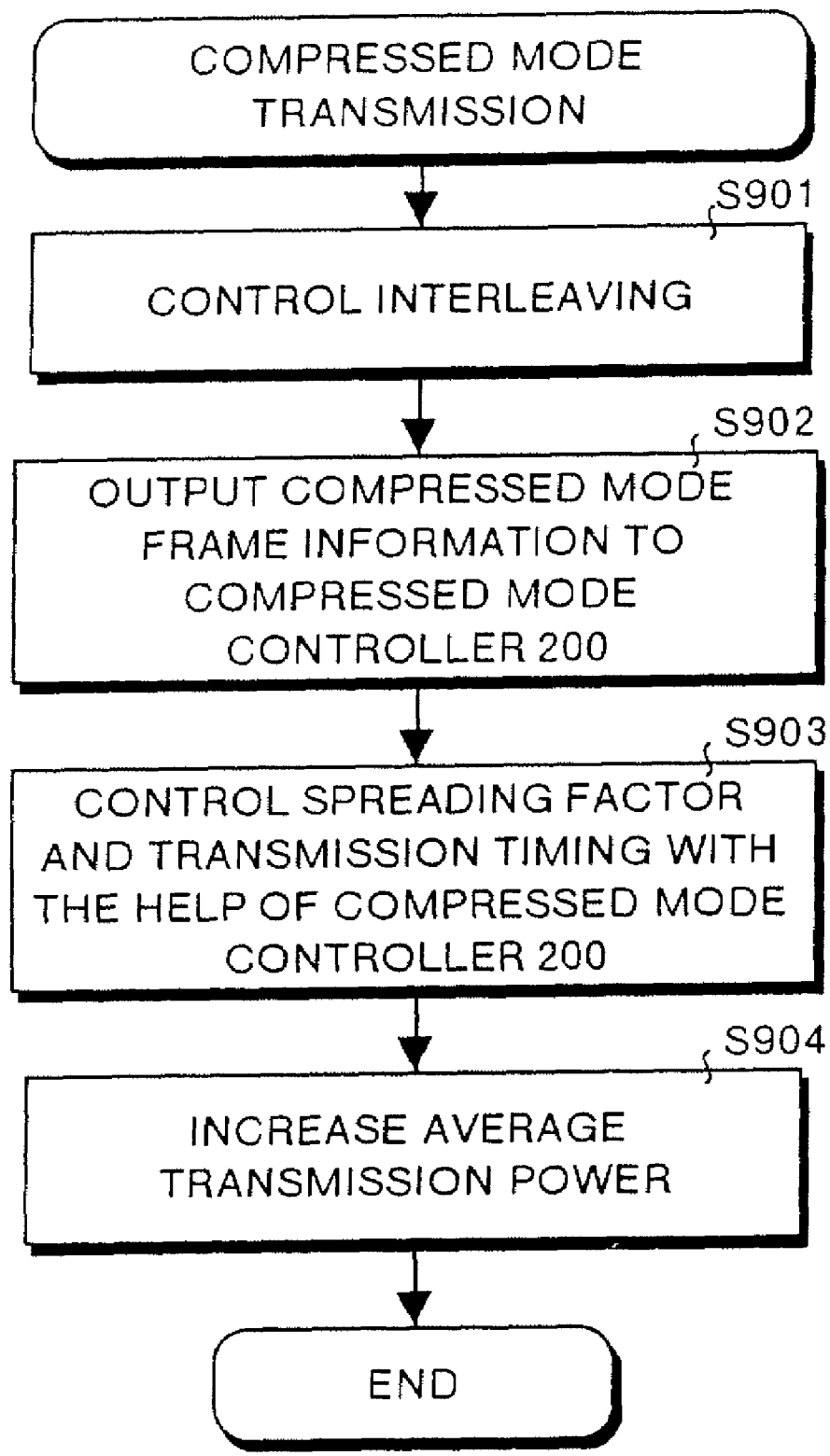
FIG. 34 is a flowchart explaining a transmission power control operation in the compressed mode according to the ninth embodiment of the present invention.

Next, the operation will be explained. Firstly, the operation of the framing/spreading unit 14E during the compressed mode in the transmitters #1 to #M will be explained. FIG. 34 is a flowchart explaining the transmission operation in the compressed mode according to the ninth embodiment of the present invention. The execution of the operation of FIG. 34 is controlled by the controller 11E although the individual operations are performed by various sections. In the compressed mode, interleaving in one frame is instructed to the interleaver 13 (step S901), and the interleaver 13 interleaves one frame. Then, information relating to the compressed mode frame is output to the compressed mode controller 200 (Step S902).

Then, a negotiation is carried out with the compressed mode controller 200, and a spreading factor (spreading code) instruction of the compressed mode controller 200 and a compressed mode frame transmission timing are supplied to the framing/spreading unit 14E (Step S903). Moreover, the transmission power control amplifier 16 is instructed to increase the average transmission power (Step S904), and the compressed mode frame is transmitted at a high transmission power. In this way, frames are transmitted intermittently (non-continuously) in the compressed mode.

Figure 35:
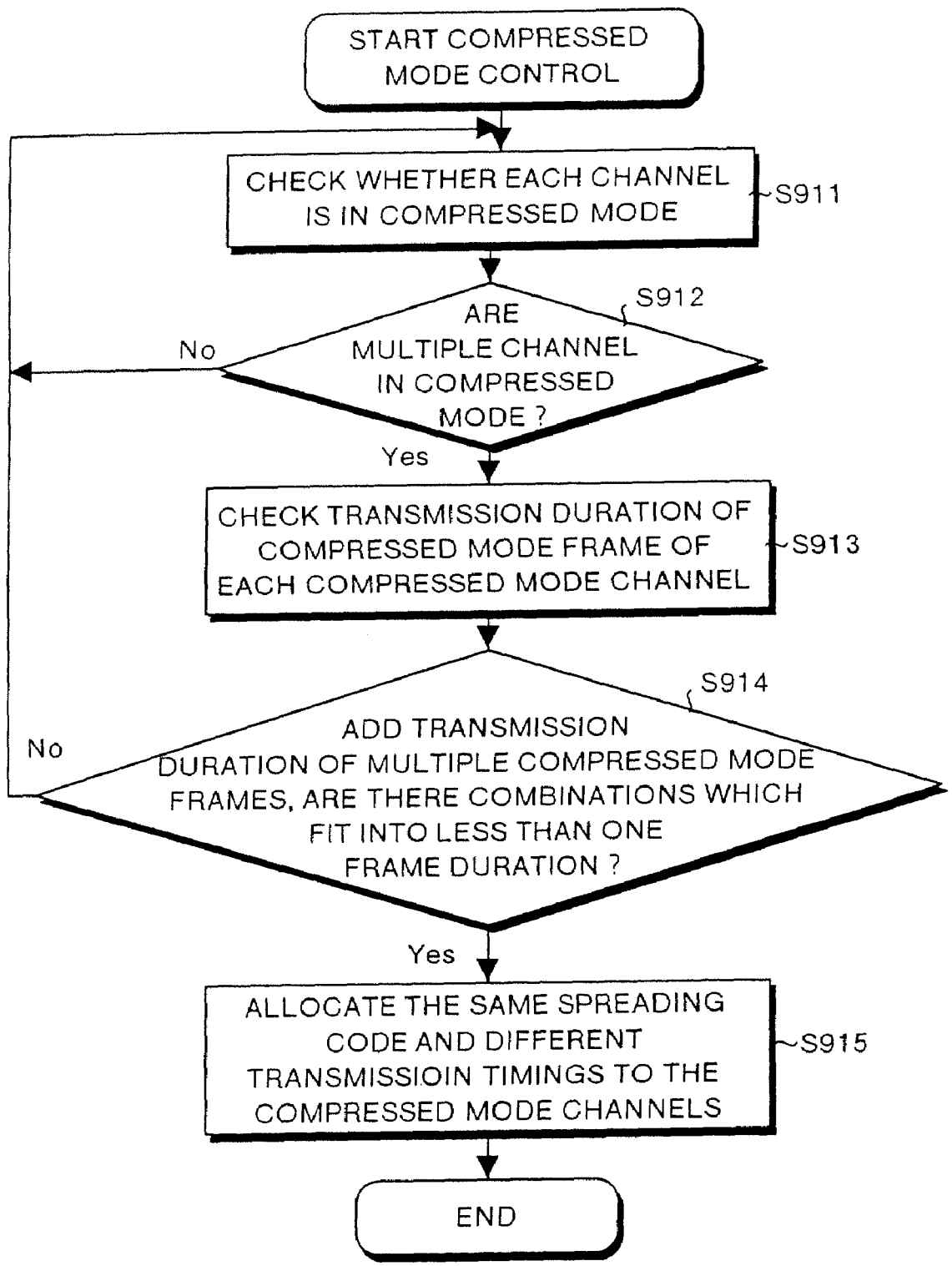
FIG. 35 is a flowchart explaining a compressed mode control operation according to the ninth embodiment.
Figure 36:
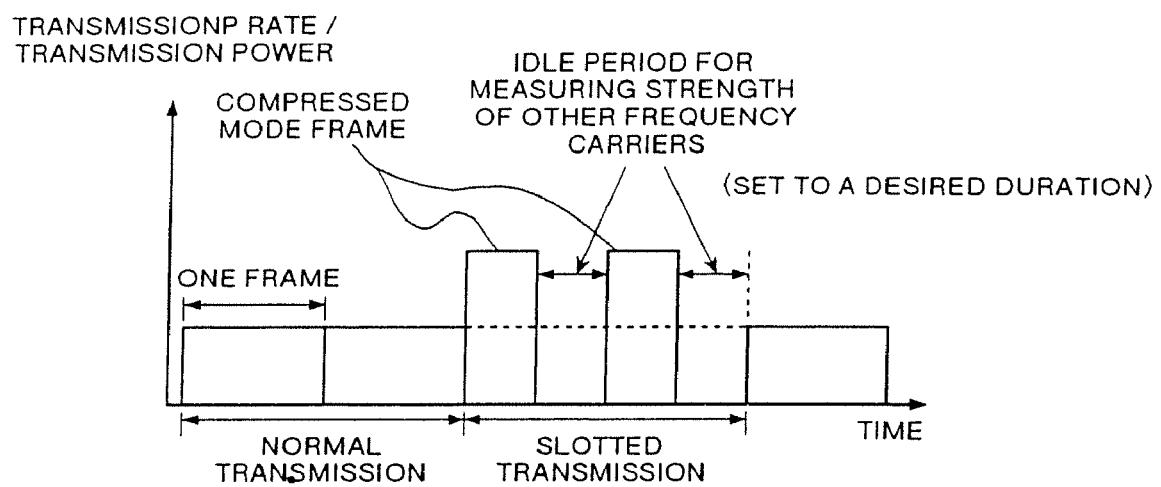
FIG. 36 is a diagram explaining conventional frame transmission of a downlink.

Next, the control operation in compressed mode of the compressed mode controller 200 will be explained. FIG. 35 is a flowchart explaining the compressed mode control operation according to the ninth embodiment. The operation of FIG. 35 is controlled by the compressed mode manager 201 although the individual operations are performed by various sections in the compressed mode controller 200. In FIG. 35, information relating to compressed mode is gathered through communication between the transmitters #1 to #M.

Accordingly, the channels are checked to determine whether they are in the compressed mode (Step S911). Then, when it has been confirmed that there are multiple channels in the compressed mode (Step S912), the transmission period of the compressed mode frame in each channel in compressed mode is checked (Step S913). On the other hand, if there are no multiple channels in the compressed mode in the Step S912, the processing returns to the Step S911.

When checking the transmission period in the Step S913, the transmission periods of the compressed mode frames extracted from each channel in the compressed mode are calculated together in a given combination to form one transmission duration. Then, it is determined whether the total times of the combinations include any combinations which can fit into one frame duration (Step S914).

As a result, when there is a combination which can fit into one frame duration, that combination is used for compressed mode frame transmission by allocating a single spreading code and mutually differing transmission timings to the channels (transmitters) of the compressed mode frames included in the combination (Step S915). On the other hand, if there are no combinations which can fit into one frame duration, multiple channels cannot be transmitted with a single spreading code, and so the processing returns to the Step S911.

As described above, according to the ninth embodiment, in the compressed mode controller 200, a combination is extracted from given combinations of multiple compressed mode frames compressed by separate users in the transmitter group 100, the extracted combination having a total transmission timing of less than one frame duration, the same spreading code is allocated to each of multiple channels which transmit the extracted combination, and the transmission timings of the compressed mode frames which comprise the above extracted combinations are controlled in such a manner that they do not temporally overlap within one frame duration, while using the same spreading code. As a consequence, when there are multiple compressed mode frames, it is possible to reduce the number of spreading codes having low spreading factors used in the compressed mode. As a result, spreading code resources can be effectively used in the compressed mode.

Furthermore, in the ninth embodiment, in the compressed mode, a compressed frame may be divided into the front and rear of the same frame timing as in the normal mode, and transmitted intermittently in compliance with that arrangement in the same manner as in the second embodiment described above. Consequently, it is possible to secure an appropriate interleaving time in compressed mode in the same way as in the normal mode, with a simple interleave constitution. As a result, poor performance caused by interleaving in bit units can be prevented.

Furthermore, in the ninth embodiment, in the compressed mode, a compressed frame may be slotted and transmitted intermittently in N slot units in the same manner as in the third embodiment described above. Consequently, it is possible to receive transmission power control bits transmitted in the downlink in comparatively short time intervals. As a result, the amount of error in the transmission power control can be reduced.

In the above explanation, only a sample of an example combination of the characteristic parts of the embodiments 1 to 9 was shown, and other combinations thereof can of course be realized.

The embodiments 1 to 9 of the present invention were explained above, but various modifications are possible within the range of the main points of the present invention, and these are not excluded from the range of the invention.

The embodiments 1 to 9 described above explain how a period of time is provided to slot the frame and transmit it intermittently, and the strength of other frequency carriers is measured using non-transmission time, i.e. idle period, during that period. However, the method of establishing synchronization between the mobile stations and the base station in an actual handover between different frequencies was not mentioned. Therefore, a communication device capable of realizing handovers between different frequencies using the invention, and a method of establishing synchronization thereof, will be explained below.

Firstly, before describing a handover between different frequencies, the constitution of information transmitted and received between the mobile stations and the base station will be explained.

Figure 37:
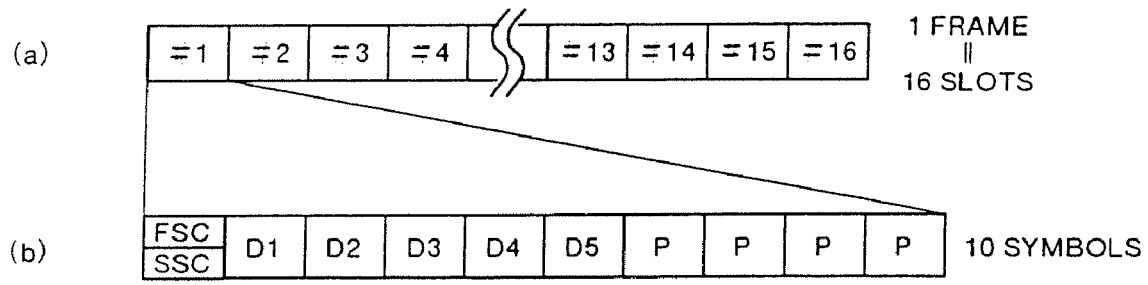
FIG. 37 is a diagram showing a frame constitution of a broadcast channel (BCH)

FIG. 37 shows a frame constitution of a broadcast channel (BCH). In a W-CDMA system, as shown in FIG. 37(*a*), one frame of the broadcast channel comprises sixteen slots, for instance, corresponding to #1 to #16 in the diagram. Furthermore, as shown in FIG. 37(*b*), one slot comprises ten symbols (representing one cycle of the spreading code). In this constitution, the four symbols shown by "P" in the diagram are pilot symbols needed for detecting phase information, the five symbols shown by "D1 to D5" in the diagram are information components of the broadcast channel, and one symbol shown by "FSC" (first search code) and "SSC" (second search code) in the diagram is a search code. The first search code and the second search code are transmitted at the same time.

Furthermore, in the W-CDMA system, spectrum spreading is performed using spreading codes, the spreading codes comprising two elements called a spreading code (short code) specific to the channels, and a scrambling code (long code) specific to the base stations (see FIG. 37(*c*) and FIG. 37(*d*)). The same spreading code is used for the pilot symbol P and the information components D1 to D5, and different spreading codes (COMMON and C+Walsh in the diagram) are used for the search codes. Furthermore, only the search code is not spread by the scrambling code. Next, the normal mode sequence of establishing synchronization between the base station and the mobile stations in the W-CDMA system will be explained keeping in mind the basic assumption (constitution of the broadcast channel frame) mentioned above.

In a W-CDMA system, the cells are basically unsynchronized, that is, the frame timings and the like do not generally match. Accordingly, in the W-CDMA system, the mobile stations and the base stations can be synchronized using, for instance, a three-stage initial acquisition method.

In the first stage, a first search code (FSC), being transmitted commonly from all the base stations and time-continually, is detected. Using this, slot synchronization can be established.

Figure 38:
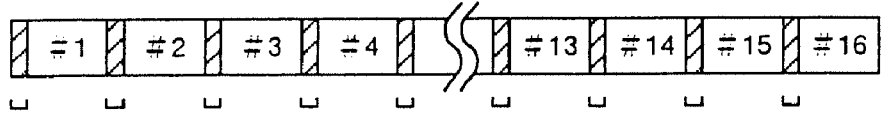
FIG. 38 is a detailed example of detecting a second search code in sixteen consecutive slots.

In the second stage, multiple second search codes (SSC), transmitted at the same timing as the first search code, are detected continuously in sixteen slots, and determined in their transmission sequence. As a consequence, frame synchronization can be established, and moreover, a scrambling code group number can be identified. More specifically, for instance, as shown in FIG. 38, the second search codes are detected in sixteen continuous slots. Then, frame synchronization can be accomplished from one cycle comprising #1 to #16 from the second search codes detected in this manner. Moreover, the scrambling code group number can be identified based for instance on a correspondence table such as that shown in FIG. 39. Here, the slot # on the horizontal axis represent slot numbers, and the groups on the vertical axis represent scrambling code groups. Furthermore, there are seventeen types of second search codes (1 to 17), and from a combination of sixteen slots it is possible to uniformly identify the scrambling code group number, i.e. the scrambling code used by the base station which the mobile station belongs to. The numeric values of the second search codes stored in this table are one specific example to explain the present invention, and in the sense of identifying a given numeric pattern, other numeric values can of course be used.

In the third stage, it is identified which of the multiple scrambling codes contained in the scrambling group numbers are being used, to complete the establishment of synchronization of the downstream line of the corresponding base station.

Figure 40:
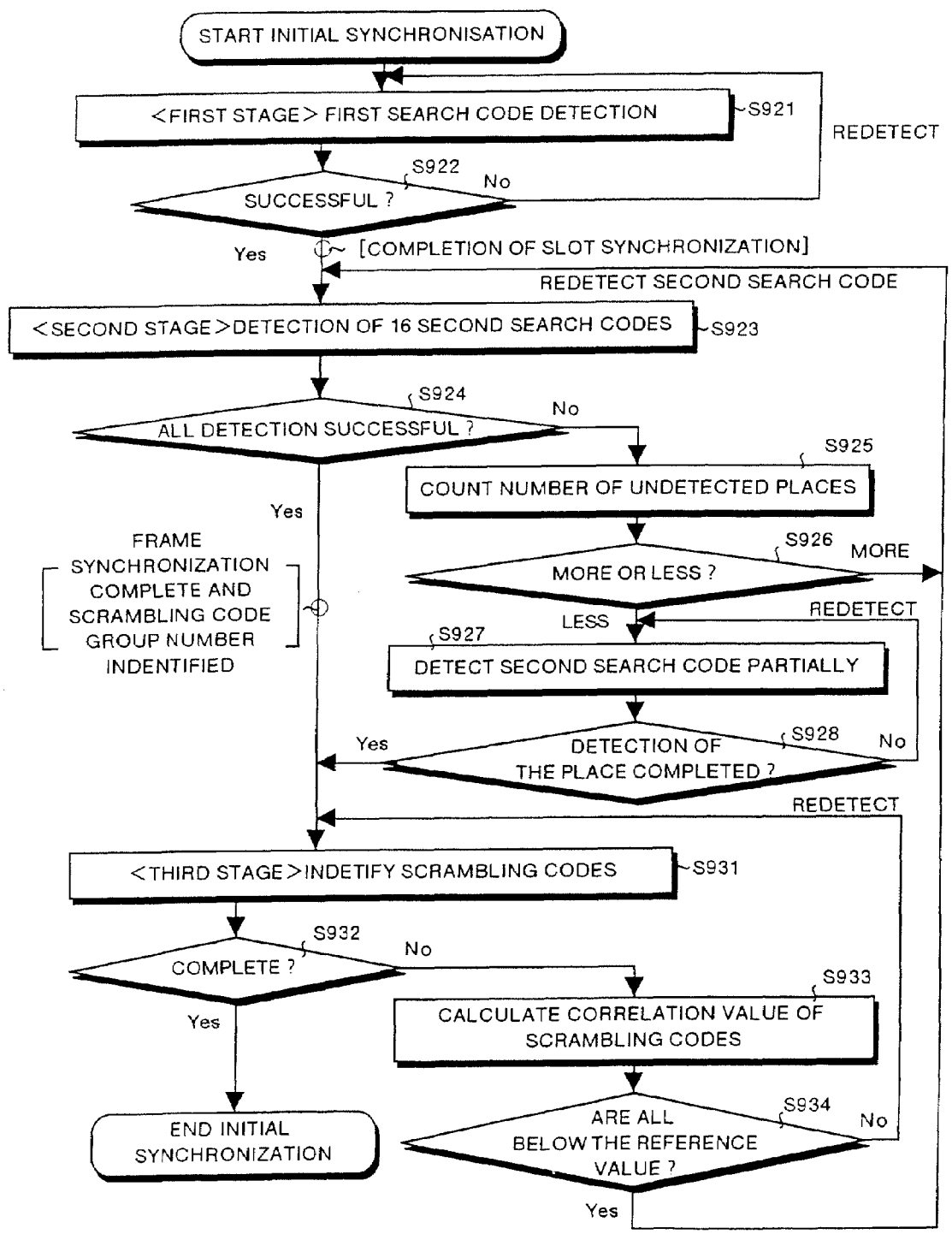
FIG. 40 is a flowchart when synchronization establishment procedure is carried out at the mobile station side.

FIG. 40 is a flowchart of a case when the synchronization establishment sequence described above is actually being performed on the mobile station side. Below, the operation of the mobile station will be explained based on FIG. 37.

Firstly, the mobile station performs processing corresponding to the first stage, by detecting the first search code (Step S921). Detection is carried out continuously until a first search code is detected (Step S922).

When the first search code has been detected (YES in the Step S922), the mobile station synchronizes the slots, and then detects sixteen second search codes in the second stage (Step S923). Here, at the mobile station, when a second search code cannot be detected due to the condition of the channels or the like (NO in Step 924), the number of undetected places is counted (Step S925), and it is determined whether there are more or less of these than a predetermined number set in advance (Step S926). For instance, when there are more of them, the second search code is detected again (Step S923), and on the other hand, when there are fewer of them, only that portion is detected (Step S927 and Step 928).

In this way, when all the second search codes have been detected (YES in the Step S924, and YES in the Step 928), as explained above, the mobile station establishes frame synchronization, and identifies the scrambling code group number.

Finally, as the third stage, the mobile station identifies the scrambling code used by the corresponding base station (Step 931, YES in Step 932), completing the establishment of initial synchronization. Thus communication becomes possible. When calculating the correlation value of the identified scrambling codes (Step S933), when all the codes are below a predetermined reference value (YES in Step 934), the second search codes are detected again (Step S923); otherwise (NO in the Step S934), the scrambling codes are reidentified until the Step 931 is completed.

On the other hand, as explained earlier (in a case requiring a handover as explained in the conventional technology), when performing a handover between different frequencies, the power of other carriers is measured in compliance with an order from the base station or a determination carried out by the mobile station, and if there is a carrier which seems actually capable of a frequency handover, the handover is carried out according to a predetermined sequence. At that point, a first search code can be detected without fail, i.e., at least once in the idle period described in the above embodiments 1 to 9. However, to detect a second search code it is necessary to search one frame, i.e. all sixteen slots, and consequently it cannot be detected in this way. Therefore, similarly, it is not possible to detect the scrambling code group number.

Accordingly, it is an object of the present embodiment to realize a communication device capable of detecting all second search codes by gradually shifting the idle period of not more than half of one frame.

Figure 41:
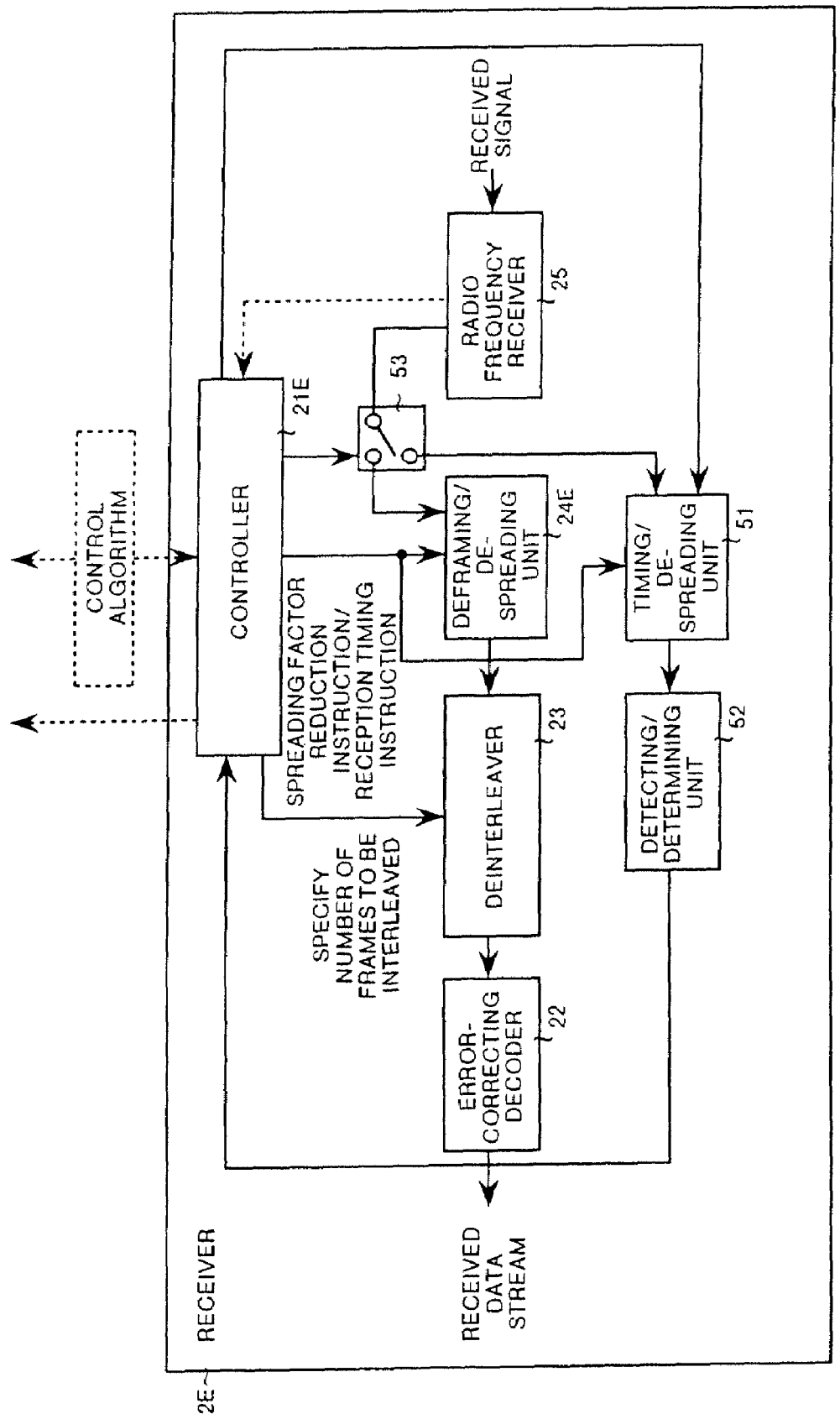
FIG. 41 is a diagram showing a constitution of a receiver according to a tenth embodiment of the present invention.

FIG. 41 shows a constitution of a receiver according to a tenth embodiment of the present invention. This constitution is provided to the mobile stations.

As shown in FIG. 41, the receiver 2E comprises a controller 21E, an error-correction decoder 22, a deinterleaver 23, a deframing/de-spreading unit 24E, a radio frequency receiver 25, a time/de-spreading unit 51, a detecting/determining unit 52, and a switch 53. Parts of the constitution which are the same as the embodiments already described are represented by the same reference codes and explanation thereof will be omitted.

Through negotiations with a transmitter not shown in the diagram, the controller 21E mainly controls the operations of the deinterleaver 23, the deframing/de-spreading unit 24E, and the switch 53. By negotiating with the transmitter, this controller 21E indicates frame numbers of the frames to be deinterleaved, appropriate to the normal mode and the compressed mode. Furthermore, in the compressed mode, this controller 21E supplies an instruction to reduce the spreading factor, and reception timings for receiving compressed mode frames, to the switch 53, the deframing/de-spreading unit 24E, and the time/de-spreading unit 51. That is, the switch 53 and the time/de-spreading unit 51 are connected only in the idle period.

The radio frequency receiver 25 decodes received signals sent from an antenna not shown in the diagram. The deframing/de-spreading unit 24E de-spreads using spreading codes allocated to the users of the receiver 2E in correspondence with the normal mode and the compressed mode, and forms a frame for each mode. When the controller 21E has instructed the deframing/de-spreading unit 24E of reception timings in correspondence with each of the modes, the deframing/de-spreading unit 24E extracts the received signals from the radio frequency receiver 25 in accordance with the reception timings. Furthermore, in the compressed mode, the deframing/de-spreading unit 24E receives an instruction from the controller 21E to reduce the spreading factor, and, in accordance with that instruction, obtains a received signal using a lower spreading factor than in the normal mode. The deinterleaver 23 chronologically interleaves (deinterleaves) the coded data in bit units, in a reverse sequence to the interleaving in the transmitter. The error-correction decoder 22 corrects errors in the deinterleaved signal to obtain decoded data, i.e. a received data stream.

Furthermore, during the idle period, the time/de-spreading unit 51 detects first search codes and second search codes on other carriers. The detecting/determining unit 52 carries out a determining process, described later, based on the detected first search codes and second search codes.

Figure 42:
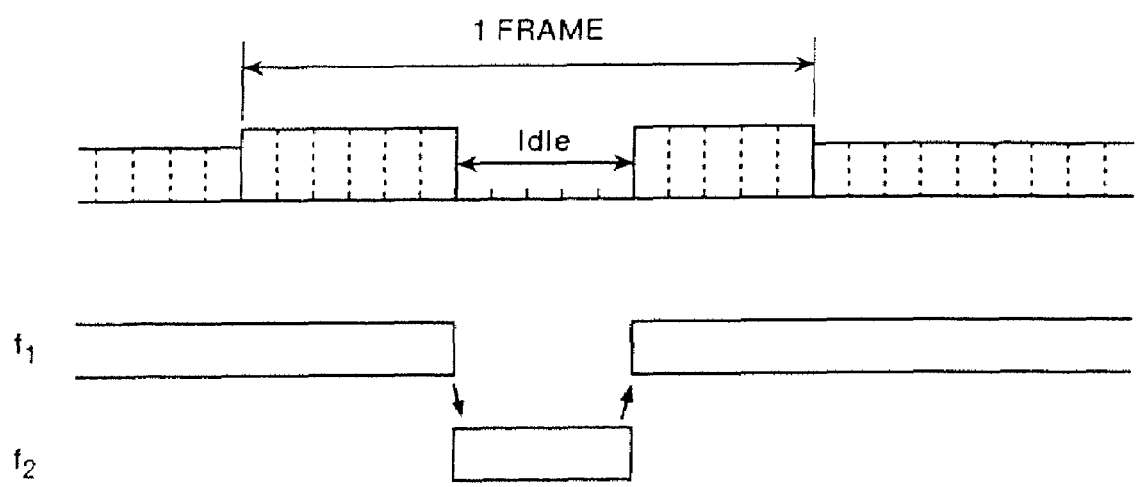
FIG. 42 is a diagram showing an outline of the operation of a receiver according to the present invention.

The receiver 2E having the constitution as shown in FIG. 42 normally receives a compressed frame on a carrier (frequency: f1) being used in communication. In idle period this receiver 2E receives the search code on another carrier (frequency: f2).

Figure 43:
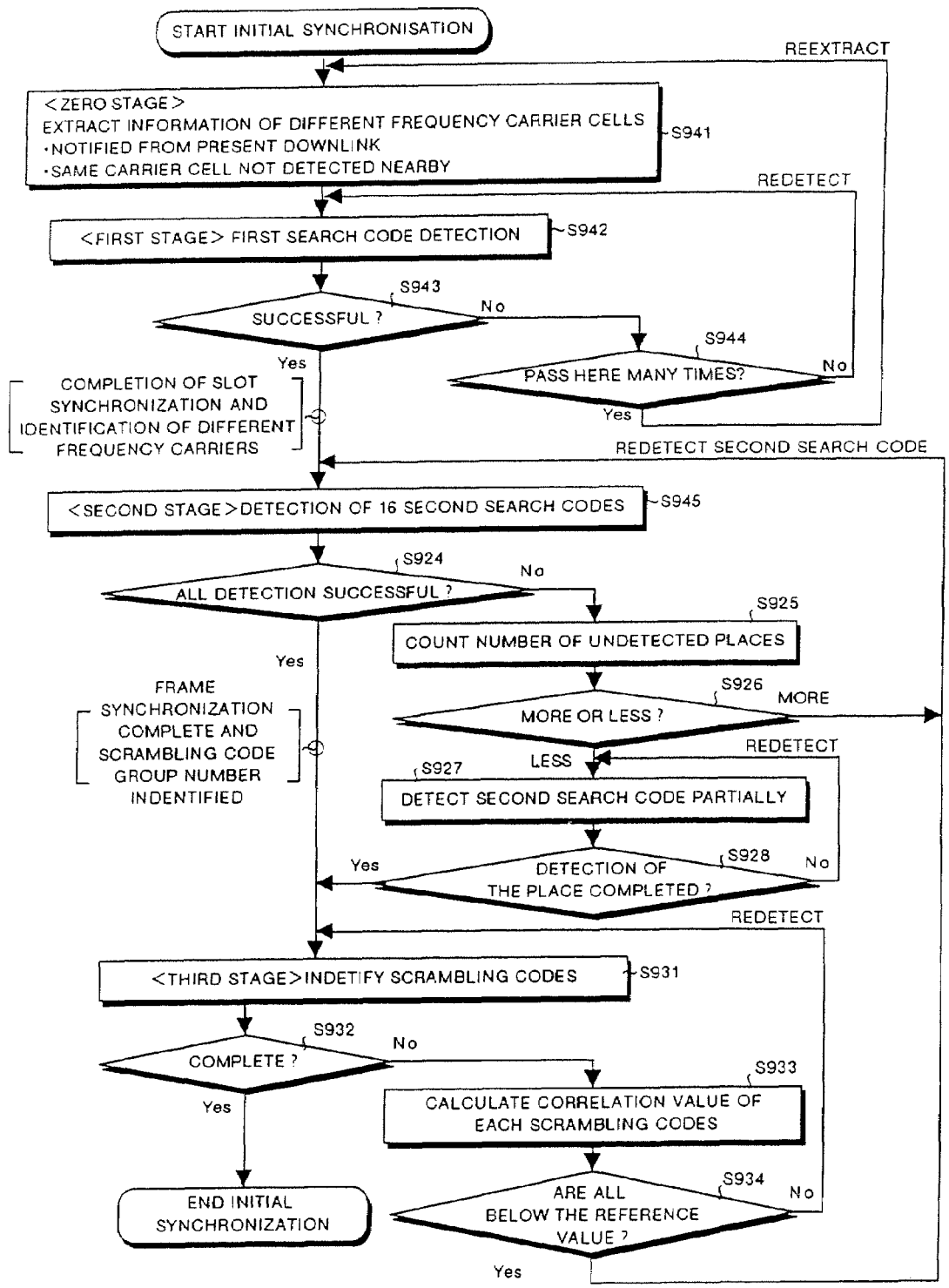
FIG. 43 is a flowchart when synchronization establishment procedure is carried out at the mobile station side in a handover between different frequencies W-CDMA/W-CDMA.

Next, the operation in the receiver 2E when performing a handover will be explained. FIG. 43 is a flowchart of the procedures of establishing synchronization performed on the mobile station side during a handover between W-CDMA/W-CDMA different frequencies. In the handover explained below, the controller 21E carries out control based on a determination of the detecting/determining unit 52.

For instance, in the case of a handover performed in accordance with a command from the base station or a determination of the mobile station, the mobile station extracts cell information of other frequency carriers from the base station (Step S941).

Next, based on the extracted information, the mobile station carries out processing corresponding to the first stage by detecting a first search code and a different frequency carrier during the idle period of the compressed mode (Step S942). Basically, this detecting is performed continuously until the first search code is detected (Step S943), but returns to redetecting the cell information and the first search code in accordance with a setting of the receiver (Step S944). During the idle period, the switch 53 is connected to the timing/de-spreading unit 51 in compliance with the controller 21E.

Figure 44:
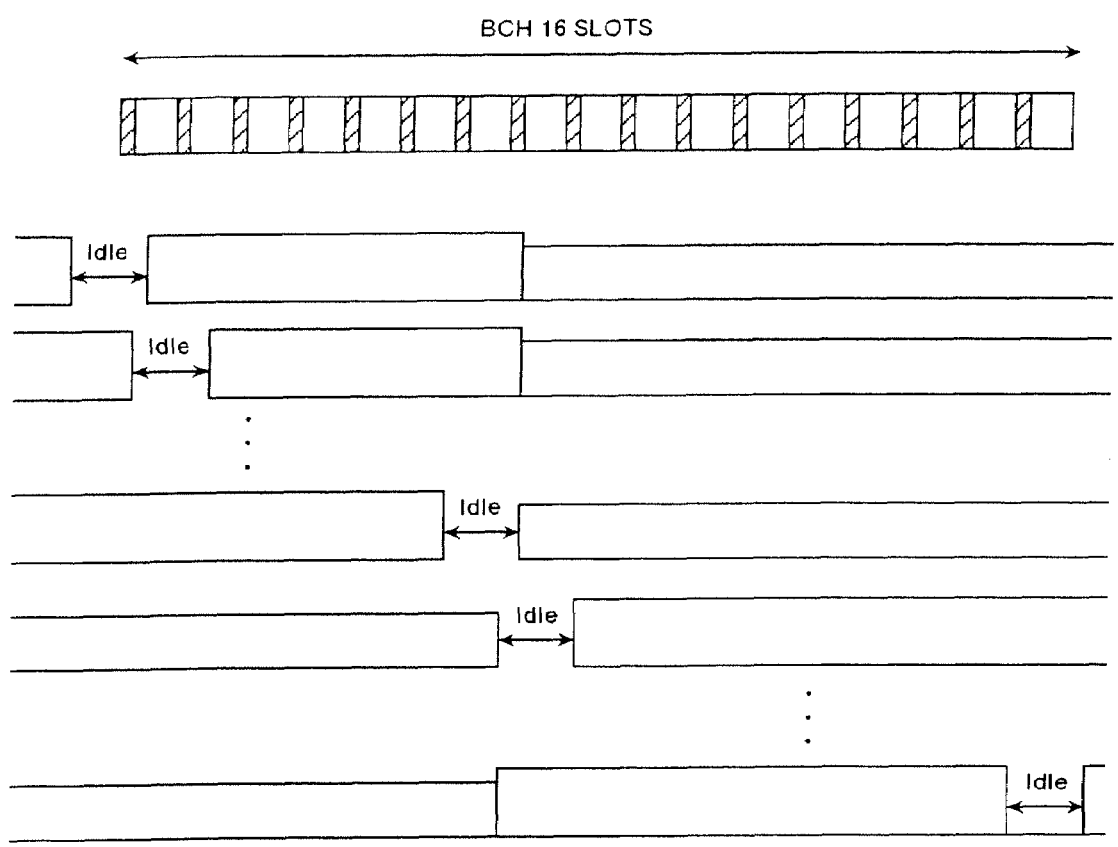
FIG. 44 shows an example of obtaining a second search code.

When the first search code and the different frequency carrier have been detected (YES in the Step S943), the mobile station establishes slot synchronization, and then detects sixteen second search codes in the second stage (Step S945). As the second search code detection, as for instance shown in FIG. 44, the controller 21E shifts the idle period for each slot, and detects one second search code in each frame. That is, all the second search codes are detected in sixteen frames.

Figure 45:
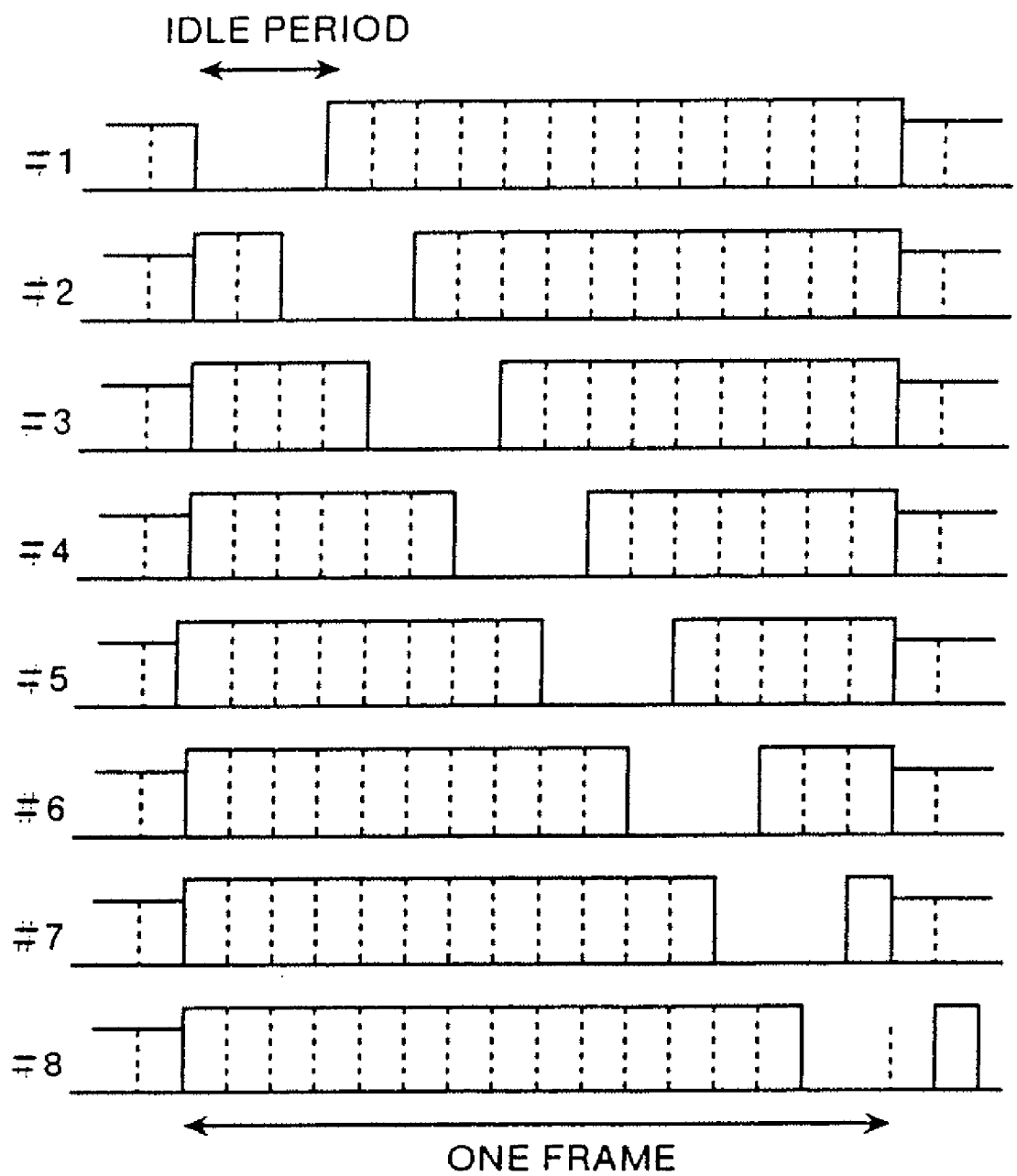
FIG. 45 shows an example of obtaining a second search code.
Figure 46:
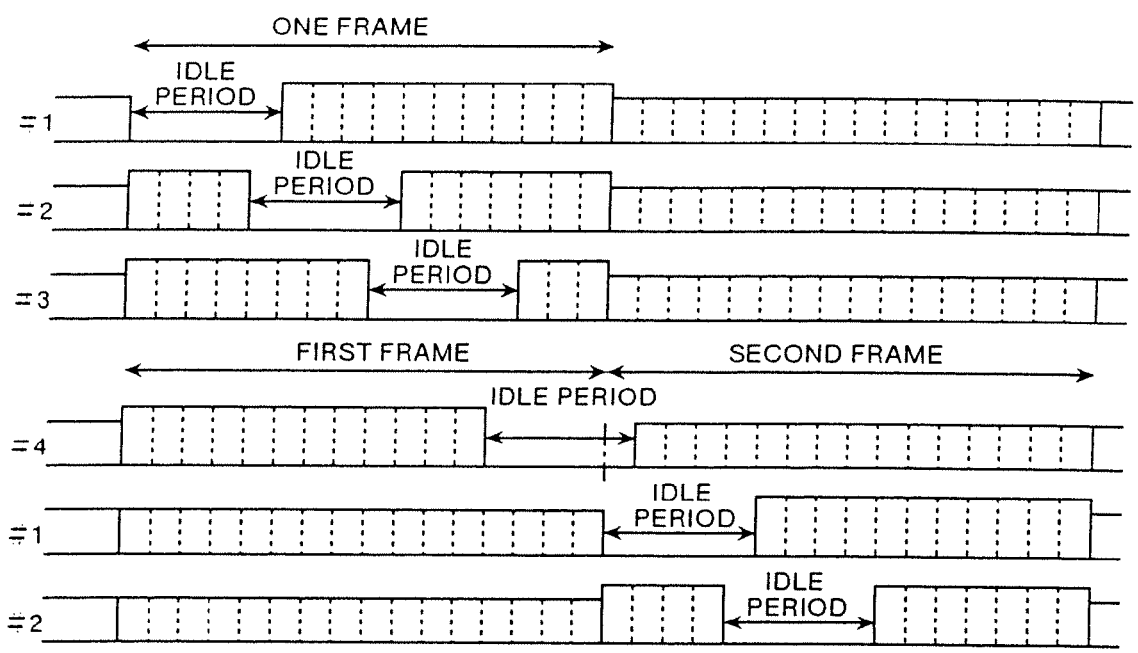
FIG. 46 shows an example of obtaining a second search code.
Figure 47:
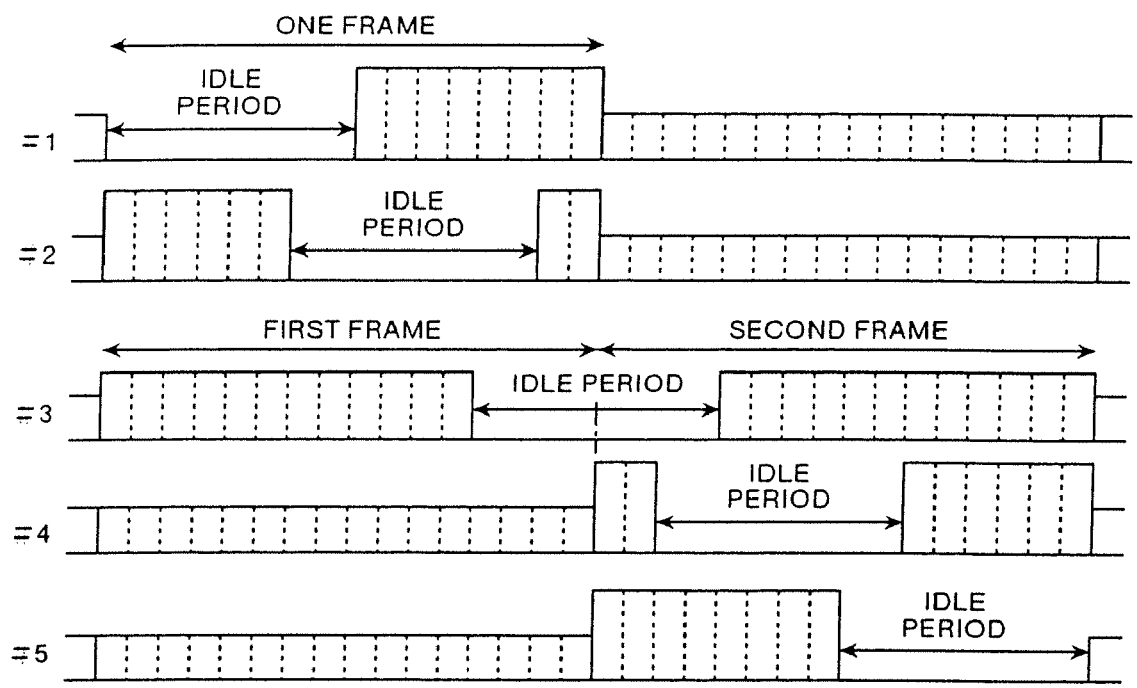
FIG. 47 shows an example of obtaining a second search code.

Furthermore, the method of detecting the second search code is not restricted to this, and two second search codes may be detected in one frame, as for instance shown in FIG. 45. This case differs from FIG. 44 in that all the second search codes can be detected in eight frames. Furthermore, when continuously controlling multiple frames (two frames are shown in the diagram), as for instance shown in FIG. 46 and FIG. 47, all the second search codes can be detected by setting the idle period. As explained above, the idle period needs only to be set to a maximum of half the duration of one frame, there being many conceivable variations other than the above. Therefore, the number of frames detected varies according to the length of the idle period. Furthermore, detection reliability can be improved by detecting all the second search codes a number of times.

However, when the idle period is set long, although the detection time does not take longer than when the idle period is short, there may be some deterioration in the quality of information data that was being transmitted, or interference power may be increased if the transmission power is increased to maintain the quality of this data. On the other hand, when the idle period is shortened, although there is not as much deterioration in the quality of information data as compared to when the idle period is long, the detection time is much longer. Accordingly, an optimum idle period must be set at the receiver side, with consideration to synthesizer performance (synthesizer switching time and the like) and the channel condition and the like. Furthermore, the portions in the frames of FIG. 45 to FIG. 47 where the slots overlap must be set as appropriate in accordance with synthesizer performance (synthesizer switching time and the like).

In the Step S945, when the mobile station is unable to detect a second search code due to the condition of the channel (NO in Step S924), the number of undetected places is counted (Step S925), and it is determined whether there are more or fewer than a predetermined number (Step S926); for instance, when there are more, the second search codes are detected again, on the other hand, when there are fewer, detecting is carried out in that portion only.

In this way, when all the second search codes have been detected (YES in the Step S924, or YES in the Step 928), the mobile station establishes frame synchronization to the other carrier, and identifies the scrambling code group number of the corresponding base station.

Finally, as the third stage, the mobile station identifies the scrambling code used by the corresponding base station (Step 931, YES in Step 932), completing the establishment of initial synchronization in the handover. Thus communication is possible. When calculating the correlation value of the identified scrambling codes (Step S933), when all the codes are below a predetermined reference value (YES in Step 934), the second search codes are detected again (Step S923); otherwise (NO in the Step S934), the scrambling codes are reidentified until the Step 931 is completed.

Next, a handover operation with another communication system known as GSM (Global System for Mobile Communication) will be explained using the diagrams. This handover is also performed at the receiver 2E shown in FIG. 41. Therefore, in this case, instead of the first search codes and the second search codes, the time/de-spreader 51 detects FCCH and SCH explained below.

Figure 48:
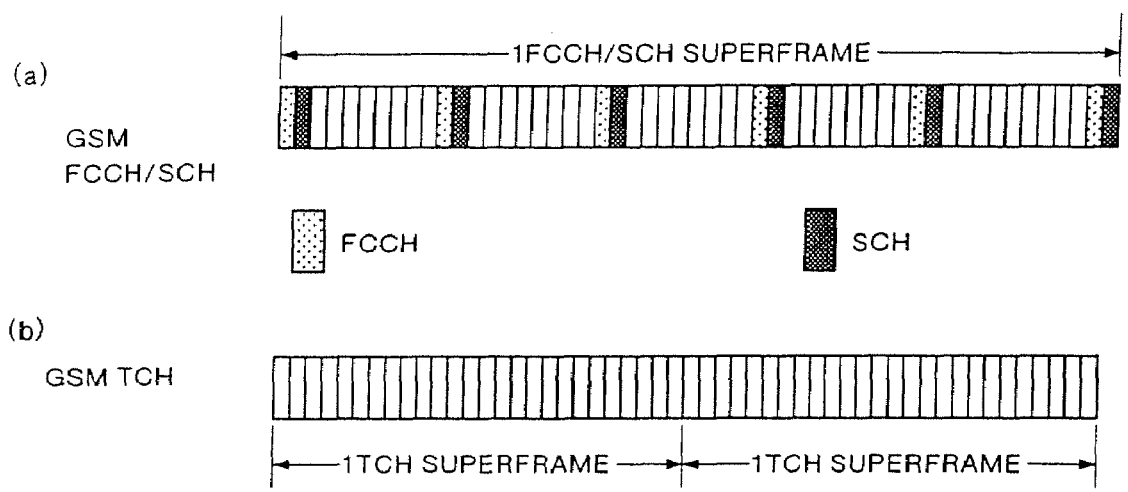
FIG. 48 shows constitution of a GSM superframe.
Figure 49:
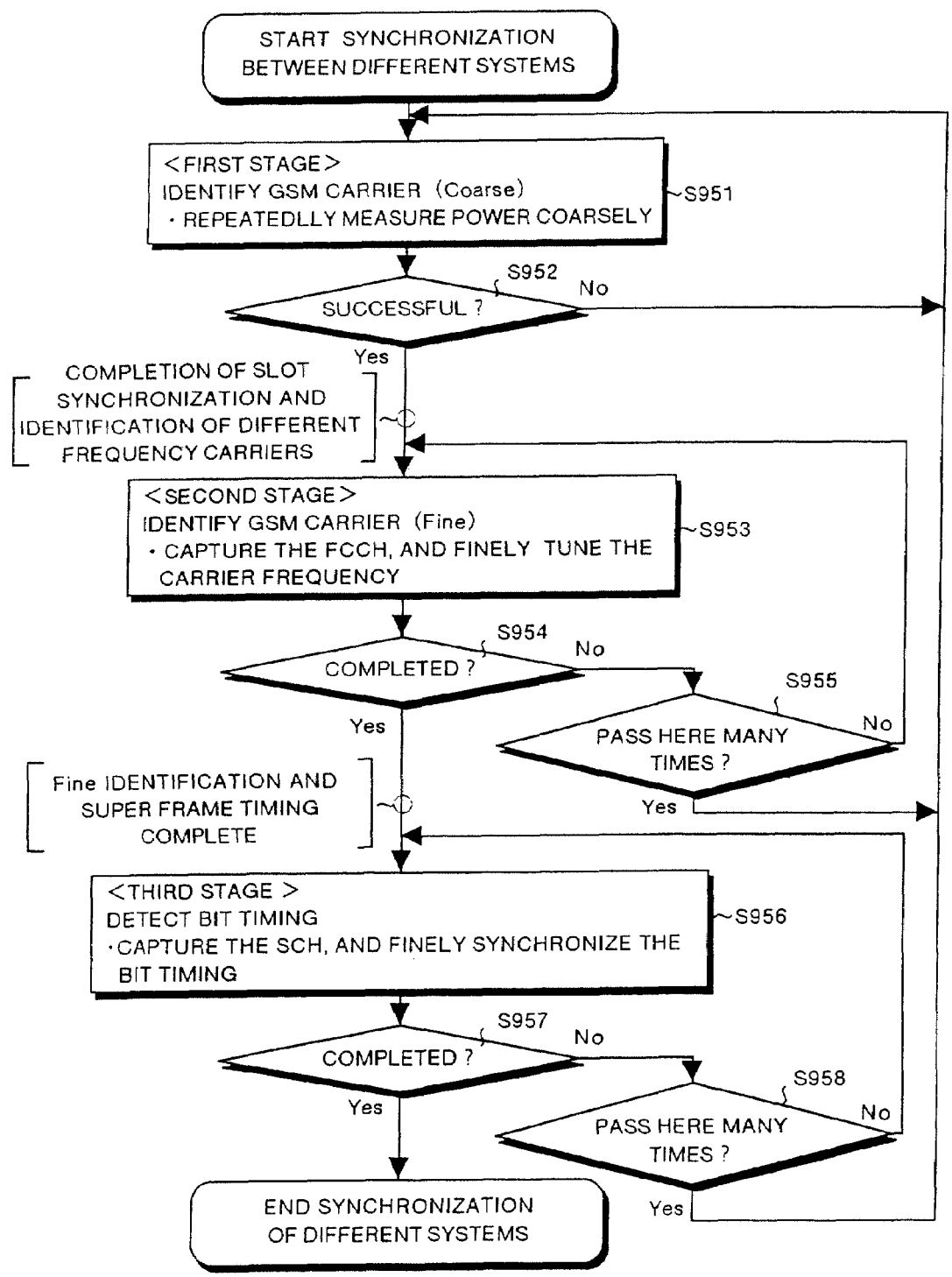
FIG. 49 is a flowchart when synchronization establishment procedure is carried out at the mobile station side in a handover between W-CDMA/W-CDMA of different frequencies.

FIG. 48 is a diagram showing a constitution of a GSM superframe. FIG. 48(a) is a GSM control channel, that is, a channel showing control information such as a Frequency Correction CH (FCCH) for tuning frequencies, a Synchronization CH (SCH) for synchronizing, as well as other information. FIG. 48(b) shows a GSM Traffic CH (TCH). Furthermore, FIG. 49 is a flowchart in a case when a mobile station establishes synchronization in a handover between W-CDMA and GSM.

Firstly, as a first stage, the W-CDMA mobile station must discover where the GSM frequency carrier is, and so repeatedly coarsely measures power until it finds the carrier (Step S951 and Step S952).

Next, when the mobile station has finished power measurement, as a second stage, based on the measurement result, it finely adjusts the carrier frequency, measured by capturing the FCCH, and identifies the GSM carrier (Step S953). In the GSM, one superframe comprises fifty-one frames, including five FCCH. Therefore, the W-CDMA system mobile station tunes the frequency in these five periods (Step S954 and Step S955). Furthermore, the FCCH can be detected without shifting the idle period, by utilizing the fixed time difference between the FCCH/SCH superframe synchronization and the superframe synchronization in the W-CDMA system. However, the FCCH can be detected by gradually shifting the idle period, in the same way as in the above-mentioned handover between W-CDMA systems.

Finally, when the GSM carrier has been identified, as a third stage, the mobile station capture the SCH, which is the frame next to the FCCH, and synchronizes the bit timings (Step S956, Step S957, and Step S958). For instance, if the detection of the FCCH is complete, the position of the SCH is already known (it is the next frame) and thus it can easily be detected. Therefore, although it is necessary to identify all the superframes to detect the FCCH, the SCH can be detected merely by setting the idle period so that the frame next to the FCCH can be detected. However, when detecting the SCH, there is no need to capture the SCH immediately after the captured FCCH; for instance, the SCH immediately after the next FCCH can be captured, or any SCH can be captured. As a consequence, the W-CDMA system mobile station completes the establishment of initial synchronization in the handover, enabling communication with the GSM to be carried out.

In this way, according to the present embodiment, a handover can easily be achieved between different frequencies (between a W-CDMA system and a W-CDMA system, and between a W-CDMA system and a GSM).

The above embodiments 1 to 10 describes in detail the spread spectrum communication device of the present invention, and the operations of these embodiments share the process of using an interleaver to chronologically interleave in bit units coded data, and thereafter, using a framing/spreading unit to compress the interleaved data. However, the interleaving of data does not necessarily have to be performed prior to compression, and can basically be performed in any point. For instance, the interleaving may be performed after the data has been compressed. Therefore, when interleaving after the data has been compressed, the error-correction encoder has the function of compressing the data, and there is no need for provide a framing/spreading unit. In such a case, the constitution of the receiver side naturally changes. That is, the deinterleave processing is performed first.

INDUSTRIAL APPLICABILITY

As above, the spread spectrum communication device according to the present invention is useful for a code division multiple access (CDMA) communication system, and is especially applicable to spread spectrum communication carrying out interleaving transmission and transmission power control, and moreover, is applicable as a communication device for carrying out a handover between different frequencies (between a W-CDMA system and a W-CDMA system, and between a W-CDMA system and a GSM).

What is claimed is:

1. A communication method applied to a mobile communication system in a code division multiple access system for continuously transmitting uncompressed frames in a normal mode and intermittently transmitting compressed frames in a compressed mode, in accordance with transmission power being controlled with a transmission power control step size, said method comprising: at a base station transmitting transmission power control information to a mobile station, the power control information instructing increase or decrease of transmission power; and at the mobile station, receiving the transmission power control information from the base station; and adjusting the transmission power for the normal mode and the compressed mode with the transmission power control step size based on the transmission power control information, wherein, the adjusting step includes first adjusting for adjusting the transmission power with a first transmission power control step size for the normal mode, and second adjusting for adjusting the transmission power with a plurality of transmission power control step sizes that include a second transmission power control step size larger than the first transmission power control step size for the compressed mode;

in the normal mode, transmitting the uncompressed frame including a predetermined number of slots continuously in accordance with the transmission power adjusted in the first adjusting step, and in the compressed mode, compressing the frame, dividing the compressed frame into a first portion including front edge of a frame window and a second portion including rear edge of the frame window to set an idle period, whose length can be expressed by number of slot, between the first portion and the second portion, the frame window being the same as a frame window in the normal mode, and transmitting the divided compressed frame intermittently, in accordance with the transmission power adjusted in the second adjusting step.

2. The communication method according to claim 1, wherein the adjusting step includes:

first adjusting step for adjusting the transmission power with the first transmission power control step size for the uncompressed frames, and second adjusting step for adjusting the transmission power with the first transmission power control step size and the second transmission power control step size for the compressed frames.

3. A communication method applied to a base station in a code division multiple access system for continuously transmitting uncompressed frames in a normal mode and intermittently transmitting compressed frames in a compressed mode, in accordance with transmission power being controlled with a transmission power control step size, said method comprising:

receiving transmission power control information, the power control information instructing increase or decrease of transmission power; and adjusting the transmission power for the uncompressed frames and the compressed frames with the transmission power control step size based on the transmission power control information, wherein the adjusting step includes:

adjusting the transmission power with a first transmission power control step size for the uncompressed frames, and adjusting the transmission power with a plurality of transmission power control step sizes that include a second transmission power control step size larger than the first transmission power control step size for the compressed frames.

4. The communication method according to claim 3, wherein the adjusting step further includes:

adjusting the transmission power with the first transmission power control step size for the uncompressed frames, and adjusting the transmission power with the first transmission power control step size and the second transmission power control step size for the compressed frames.

\* \* \* \* \*